United States Patent [19]

Chu et al.

[11] Patent Number: 5,977,351
[45] Date of Patent: Nov. 2, 1999

[54] BENZPYRYLIUM SQUARYLIUM AND CROCONYLIUM DYES, AND PROCESSES FOR THEIR PREPARATION AND USE

[75] Inventors: Peter K. Chu, Acton; Serajul Haque, Braintree; Anthony J. Puttick, Arlington; Socorro M. Ramos, Belmont; Robert P. Short, Arlington; Stephen G. Stroud, Medford; Stephen J. Telfer; Michael J. Zuraw, both of Arlington, all of Mass.

[73] Assignee: Polaroid Corporation, Cambridge, Mass.

[21] Appl. No.: 08/065,350

[22] Filed: May 20, 1993

Related U.S. Application Data

[63] Continuation-in-part of application No. 07/795,038, Nov. 20, 1991, abandoned, which is a continuation-in-part of application No. 07/616,639, Nov. 21, 1990, abandoned.

[51] Int. Cl.⁶ .................. C07D 345/00; C07D 335/04; C07D 311/04
[52] U.S. Cl. .................. 540/1; 549/23; 549/24; 549/28; 549/398
[58] Field of Search .................. 549/24, 28, 23, 549/398; 540/1

[56] References Cited

U.S. PATENT DOCUMENTS

| | | | |
|---|---|---|---|
| T889,023 | 8/1971 | Reynolds et al. | 96/1.6 |
| 3,526,502 | 9/1970 | Murakami et al. | 96/1.5 |
| 3,554,745 | 1/1971 | Van Allan | 96/1.6 |
| 3,617,268 | 11/1971 | Murakami et al. | 96/1.5 |
| 3,896,112 | 7/1975 | Kubota | 260/240 D |
| 3,907,561 | 9/1975 | Kubota | 96/1.6 |
| 4,173,473 | 11/1979 | Petropoulos et al. | 430/72 |
| 4,175,956 | 11/1979 | Haley et al. | 430/37 |
| 4,233,443 | 11/1980 | Petropoulos et al. | 543/454 |
| 4,508,811 | 4/1985 | Gravesteijn et al. | 430/270 |
| 4,555,472 | 11/1985 | Katagiri et al. | 430/278 |
| 4,602,263 | 7/1986 | Borrer et al. | 346/201 |
| 4,714,667 | 12/1987 | Sato et al. | 430/270 |
| 4,720,449 | 1/1988 | Borrer et al. | 430/338 |
| 4,826,976 | 5/1989 | Borrer et al. | 544/58.4 |
| 4,857,431 | 8/1989 | Kato et al. | 430/91 |
| 5,153,169 | 10/1992 | Freedman et al. | 503/209 |
| 5,206,208 | 4/1993 | Liang et al. | 503/201 |
| 5,405,976 | 4/1995 | Telfer et al. | 549/404 |
| 5,492,795 | 2/1996 | Allen et al. | 430/332 |
| 5,627,014 | 5/1997 | Chu et al. | 430/332 |

FOREIGN PATENT DOCUMENTS

| | | |
|---|---|---|
| 1247915 | 3/1989 | Canada . |
| 264198 | 4/1988 | European Pat. Off. . |
| 341104 | 11/1989 | European Pat. Off. . |
| 516985 | 12/1992 | European Pat. Off. . |
| 58-220143 | 12/1983 | Japan . |
| 61-167681 | 7/1986 | Japan . |
| WO 88/04237 | 6/1988 | WIPO . |

OTHER PUBLICATIONS

Chemical Abstracts, 104(26), 234,392x (Abstract of Japanese Patent Application 84–108,441, Publication No. 60–252,346, published Dec. 13, 1985).
Chemical Abstracts, 99(10), 72,161v (Abstract of Gavrilyuk et al., Dopov. Akad. Nauk. Ukr. RSR, Ser. B: Geil., Khim. Biol. Nauki, 6, 28–30 (1983).
Detty, M.R., and Murray, B.J., J. Am. Chem. Soc., 105, 883–890 (1983).
Young, R.N., Tetrahedron Letters, 25, 1753 (1984).
Kabuto et al., Bull. Chem. Soc. Japan, 46, 1839–1844 (1973).
Patent Abstracts of Japan, 10(373), Abstract 61–167,681, Published Dec. 12, 1986.
Patent Abstracts of Japan, 12(487), Abstract 63–207,692, Published Dec. 20, 1988.
Patent Abstracts of Japan, 15(4529), Abstract 2–255,672, Published Jan. 7, 1991.
Von Strandtmann et al., J. Het. Chem., 9, 171 (1972).

Primary Examiner—Deborah C. Lambkin
Attorney, Agent, or Firm—David J. Cole

[57] ABSTRACT

Dyes comprising an inner salt of a compound of the formula:

$$Q^1=Z-Q^2$$

wherein:
$Q^1$ is a 4-(benz[b]-4H-pyrylium)methylidene, 4-(benz[b]-4H-thiopyrylium)methylidene or 4-(benz[b]-4H-selenopyrylium)methylidene grouping;

Z is a 1,3-(2-hydroxy-4-oxo-2-cyclobutylidene) hydroxide or 1,3-(2-hydroxy-4,5-dioxo-2-cyclopentylidene) hydroxide ring; and $Q^2$ is a 4-(benz[b]-4H-pyran-4-ylidene)methyl, 4-(benz[b]-4H-thiopyran-4-ylidene)methyl or 4-(benz[b]-4H-selenopyran-4-ylidene)methyl grouping;

wherein at least one of the groupings $Q^1$ and $Q^2$ carries at its 2-position a substituent in which a non-aromatic carbon atom is bonded directly to the benzpyrylium, benzthiopyrylium or benzselenopyrylium nucleus, subject to the proviso that if this 2-substituent contains an aromatic nucleus, this aromatic nucleus is not conjugated with the benzpyrylium, benzthiopyrylium or benzselenopyrylium nucleus to which it is attached, are useful as visible and near infra-red absorbers, having high extinction coefficients and improved solubility in polymeric media.

9 Claims, 8 Drawing Sheets

BENZPYRYLIUM SQUARYLIUM AND CROCONYLIUM DYES, AND PROCESSES FOR THEIR PREPARATION AND USE

REFERENCE TO PARENT APPLICATIONS

This is a continuation-in-part of application Ser. No. 07/795,038, filed Nov. 20, 1991, abandoned, which is a continuation-in-part of application Ser. No. 07/616,639, filed Nov. 21, 1990, and now abandoned.

FIELD OF THE INVENTION

This invention relates to dyes containing a squarylium or croconylium ring and two benzpyrylium, thiobenzpyrylium or selenobenzpyrylium groupings. (For brevity, the term "benzchalcopyrylium" will be used hereinafter to refer collectively to benzpyrylium, thiobenzpyrylium and selenobenzpyrylium groupings.) This invention also relates to processes for the preparation of these dyes and processes for their use as near infra-red absorbers. Finally, this invention relates to chromone intermediates used to prepare these dyes.

REFERENCE TO RELATED APPLICATIONS

Copending application Ser. No. 07/696,222, filed May 6, 1991, and its continuation-in-part, application Ser. No. 08/052,212, filed May 20, 1993, both assigned to the same assignee as the present application, and European Patent Application No. 92107574.3 (Publication No. 516,985) describe and claim certain processes for the synthesis of bis(heterocyclic) dyes, especially asymmetric dyes in which the two heterocyclic nuclei differ. These processes are useful for the synthesis of dyes of the present invention, as discussed in more detail below with reference to FIG. 4.

Copending applications Ser. Nos. 08/108,893 and 08/203,517, and U.S. Pat. No. 5,153,169, all assigned to the same assignee as the present application, describe and claim imaging media comprising a color-forming layer comprising a thermal color-forming composition adapted to undergo a change of color upon increase in the temperature of the color-forming layer above a color-forming temperature for a color-forming time. Preferred imaging media described in these three applications are substantially as shown in FIG. 6 of the accompanying drawings and comprise three separate color-forming layers containing yellow, cyan and magenta thermal color-forming compositions; each of these color-forming compositions comprises a color-forming compound which can produce the desired color and an infra-red absorber capable of absorbing infra-red radiation and thereby generating heat in the color-forming layer. The three color-forming layers use infra-red absorbers absorbing at differing wavelengths so that each color-forming layer can be imaged independently; for example, specific imaging media disclosed in these three applications use infra-red absorbers having peak absorptions at approximately 792, 822 and 869 nm.

U.S. Pat. No. 5,206,208, assigned to the same assignee as the present application, describes and claims thermal imaging media generally similar to those described in the aforementioned applications Ser. Nos. 08/108,893 and 08/203,517, and U.S. Pat. No. 5,153,169, but in which at least one imaging layer contains a metal cation. Preferred imaging media described in this application have imaging layers containing zinc acetate, as described below with reference to FIG. 6.

U.S. Pat. No. 5,227,498, its continuation-in-part, application Ser. No. 07/979,250, and the corresponding International Application PCT/US92/09992, all assigned to or in the name of the assignee of the present application, describe and claim amino-substituted squarylium infra-red dyes, including the dyes of Formulae IR2, IR3 and IR5 used in the imaging medium described below with reference to FIG. 6.

The disclosures of all the aforementioned copending applications are herein incorporated by reference.

BACKGROUND OF THE INVENTION

The term "near infra-red" is used herein to mean electromagnetic radiation having a wavelength of about 700 to about 1200 nm.

Near infra-red absorbers, that is to say compounds which absorb near infra-red electromagnetic radiation, are known to be useful in a number of applications. For example, such absorbers are useful as infra-red filters used in photography and for protecting sensitive materials from infra-red radiation, and in "inks" used to print characters intended to be read using near infra-red light—for example, in universal product code labels intended to be scanned with an infra-red laser. Such absorbers are sometimes useful as sensitizers to render photographic film sensitive to near infra-red radiation, and some of them can act as charge transfer materials and are thus applied to the photosensitive surfaces used in xerography and in other types of electrophotography.

A wide variety of compounds have been used as infra-red absorbers, including benzthiazoles, metal dithiolenes and phthalocyanines. Benzpyrylium and benzthiopyrylium dyes have also been used for this purpose.

For example, U.S. Pat. No. 3,554,745, issued Jan. 12, 1971, describes the use of 4-aminobenz[b]pyrylium salts as sensitizers for photoconductors.

U.S. Pat. No. 3,617,268, issued Nov. 2, 1971, describes a photosensitive material for electrophotography comprising an organic photoconductive compound and a sensitizer consisting of reaction products of a benzopyrylium salt and a benzopyran.

Canadian Patent No. 1,247,915 discloses a bis(4-benzpyrylium) pentamethine dye used as an infra-red sensitizer. The nuclei each carry a 2-phenyl substituent and a 7-acetyl group.

Reynolds et al., U.S. Defensive Publication No. T-889,023, published Aug. 31, 1971 describes several bis(4-benzpyrylium) pentamethine compounds in which the pentamethine chain is unsubstituted and unbridged. The nuclei have 2-dimethoxyphenyl substituents and may have 7-acetyl substituents.

U.S. Pat. No. 4,714,667 discloses bis(4-pyrylium) and bis(4-benzpyrylium) pentamethine and heptamethine compounds for use in optical information recording media. In these compounds, three of the carbon atoms of the chain form part of a 5- or 6-membered ring, which is not symmetrically disposed in the chain when a pentamethine chain is present.

Japanese Patent Application No. 103,604/82 (Publication No. 220,143/83, published Dec. 21, 1983), discloses a broad class of bis-heterocyclic pentamethine dyes in which the central three carbon atoms of the pentamethine chain form part of a squarylium or croconylium ring. The heterocyclic nuclei can be pyrylium, thiopyrylium, selenopyrylium, benzpyrylium, benzthiopyrylium, benzselenopyrylium, naphthopyrylium, naphthothiopyrylium or naphthoselenopyrylium nuclei, which can be substituted with alkyl, alkoxy, aryl or styryl groups.

Japanese Patent Application No. 60-8730 (Publication No. 167,681/86, published Jul. 29, 1986), discloses bis(4- benz[b]thiopyrylium pentamethine dyes in which the central three carbon atoms of the pentamethine chain for part of a squarylium ring. The dyes are intended for use as infra-red absorbers.

West German Offenlegungsschrift No. 38 34 960 discloses a bis(2-t-butyl-4-benzpyrylium) monomethine dye for use in a photopolymerizable composition.

Infra-red absorbers have the capacity to absorb infra-red radiant energy and convert it to heat, thereby heating any medium in which the infra-red absorber is present, and several applications of such absorbers depend upon such generation of heat. Thus, infra-red absorbers can be used to induce chemical or physical changes in the medium containing them, and such chemical or physical changes can be induced with an appropriate wavelength of light. For example, a layer of infra-red absorber spread over a supporting plate can undergo visually perceptible physical distortions upon illumination by an infra-red laser, so that the layer acts as an optical recording medium, as in a compact disc. For example, U.S. Pat. No. 4,508,811, issued Apr. 2, 1985, describes an optical recording element in which the recording layer comprises a bis(2,6-dialkyl) pyrylium or thiopyrylium squarylium salt.

U.S. Pat. No. 4,555,472, issued Nov. 26, 1985, describes an optical recording member comprising a bis(2,6-diaryl-4-pyrylium) trimethine compound, in which the central carbon atom of the trimethine chain may bear an alkyl or aryl substituent.

Such chemical and physical changes can also be used in thermal imaging; the highly localized heating produced by the infra-red absorber can be used to create a high resolution image. For example, U.S. Pat. No. 4,720,449, issued Jan. 19, 1988, describes a thermal imaging method which comprises heating imagewise a di- or triarylmethane compound possessing within its di- or triarylmethane structure an aryl group substituted in the ortho position to the meso carbon atom with a moiety ring-closed on the meso carbon atom directly through a nitrogen atom, which nitrogen atom is also bound to a group with a masked acyl substituent that undergoes fragmentation upon heating to liberate the acyl group for effecting intramolecular acylation of the nitrogen atom to form a new group in the ortho position, whereby the di- or triarylmethane compound is rendered colored in an imagewise pattern corresponding to the imagewise heating.

U.S. Pat. No. 4,602,263, issued Jul. 22, 1986, and U.S. Pat. No. 4,826,976, issued May 2, 1989, both describe thermal imaging systems for optical recording and particularly for forming color images. This thermal imaging method relies upon the irreversible unimolecular fragmentation of one or more thermally unstable carbamate moieties of an organic compound to effect a visually discernible color shift from colorless to colored, from colored to colorless or from one color to another.

International Patent Application No. PCT/US87/03249 (Publication No. WO 88/04237), published June 16, 1988, describes a different type of thermal imaging system using an element comprising a support formed of a material transparent to radiation of a specific wavelength and having an imaging surface layer heat activatable at an elevated temperature, and a layer of porous or particulate imaging material uniformly coated on the imaging surface layer and exhibiting a cohesive strength which is greater than the adhesive strength between the imaging material and the imaging surface layer. When this element is illuminated with radiation of the specific wavelength, at least one of the materials used in the two layers absorbs this radiation, thus heat activating the imaging surface layer and locking substantially the entire layer of the imaging material to the support when the imaging surface layer cools. After exposure of the element, a peeling force is applied to the imaging material so that in the unexposed areas of the element, the imaging material will peel from the support; however, in the exposed areas, the locking of the imaging material causes this material to be retained upon the support.

In many thermal imaging systems in which a leuco dye is transformed into a colored compound by heat, the leuco dye does not have sufficient absorption at a convenient wavelength to permit it to convert sufficient radiation to heat to effect the color change. For example, in the aforementioned U.S. Pat. Nos. 4,602,263 and 4,826,976, many of the leuco dyes absorb in the ultraviolet. In such thermal imaging systems, it is normally preferred to use a laser as the radiation source, and at present ultraviolet lasers are not well-suited to imaging processes, and such processes are preferably carried out using an infra-red laser. Accordingly, it is preferred to include with the leuco dye an infra-red absorber for converting infra-red radiation into heat, which is transferred to the leuco dye to effect the color change.

Similarly, in the thermal imaging system described in the aforementioned International Patent Application No. PCT/US87/03249, an infra-red absorber may be provided in a layer adjacent the imaging surface layer to assist in converting infra-red radiation into heat.

The requirements for infra-red absorbers for use in thermal imaging systems are stringent. Since the sensitivity and the resolution of the image produced are often affected by the thickness of the layers in the heat-sensitive element (the sensitivity of the system is inversely related to the mass of material required to be heated, and thus inversely related to the thickness of the relevant layers), it is necessary to provide a high degree of absorption of infra-red radiation within a thin layer, sometimes of the order of 1 $\mu$m. To produce this degree of absorption in a layer containing the other components required in thermal imaging systems, it is necessary that the infra-red absorber used have a high extinction coefficient, of the order of at least about 100,000, and a low molecular weight. In addition, the absorber should manifest its maximum absorption within the range of about 700–1200 nm. so that it can conveniently be used with existing near infra-red lasers. (In the present state of technology, solid state diode lasers emitting at about 760 to 1200 nm. provide the highest output per unit cost. YAG and other rare earth doped lasers emitting at about 1000–1200 nm. are also useful in thermal imaging processes.)

One major problem with many prior art infra-red dyes is that they have low solubility either in most plastics and/or in semi-polar solvents (for example, methyl ethyl ketone and methylene chloride) from which they need to be deposited to form imaging media such as those used in the aforementioned International Patent Application No. PCT/US87/03249. Thus, it is difficult to dissolve or disperse the absorber in a plastic without forming aggregates and without adversely affecting other properties of the plastic.

Accordingly, despite the numerous prior art attempts to develop near infra-red absorbers, there are still applications of such absorbers, especially in thermal imaging methods, where it is difficult to find a prior art absorber which fulfills all the requirements of high extinction coefficient, low molecular weight, desirable wavelength of maximum absorption and compatibility with other components of the desired medium. In addition, some prior art infra-red absorbers degrade in films too rapidly to be useful in media which need to have a shelf-life of at least several months. Finally, some prior art infra-red absorbers, especially those which include sulfur-containing heterocyclic rings, have undesirable odors, which may be objectionable to users of the dyes when they are employed in a medium which permits escape of the dye into the air or onto the fingers of users.

Accordingly, there is still a need for development of improved near infra-red absorbers.

It has now been found that the solubility of bis (benzchalcopyrylium) squarylium and croconylium dyes in semi-polar solvents and plastics can be substantially improved by providing, on at least one of the benzchalcopyrylium nuclei, a 2-substituent in which a non-aromatic carbon atom is bonded directly to the benzchalcopyrylium nucleus.

SUMMARY OF THE INVENTION

This invention provides a dye comprising an inner salt of a compound of the formula:

wherein:

Q$^1$ is a 4-(benz[b]-4H-pyrylium)methylidene, 4-(benz[b]-4H-thiopyrylium)methylidene or 4-(benz[b]-4H-selenopyrylium)methylidene grouping;

Z is a 1,3-(2-hydroxy-4-oxo-2-cyclobutylidene) hydroxide or 1,3-(2-hydroxy-4,5-dioxo-2-cyclopentylidene) hydroxide ring; and Q$^2$ is a 4-(benz[b]-4H-pyran-4-ylidene)methyl, 4-(benz[b]-4H-thiopyran-4-ylidene)methyl or 4-(benz[b]-4H-selenopyran-4-ylidene)methyl grouping;

wherein at least one of the groupings Q$^1$ and Q$^2$ carries at its 2-position (by benzpyran/benzpyrylium numbering) a substituent in which a non-aromatic carbon atom is bonded directly to the benzpyrylium, benzthiopyrylium or benzselenopyrylium nucleus, subject to the proviso that if this 2-substituent contains an aromatic nucleus, this aromatic nucleus is not conjugated with the benzpyrylium, benzthiopyrylium or benzselenopyrylium nucleus to which it is attached. It should be noted that, in the dyes of the present invention, the (or each) 2-substituent may comprise a phenyl or other aromatic nucleus provided that this nucleus is separated from the benzchalcopyrylium nucleus by at least one sp$^3$ carbon atom (or another saturated atom) so that the aromatic nucleus is not conjugated with the benzchalcopyrylium nucleus. In a preferred group of these dyes, said one of the groupings Q$^1$ and Q$^2$ carries at its 7-position an alkoxy or alicyclyloxy group.

Unless otherwise stated, all references hereinafter to positions of substitution refer to the position of the substituent on the benzpyran or benzpyrylium nucleus to which the substituent is attached.

Preferred 2-substituents include substituted and unsubstituted alkyl and cycloalkyl groups.

Preferred dyes of this invention are those of the formula:

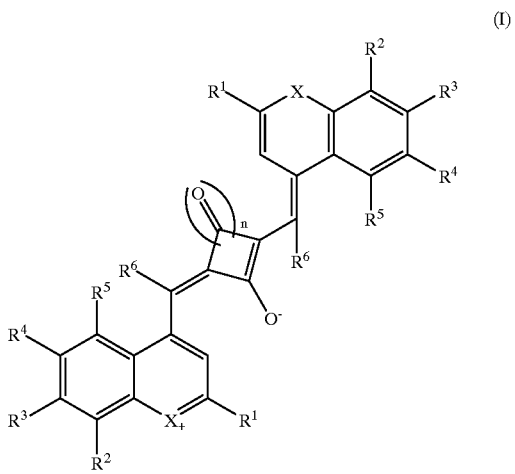

in which:
n is 1 or 2;
each X independently is an oxygen, sulfur or selenium atom;
each R$^1$ independently is an alkyl, alkenyl, alkynyl or alicyclic group;
each R$^2$ independently is a hydrogen atom, an alkyl group containing not more than about 8 carbon atoms or a halogen atom;
each R$^4$ independently is a hydrogen atom, an alkyl group containing not more than about 8 carbon atoms, an alkoxy, acyloxy, silyloxy or alicyclyloxy group or a halogen atom;
each R$^5$ independently is a hydrogen atom, an alkyl group containing not more than about 8 carbon atoms, a halogen atom, or an alkoxy group containing not more than about 12 carbon atoms;
each R$^6$ independently is a hydrogen atom or an alkyl group containing not more than about 6 carbon atoms; and
each R$^3$ independently is a hydrogen atom, an alkyl group containing not more than about 8 carbon atoms, or a group in which an element of Group 5A, 6A or 7A is bonded directly to the benzpyrylium nucleus, subject to the proviso that when said element is of Group 5A or 6A, R$^3$, together with one or both of R$^2$ and R$^4$ may comprise at least one saturated heterocyclic ring containing said element of Group 5A or 6A, this saturated heterocyclic ring optionally being fused to the phenyl ring of the associated nucleus.

This invention also provides a process for the preparation of a dye of the invention, which process comprises condensing two moles of a corresponding 4-R$^7$-benzpyrylium, -thiobenzpyrylium or -selenobenzpyrylium compound (in which R$^7$ is an alkyl group containing from 1 to about 7 carbon atoms and having at least two hydrogen atoms on the carbon atom a to the pyrylium, thiopyrylium or selenopyrylium ring) with squaric acid, or with a salt of croconic acid.

This invention also provides a process for generating heat in a medium comprising a dye of the invention, which process comprises exposing at least part of the medium to infra-red electromagnetic radiation of a frequency absorbed by the dye, whereby the electromagnetic radiation is absorbed by the dye and heat is generated within the parts of the medium exposed to the radiation.

In one such process, the medium further comprises a thermally sensitive material capable of undergoing a color change upon exposure to heat, the medium is exposed imagewise to the radiation, and the heat generated by the dye is sufficient to effect a color change in the thermally sensitive material, whereby an image is formed in the medium.

In a second such process, the medium comprises one layer of a multi-layer structure, this structure further comprising a support layer disposed on one side of the medium and a colored layer adhering to the opposed side of the medium, and wherein the heat generated on exposure of the dye to actinic radiation causes increased adhesion of the colored layer to the support layer, such that upon application of a peeling force to the colored layer, the colored layer will peel from the support layer in areas which have not been exposed to the radiation, but in areas which have been exposed to radiation the colored layer will remain attached to the support layer.

In a third such process, the heat generation causes a visually perceptible change in the medium so the medium forms an optical recording element.

Thus, this invention provides a recording element in which information can be recorded and read optically, which recording element comprises a supporting plate bearing a recording layer comprising a dye of the present invention.

This invention also provides a process for the preparation of a dye of the invention, which process comprises condensing two moles of a corresponding 4-exo-methylenebenzpyran, -thiobenzpyran or -selenobenzpyran with squaric acid.

Finally, this invention provides a chromone of the formula:

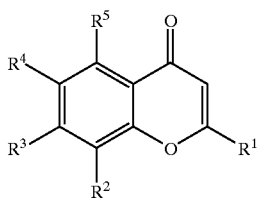

in which:

$R^1$ is an alkyl, alkenyl, alkynyl or alicyclic group;

$R^2$ is a hydrogen atom, an alkyl group containing not more than about 8 carbon atoms or a halogen atom;

each $R^4$ independently is a hydrogen atom, an alkyl group containing not more than about 8 carbon atoms, an alkoxy, acyloxy, silyloxy or alicyclyloxy group or a halogen atom;

$R^5$ is a hydrogen atom, an alkyl group containing not more than about 8 carbon atoms, a halogen atom, or an alkoxy group containing not more than about 12 carbon atoms; and $R^3$ is a hydrogen atom, an alkyl group containing not more than about 8 carbon atoms, or a group in which an element of Group 5A, 6A or 7A is bonded directly to the benzpyrylium nucleus, subject to the proviso that when said element is of Group 5A or 6A, $R^3$, together with one or both of $R^2$ and $R^4$ may comprise at least one saturated heterocyclic ring containing said element of Group 5A or 6A, this saturated heterocyclic ring optionally being fused to the phenyl ring of the associated nucleus.

DETAILED DESCRIPTION OF THE INVENTION

Figure 1:
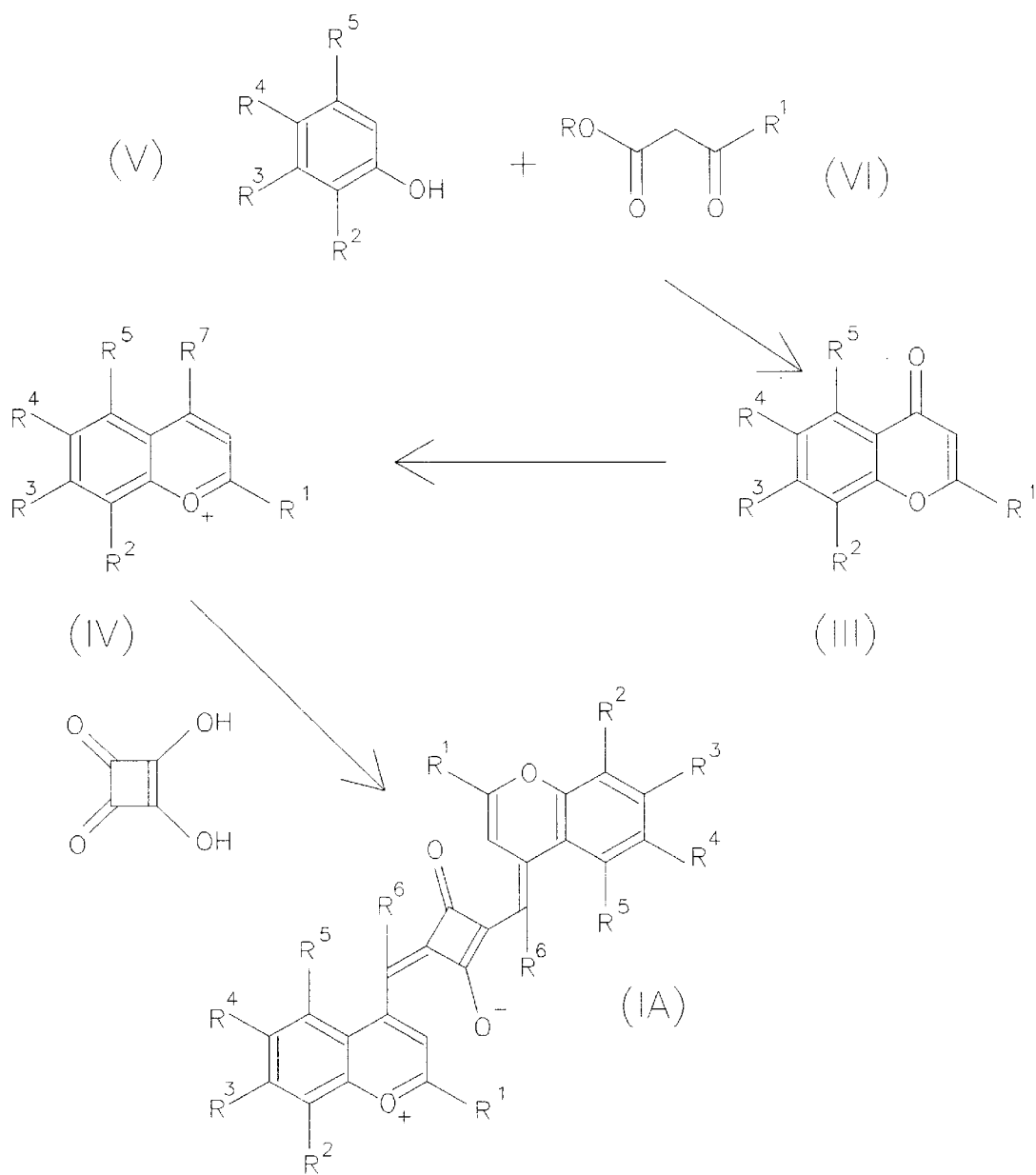
FIG. 1 of the accompanying drawings shows a first synthetic route which may be used to produce the dyes of the present invention.

As already mentioned, the present invention provides a dye comprising an inner salt of a compound of the formula:

$$Q^1{=}Z{-}Q^2$$

wherein:

$Q^1$ is a 4-(benz[b]-4H-pyrylium)methylidene, 4-(benz[b]-4H-thiopyrylium)methylidene or 4-(benz[b]-4H-selenopyrylium)methylidene grouping;

Z is a 1,3-(2-hydroxy-4-oxo-2-cyclobutylidene) hydroxide or 1,3-(2-hydroxy-4,5-dioxo-2-cyclopentylidene) hydroxide ring; and $Q^2$ is a 4-(benz[b]-4H-pyran-4-ylidene)methyl, 4-(benz[b]-4H-thiopyran-4-ylidene)methyl or 4-(benz[b]-4H-selenopyran-4-ylidene)methyl grouping;

wherein at least one of the groupings $Q^1$ and $Q^2$ carries at its 2-position a substituent in which a non-aromatic carbon atom is bonded directly to the benzpyrylium, benzthiopyrylium or benzselenopyrylium nucleus, subject to the proviso that if this 2-substituent contains an aromatic nucleus, this aromatic nucleus is not conjugated with the benzpyrylium, benzthiopyrylium or benzselenopyrylium nucleus to which it is attached. These dyes are useful as infra-red absorbers.

The nomenclature used herein for the dyes of the invention is that used by Chemical Abstracts. However, in view of the difficulty of naming the dyes, it is believed that some explanation of this nomenclature may be helpful. A typical dye of the present invention will be written herein as:

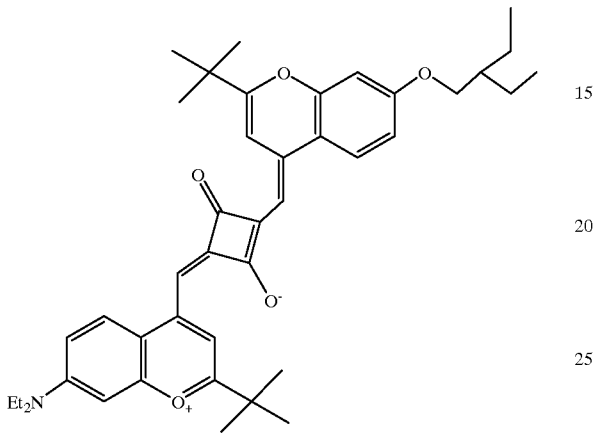

Under substantial neutral conditions, such as in the polymeric binders used in most thermal imaging media, this dye is believed to exist substantially in a zwitterionic form, which is of course a resonance hybrid of the formula given above and:

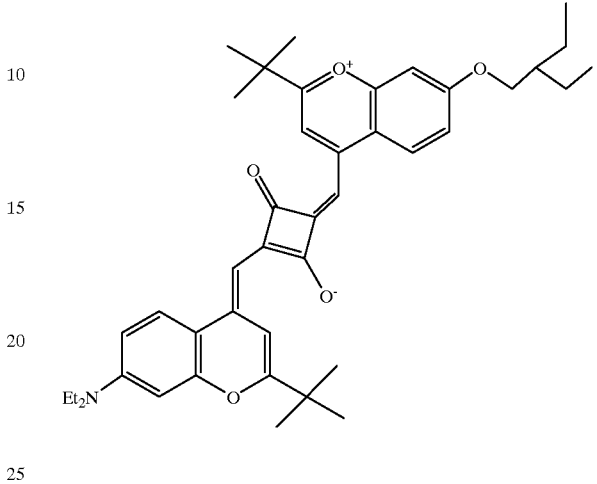

together with contributions from other resonance forms. Although the dye is actually isolated in an anhydro form, it is named as the hypothetical hydroxide:

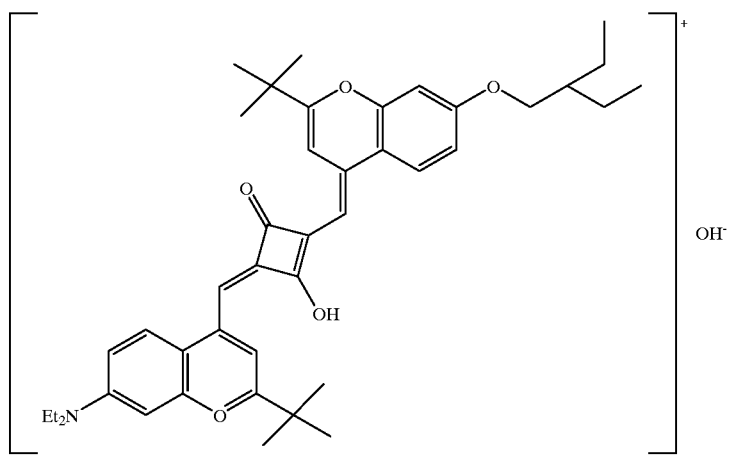

and is thus named 4-[[3-[7-(2-ethylbutoxy)-2-(1,1-dimethylethyl)-(benz[b]-4H-pyran-4-ylidene)methyl]-2-hydroxy-4-oxo-2-cyclobuten-1-ylidene]methyl]-7-diethylamino2-(1,1-dimethylethyl)-benz[b]pyrylium hydroxide inner salt.

The dyes of the present invention may be cationic, anionic or non-ionic. When neither of the groupings $Q^1$ and $Q^2$ carries any charged substituents, the bis (benzchalcopyrylium) squarylium or croconylium moiety (hereinafter referred to simply as the "dye moiety") is uncharged, and hence the dye is non-ionic. However, if either of the groupings $Q^1$ and $Q^2$ carries a negatively or positively charged group (for example a —COO— or —SO$_3$ group), the dye will be anionic or cationic respectively, and will be associated with a counterion.

When such a counterion is present, it may be any counterion which is not incompatible with the dye moiety and which thus provides a stable salt. The choice of counterion may be important in ensuring the solubility of the dye in various media, and reducing or preventing aggregation of the dye; minimizing aggregation of the dye is highly desirable since such aggregation can significantly reduce the apparent extinction coefficient of the dye in polymeric media. It may often be found convenient, for synthetic reasons, to prepare a desired dye moiety with one counterion and thereafter to effect a counterion exchange to form a different salt of the same dye moiety.

In the present dyes, the (or each) 2-substituent may have, directly attached to the benzchalcopyrylium nucleus, a non-aromatic sp, $sp^2$ or $sp^3$ carbon atom. The (or each) 2-substituent can contain a phenyl or other aromatic nucleus provided that the aromatic nucleus is not conjugated with the benzchalcopyrylium nucleus; thus, for example, a 3-phenylpropyl group can be used as the (or each) 2-substituent. The 2-substituent may be, for example:

a. an alkyl group, for example an isopropyl, sec-butyl, tert-butyl, 2-ethyl-2-methylbutyl or 2,2-dimethylbutyl group;
b. an alkenyl group, for example a vinyl group;
c. an alkynyl group, for example an ethyne group;
d. a cycloalkyl group, for example a cyclohexyl group;
e. a cycloalkenyl group, for example a cyclohexenyl group;
f. a polycyclic saturated hydrocarbon group, for example a decalinyl or adamantyl group;
g. a polycyclic, ethylenically unsaturated hydrocarbon group, for example a 6,6-dimethylbicyclo[3.1.1]hept-2-en-2-yl or bicyclo[2.2.1]hept-2-en-5-yl group;
h. any of the foregoing substituents substituted with aryl, halo, cyano, amino or oxo groups, or containing ether, amine or urethane linkages.
i. a saturated heterocyclyl group which is linked to the benzchalcopyrylium nucleus by a carbon atom, for example a 2-piperidinyl or 2-morpholinyl group However, preferably the (or each) 2-substituent is an alkyl or cycloalkyl group. It is desirable that the carbon atom of the (or each) 2-alkyl or cycloalkyl group which is directly attached to the benzchalcopyrylium nucleus carry not more than one hydrogen atom, and preferably this carbon atom does not have any hydrogen atoms bonded directly thereto. α-Hydrogen atoms on the alkyl group are active hydrogens and may cause undesirable side reactions during the condensation used to produce the dye (as discussed in more detail below).

To ensure high solubility of the dyes of the present invention in polymeric media such as those typically used as binders in commercial imaging media, it has been found desirable to provide at least one, and preferably both, of the benzchalcopyrylium nuclei with two substituents, each of which extends substantially out of the plane of the nucleus. Thus, for example, among the various possible 2-substituents on the dyes, the effectiveness in promoting solubility of the dye is believed to be:

methyl<<ethyl<isopropyl<tertiary butyl.

Accordingly, the 2-substituent should contain at least two carbon atoms. Similarly, when the nucleus bears a 6-alkoxy substituent, is desirable that this not be a methoxy group, but an alkoxy, alkenyloxy, acyloxy, silyloxy (for example trialkylsilyloxy) or alicyclyloxy group, having a bulkier alkyl group and containing at least three carbon atoms, for example a sec-butoxy or t-butoxy group. Finally, among the 7-disubstituted amino dyes of the present invention, it has been found that dimethylamino groups (which do not extend substantially out of the plane of the nucleus) are relatively ineffective in promoting dye solubility, whereas diethylamino groups (which may extend substantially out of the plane of the nucleus) are more effective in promoting dye solubility.

To maximize the solubility of the dye, it is preferred that each of the benzchalcopyrylium nuclei carry a substituted or unsubstituted 2-alkyl or cycloalkyl group. Although the 2-alkyl and cycloalkyl groups may bear various substituents, for example halogen atoms, for ease of synthesis it is generally preferred that the 2-alkyl and cycloalkyl groups be unsubstituted. Specific preferred 2-substituents are isopropyl, sec-butyl, tert-butyl, 2-ethyl-2-methylbutyl, 2,2-dimethylbutyl, cyclohexyl, 6,6-dimethylbicyclo[3.1.1]hept-2-en-2-yl, bicyclo[2.2.1]hept-2-en-5-yl and adamantyl groups.

The benzchalcopyrylium nuclei of the dyes of the present invention can bear a variety of substituents. It has been found that the nature of the substituents $R^3$ has substantial effects on both the solubility and the wavelength of maximum infra-red absorption ($\lambda_{max}$), as measured in dichloromethane, of the dye. For example, in the compounds of Formula I in which each X is an oxygen atom, n is 1, each $R^1$ is a cyclohexyl group and each $R^2$, $R^4$ and $R^5$ is a hydrogen atom, the compound in which $R^3$ is hydrogen has $\lambda_{max}$=770 nm, while the corresponding compound in which $R^3$ is methoxy has $\lambda_{max}$=768 nm, and the corresponding compound in which $R^3$ is diethylamino has $\lambda_{max}$=804 nm. Thus, providing a 7-alkoxy substituent may shift $\lambda_{max}$ to slightly shorter wavelength, while providing a 7-diethylamino group shifts $\lambda_{max}$ to longer wavelengths by at least 30 nm.

With regard to solubility, it has been found that, in the compounds of Formula I in which each $R^1$ is tertiary butyl, each X is an oxygen atom, n is 1, and no substituents other than the 7-substituent are present on the benzpyrylium nuclei, the relative solubilities for the various 7-substituents are: N(CH$_3$)$_2$≈"julolidine"<<morpholino≈indolinyl≈piperidino<N (C$_2$H$_5$)$_2$, where "julolidine" indicates the compound in which $R^2$, $R^3$ and $R^4$ together form an —N(CH$_2$CH$_2$)$_2$ group. Thus, one way to provide the two out-of-plane substituents desirable for high dye solubility (as discussed above) is to provide, at the 7-position of one or both of the benzchalcopyrylium nuclei, a substituent which can extend substantially out of the plane of the nucleus to which it is attached.

Accordingly, desirably, at least one of the nuclei carries at the 7-position a substituent in which an element of Group 5A or 6A of the Periodic Table is directly connected to the nucleus, subject to the proviso that this 7-substituent may comprise at least one saturated ring containing this element of Group 5A or 6A, this saturated ring optionally being fused to the benzene ring of the associated nucleus. Depending upon the wavelength at which maximum infra-red absorption is desired, preferred 7-substituents are alkoxy groups containing not more than about 12 carbon atoms, and disubstituted amino or disubstituted phosphino groups, wherein each of the substituents on the (or each) disubstituted group comprises an alkyl group containing not more than about 6 carbon atoms (but preferably containing at least 2 carbon atoms), or the two substituents on any one disubstituted group together form, with the nitrogen or phosphorus atom thereof, a heterocyclic ring system, this ring system optionally being fused to the nucleus which carries the disubstituted amino or phosphino substituent.

Especially preferred are dyes in which each of the nuclei carries a 7-disubstituted amino group, or one of the nuclei carries a 7-disubstituted amino group and the other nucleus carries one alkoxy group at the 7-position or two alkoxy groups at the 5- and 7-positions. Disubstituted amino groups are desirable to avoid the presence of active hydrogen atoms which might cause undesirable side-reactions in the condensation used to prepare the present dyes, as discussed in more detail below. The substituents on the amino nitrogen may be two separate substituents, for example two separate alkyl groups, preferably alkyl groups containing not more than about 4 carbon atoms each, or phenyl groups. Alternatively, the two substituents together may form, with the nitrogen, a heterocyclic ring, for example a piperidino ring. Such a heterocyclic ring may contain an additional heteroatom (and thus, for example, the heterocyclic ring may be a morpholine ring), and/or be fused to another saturated or unsaturated ring; for example, the disubstituted amino group may be an N-indolinyl group. Finally, one or both of the substituents on the nitrogen may be divalent groups with their ends remote from the nitrogen attached to the nucleus carrying the nitrogen, so that the disubstituted amino group becomes part of one or two heterocyclic rings fused to the nucleus. For example, in the disubstituted amino group, one substituent could be a methyl group, while the other could be a trimethylene group having one end attached to a ring carbon ortho to nitrogen atom, so that the nitrogen atom, the methyl group, the trimethylene group and two carbon atoms of the benzene ring of the nucleus form an N-methylpiperidino grouping fused to the benzene ring. Also, for example, the disubstituted amino group could be an —N[—(CH$_2$)$_3$-]$_2$ group in which the ends of the trimethylene groups remote from the nitrogen atom are joined to positions of the nucleus ortho to the carbon atom carrying the nitrogen atom, so that the —N[—(CH$_2$)$_3$-]$_2$ group and the benzene ring of the nucleus together form a julolidine ring system.

Disubstituted phosphino groups may bear all the types of substituents already discussed above with reference to disubstituted amino groups. Furthermore, the nucleus may carry alkoxy substituents or modified alkoxy substituents in which one carbon atom is bonded to a phenyl carbon ortho to that carrying the oxygen atom, and the term "alkoxy" herein is to be construed accordingly. For example, one of the alkoxy groups could be an ethyleneoxy group having its β-carbon bonded to a benzene ring carbon ortho to that carrying the oxygen atom, so that the ethyleneoxy group and two of the carbons of the nucleus form a dihydrofuran ring.

The nuclei may also carry alkoxy groups at other than the 7-position; for example, each of the nuclei could bear two alkoxy substituents at the 5- and 7-positions.

Another preferred group of dyes of the present invention are those in which at least one benzpyrylium nucleus carries at its 6-position an alkoxy, alkenyloxy, acyloxy, silyloxy or alicyclyloxy group; the alkyl, alkenyl, cycloalkyl or alicyclic portion of this group may be any of the groups (other than alkynyl) mentioned above as the 2-substituent. Desirably the 6-substituent is an alkoxy or cycloalkoxy group, preferably a branched chain alkoxy group, most desirably such a group containing from about 3 to about 8 carbon atoms. Specific preferred branched chain alkoxy groups are propoxy, but-2-oxy and 2-ethylbutoxy groups. Preferably, the benzene ring of the benzpyrylium nucleus bears no substituents other than the 6-substituent. It has been found that providing such a branched-chain 6-substituent increases the solubility of the dye in polymeric media. The presence of such a 6-branched chain alkoxy group also shifts the infra-red absorption of the dye about 20 nm longer, as compared to the corresponding dye which lacks the 6-substituent, and thus the addition of such a 6-substituent is useful in "tuning" the absorption of the dye in applications, such as the thermal imaging medium shown in FIG. 6, in which dyes absorbing at differing wavelengths are required. In addition, such 6-substituted dyes tend to have relatively low visible extinction and are thus advantageous for use in applications (such as thermal imaging media) where visible absorption is undesirable. It is believed (although the invention is in no way limited by this belief) that the advantageous solubility properties of the aforementioned 6-substituted dyes are due at least in part to the 6-substituent extending out of the plane of the aromatic nucleus to which it is attached, and thus the choice of a 6-substituent may be influenced by the stereochemistry of the substituent, not merely its chemical nature. Thus, another way to provide the two out-of-plane substituents desirable for high dye solubility (as discussed above) is to provide, at the 6-position of one or both of the benzchalcopyrylium nuclei, an alkoxy substituent which can extend substantially out of the plane of the nucleus to which it is attached. Specifically, the bis(6-(but-2-oxy)-2-t-butylbenzthiopyrylium) dye prepared in Example 69 below has been found to have a highly desirable combination of very long absorption wavelength (about 900 nm) and low visible absorption.

The dyes of the present invention may also carry substituents on the meso carbon atoms, that is the carbon atoms between the squarylium or croconylium nucleus and the benzchalcopyrylium nuclei. Such meso substituents may be, for example, alkyl groups containing from 1 to about 6 carbons atoms. Preferably, the meso carbon atoms are unsubstituted or carry a methyl substituent.

The preferred groups of dyes of Formula I have already been defined above, and the preferred values of the 2-substituent $R^1$ have already been described. In general, the compounds of Formula I in which each X is an oxygen atom are preferred for reasons of cost and ease of synthesis. Especially preferred are the compounds of Formula I in which each X is an oxygen atom and n is 1, that is to say compounds of the formula:

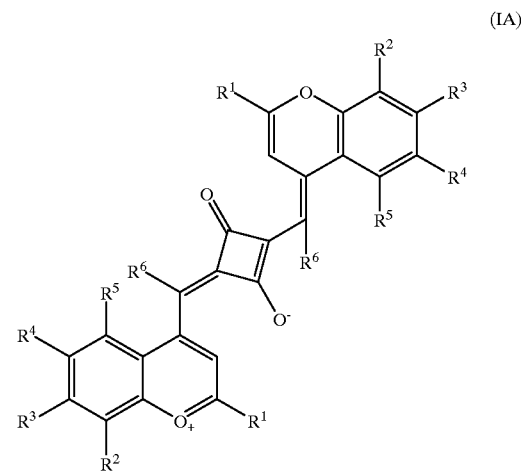

(IA)

Unless $R^2$ and $R^4$ are required to form part of divalent substituents on an amino or phosphino group, or part of an alkoxy group, both groups are conveniently hydrogen atoms, although either or both may be halogen atoms. Similarly, unless $R^5$ is an alkoxy group, it is conveniently a hydrogen atom, although $R^5$ may be a halogen atom. A specific preferred alkoxy group is the methoxy group. Each group $R^6$ is preferably a hydrogen atom or a methyl group.

In the dyes of Formula I, desirably each of the groups $R^3$ independently is:

(a) an alkoxy group containing not more than about 12 carbon atoms, or a disubstituted amino or disubstituted phosphino group wherein each of the substituents on the (or each) disubstituted group comprises an alkyl group containing not more than about 6 carbon atoms, or the two substituents on any one disubstituted group together form, with the nitrogen or phosphorus atom thereof, a saturated heterocyclic ring containing the nitrogen or phosphorus atom and optionally an oxygen atom, this saturated heterocyclic ring optionally being fused to one or two benzene rings;

(b) together with one of the groups $R^2$ and $R^4$ on the same benzene ring, a disubstituted amino or disubstituted phosphino group wherein one of the substituents comprises an alkyl group containing not more than about 6 carbon atoms and the other substituent comprises a polymethylene group, the end of the polymethylene group remote from the nitrogen or phosphorus atom being joined to the 6- or 8-position of the nucleus carrying the nitrogen atom, so that the nitrogen atom, the polymethylene group, and two of the carbons of the nucleus form a heterocyclic ring, the polymethylene group optionally being fused to an alicyclic or benzene ring; or (c) together with both the groups $R^2$ and $R^4$ on the same benzene ring, a disubstituted amino or disubstituted phosphino group wherein each of the substituents comprises a polymethylene group, the ends of the polymethylene groups remote from the nitrogen or phosphorus atom being joined to the 6- and 8-positions of the nucleus carrying the nitrogen atom, so that the nitrogen atom, the two polymethylene groups, and three of the carbons of the nucleus form two heterocyclic rings, one or both of the polymethylene groups optionally being fused to an alicyclic or benzene ring.

Preferably, each of the groups $R^3$ is a disubstituted amino group, or one of the groups $R^3$ is a 7-disubstituted amino group and the other is an alkoxy group; specific preferred disubstituted amino groups are dimethylamino, diethylamino, piperidino, morpholino and indolinyl groups. Such disubstituted amino groups assist in providing high absorptions at about 800–820 nm in solution, and at slightly longer wavelengths in plastic films; absorptions at about these wavelengths are highly desirable with present infra-red lasers. Alternatively, when the $R^2$, $R^3$ and $R^4$ groups on the same ring together form a disubstituted amino group, this group is preferably an $—N[—(CH_2)_3-]_2$ group.

Whether a squarylium or croconylium dye is used in the process of the present invention will depend largely upon the wavelength at which absorption is desired, since the croconylium dyes absorb at substantially longer wavelengths that the corresponding squarylium dyes. For examples, the squarylium dye of Formula I in which each $R^1$ is a tertiary butyl group, each $R^3$ is a diethylamino group, and each $R^2$, $R^4$, $R^5$ and $R^6$ is a hydrogen atom has its main infra-red absorption peak at 808 nm, while the corresponding croconylium dye has its absorption at 956 nm, both in dichloromethane. In processes where low visible absorption is required and the medium used does not restrict the absorption wavelength, the squarylium dyes tend to be preferred over the croconylium dyes, since the former generally have lower visible absorptions.

Specific preferred squarylium dyes of Formula I are those in which each X is an oxygen atom and:

a. each $R^1$ is a tertiary butyl group, each $R^3$ is a diethylamino group, and each $R^2$, $R^4$, $R^5$ and $R^6$ is a hydrogen atom, namely 4-[[3-[7-diethylamino-2-(1,1-dimethylethyl)-(benz[b]-4H-pyran-4-ylidene)methyl]-2-hydroxy-4-oxo-2-cyclobuten-1-ylidene]methyl]-7-diethylamino-2-(1,1-dimethylethyl)-benz[b]pyrylium hydroxide inner salt;

b. each $R^1$ is a tertiary butyl group, each $R^3$ is a dimethylamino group, and each $R^2$, $R^4$, $R^5$ and $R^6$ is a hydrogen atom, namely 4-[[3-[7-dimethylamino-2-(1,1-dimethylethyl)-(benz[b]-4H-pyran-4-ylidene)methyl]-2-hydroxy-4-oxo-2-cyclobuten-1-ylidene]methyl]-7-dimethylamino-2-(1,1-dimethylethyl)-benz[b]pyrylium hydroxide inner salt;

c. each $R^1$ is a tertiary butyl group, each $R^3$ is an indolinyl group, and each $R^2$, $R^4$, $R^5$ and $R^6$ is a hydrogen atom, namely 4-[[3-[7-indolinyl-2-(1,1-dimethyl ethyl)-(benz[b]-4H-pyran-4-ylidene)methyl]-2-hydroxy-4-oxo-2-cyclobuten- 1-ylidene]methyl]-7-indolinyl-2-(1,1-dimethylethyl)-benz[b]pyrylium hydroxide inner salt;

d. each $R^1$ is a tertiary butyl group, each $R^3$ is a morpholino group, and each $R^2$, $R^4$, $R^5$ and $R^6$ is a hydrogen atom, namely 4-[[3-[7-morpholino-2-(1,1-dimethylethyl)-(benz[b]-4H-pyran-4-ylidene)methyl]-2-hydroxy-4-oxo-2-cyclobuten-1-ylidene]methyl]-7-morpholino-2-(1,1-dimethylethyl)-benz[b]pyrylium hydroxide inner salt;

e. each $R^1$ is a tertiary butyl group, each $R^3$ is a piperidino group, and each $R^2$, $R^4$, $R^5$ and $R^6$ is a hydrogen atom, namely 4-[[3-[7-piperidino-2-(1,1-dimethylethyl)-(benz[b]-4H-pyran-4-ylidene)methyl]-2-hydroxy-4-oxo-2-cyclobuten-1-ylidene]methyl]-7-piperidino-2-(1,1-dimethylethyl)-benz[b]pyrylium hydroxide inner salt;

f. each $R^1$ is a cyclohexyl group, each $R^3$ is a diethylamino group, and each $R^2$, $R^4$, $R^5$ and $R^6$ is a hydrogen atom, namely 4-[[3-[2-cyclohexyl-7-diethylamino-[benz[b]-4H-pyran-4-ylidene)methyl]-2-hydroxy-4-oxo-2-cyclobuten-1-ylidene]methyl]-2-cyclohexyl-7-diethylaminobenz[b]pyrylium hydroxide inner salt dye;

g. each $R^1$ is a tertiary butyl group and each $R^2$, $R^3$, $R^4$, $R^5$ and $R^6$ is a hydrogen atom, namely 4-[[3-[2-[1,1-dimethylethyl]-[benz[b]-4H-pyran-4-ylidene]methyl]-2-hydroxy-4-oxo-2-cyclobuten-1-ylidene]methyl]-2-[1,1-dimethylethyl]benz[b]pyrylium hydroxide inner salt dye;

h. in each benzpyrylium nucleus, $R^1$ is a tertiary butyl group, $R^5$ and $R^6$ are each a hydrogen atom, and $R^2$, $R^3$ and $R^4$ together form an $—N[—(CH_2)_3-]_2$ group in which the ends of the trimethylene groups remote from the nitrogen atom are joined to the benzpyrylium nucleus, so that the $—N[—(CH_2)_3-]_2$ group and the phenyl ring of the benzpyrylium nucleus together form a julolidine ring system, namely 9-[[3-[11-[1,1-dimethylethyl] [1]benzopyrano[6,7,8-ij]-2,3,6,7-tetrahydro-1H,5H-quinolizin-9-ylidene]methyl]-2-hydroxy-4-oxo-2-cyclobuten-1-ylidene]methyl- 11-[1,1-dimethylethyl] [1]benzopyrano[6,7,8-ij]-2,3,6,7-tetrahydro-1H,5H-quinolizinium hydroxide inner salt dye;

i. each $R^1$ is a 6,6-dimethylbicyclo[3.1.1]hept-2-en-2-yl group, each $R^3$ is a diethylamino group, and each $R^2$, $R^4$, $R^5$ and $R^6$ is a hydrogen atom, namely4-[[3-[2-[6,6-dimethylbicyclo[3.1.1]hept-2-en-2-yl]-7-diethylamino-(benz[b]-4H-pyran-4-ylidene)methyl]-2-hydroxy-4-oxo-2-cyclobuten-1-ylidene]methyl]-2-[6,6-dimethylbicyclo[3.1.1]hept-2-en-2-yl]-7-diethylaminobenz[b]pyrylium hydroxide inner salt dye;

j. each $R^1$ is a bicyclo[2.2.1]hept-2-en-5-yl group, each $R^3$ is a diethylamino group, and each $R^2$, $R^4$, $R^5$ and $R^6$ is a hydrogen atom, namely 4-[[3-[2-[bicyclo[2.2.1]hept-2-en-5-yl]-7-diethylamino-(benz[b]-4H-pyran-4-ylidene)methyl]-2-hydroxy-4-oxo-2-cyclobuten-1-ylidene]methyl]-2-[bicyclo[2.2.1]-hept-2-en-5-yl]-7-diethylaminobenz[b]pyrylium hydroxide inner salt dye;

k. each $R^1$ is a tertiary butyl group, each $R^3$ is a diethylamino group, each $R^2$, $R^4$ and $R^5$ is a hydrogen atom, and each $R^6$ is a methyl group, namely 4-[1-[3-[1-[7-diethylamino-2-[1,1-dimethylethyl]-(benz[b]-4H-pyran-4-ylidene]eth-1-yl]-2-hydroxy-4-oxo-cyclobuten-1-ylidene]eth-1-yl]-7-diethylamino-2-[1,1-dimethylethyl]benz[b]pyrylium hydroxide inner salt dye;

l. each $R^1$ is an adamantyl group, each $R^3$ is a morpholino group, each $R^2$, $R^4$ and $R^5$ is a hydrogen atom, and each $R^6$ is a methyl group, namely 4-[[3-[2-[1-adamantyl]-7-morpholino-(benz[b]-4H-pyran-4-ylidene)methyl]-2-hydroxy-4-oxo-2-cyclobuten-1-ylidene]methyl]-2-[1-adamantyl]-7-morpholinobenz[b]pyrylium hydroxide inner salt dye;

m. each $R^1$ is a cyclohexyl group, each $R^3$ is a methoxy group, and each $R^2$, $R^4$, $R^5$ and $R^6$ is a hydrogen atom, namely 4-[[3-[2-cyclohexyl-7-methoxy-(benz[b]-4H-pyran-4-ylidene)methyl]-2-hydroxy-4-oxo-2-cyclobuten-1-ylidene]methyl]-2-cyclohexyl-7-methoxybenz[b]pyrylium hydroxide inner salt dye; and n. each $R^1$ is a tertiary butyl group, each $R^2$, $R^4$, $R^5$ and $R^6$ is a hydrogen atom, one $R^3$ is a diethylamino group and the other is a 2-ethylbutoxy group, namely 4-[[3-[7-(2-ethylbutoxy)-2-(1,1-dimethylethyl)-(benz[b]-4H-pyran-4-ylidene)methyl]-2-hydroxy-4-oxo-2-cyclobuten-1-ylidene]methyl]-7-diethylamino-2-(1,1-dimethylethyl)-benz[b]pyrylium hydroxide inner salt.

Specific preferred croconylium dyes of Formula I are those in which each X is an oxygen atom and:

a. each $R^1$ is a tertiary butyl group, each $R^3$ and $R^5$ is a methoxy group, and each $R^2$, $R^4$ and $R^6$ is a hydrogen atom, namely 4-[[3-[5,7-dimethoxy-2-(1,1-dimethylethyl)-(benz[b]-4H-pyran-4-ylidene)methyl]-2-hydroxy-4,5-dioxo-2-cyclopenten-1-ylidene]methyl]-5,7-dimethyoxy-2-(1,1-dimethylethyl)-benz[b]pyrylium hydroxide inner salt;

b. each $R^1$ is a t-butyl group, each $R^3$ is a diethylamino group, and each $R^2$, $R^4$, $R^5$ and $R^6$ is a hydrogen atom, namely 4-[[3-[[7-diethylamino-2-[1,1-dimethylethyl]benz[b]-4H-pyran-4-ylidene]methyl]-2-hydroxy-4,5-dioxo-2-cyclopenten-1-ylidene]methyl]-7-diethylamino-2-[1,1-dimethylethyl]benz[b]pyrylium hydroxide inner salt dye; and c. each $R^1$ is a t-butyl group, each $R^3$ is a hydroxyl group, and each $R^2$, $R^4$, $R^5$ and $R^6$ is a hydrogen atom, namely 4-[[3-[[2-[1,1-dimethylethyl]-7-hydroxybenz[b]-4H-pyran-4-ylidene]methyl]-2-hydroxy-4,5-dioxo-2-cyclopenten-1-ylidene]methyl]-2-[1,1-dimethylethyl]-7-hydroxybenz[b]pyrylium hydroxide inner salt dye.

Another preferred croconylium dye of the present invention is that of Formula I in which each X is a sulfur atom, each $R^1$ is a tertiary butyl group, each $R^4$ is a methoxy group, and each $R^2$, $R^3$, $R^5$ and $R^6$ is a hydrogen atom, namely 4-[[3-[[2-[1,1-dimethylethyl]-6-methoxybenz[b]-4H-thiopyran-4-ylidene]methyl]-2-hydroxy-4,5-dioxo-2-cyclopent-1-ylidene]methyl]-2-[1,1-dimethylethyl]-6-methoxybenz[b]thiopyrylium hydroxide inner salt dye.

One specific preferred benzthiopyrylium dye of the present invention is that in which $Q^1$ is a 4-[2-[1,1-dimethylethyl]benz[b]-4H-thiopyran-4-ylium hydroxide] methylidene grouping, Z is a 1,3-(2-hydroxy-4-oxo-2-cyclobutylidene ring, and $Q^2$ is a 4-[2-[1,1-dimethylethyl] benz[b]-4H-thiopyran-4-ylidene]methyl grouping, namely 4-[[2-[1,1-dimethylethyl]benz[b]-4H-thiopyran-4-ylidene] methyl]-2-hydroxy-4-oxo-2-cyclobuten-1-ylidene]methyl]-2-[1,1-dimethylethyl]benz[b]thiopyrylium hydroxide inner salt dye.

Three especially preferred 6-alkoxybenz(thio)pyrylium dyes of the present invention are:

6-[but-2-oxy]-4-[[3-[[6-[but-2-oxy]-2-[1,1-dimethylethyl]benz[b]-4H-pyran-4-ylidene]methyl]-2-hydroxy-4-oxo-2-cyclobuten-1-ylidene]methyl]-2-[1,1-dimethylethyl]benz[b]pyrylium hydroxide inner salt;

6-[but-2-oxy]-4-[[3-[[6-[but-2-oxy]-2-[1,1-dimethylethyl]benz[b]-4H-thiopyran-4-ylidene] methyl]-2-hydroxy-4-oxo-2-cyclobuten-1-ylidene] methyl]-2-[1,1-dimethylethyl]benz[b]thiopyrylium hydroxide inner salt; and 6-[but-2-oxy]-4-[[3-[[6-[but-2-oxy]-2-[1,1-dimethylethyl]benz[b]-4H-pyran-4-ylidene]methyl]-2-hydroxy-4-oxo-2-cyclobuten-1-ylidene]methyl]-2-[1,1-dimethylethyl]benz[b]thiopyrylium hydroxide inner salt.

As illustrated in Examples 61–72 below, this triad of dyes can be prepared using a number of common intermediates, and the infra-red absorptions of this triad are spaced such that the triad is well adapted for use in a laser-imaged multicolor imaging medium of the type discussed below with reference to FIGS. 6 and 7.

As already mentioned, in the dyes of the present invention, the substituents $R^1$, $R^2$, $R^3$, $R^4$, $R^5$, and $R^6$ on one half of the dye molecule can be varied independently of the corresponding substituents on the other half of the molecule, i.e., the dye can be symmetric or asymmetric. One preferred process for the preparation of the squarylium dyes comprises condensing two moles of a corresponding 4-$R^7$-benzpyrylium compound with squaric acid. This condensation may be catalyzed with a base (conveniently quinoline in solution in an alkanol, for example butanol at reflux), or by a Brönsted or Lewis acid (for example a titanium tetrahalide, conveniently in dichloromethane). Similarly, the croconylium dyes can be synthesized by condensing two moles of a corresponding 4-$R^7$-benzpyrylium compound with a salt of croconic acid. The best salts for use in this synthesis vary with the exact nature of the substituents on the nuclei; among croconate salts which have been found useful are alkali metal salts, especially potassium croconate, tetrasubstituted ammonium salts, for example tetraethylammonium, and salts with tertiary amines, for example quinoline. It will be appreciated that, in either condensation, the group $R^7$ must contain one more carbon atom than the meso substituent $R^6$ desired in the final dye, since the α-carbon atom of $R^7$ forms the meso carbon atom in the final dye.

These processes may be used for the synthesis of both symmetric and asymmetric dyes of the invention; if an asymmetric dye is desired, a mixture of the two 4-$R^7$-benzpyrylium compounds is used. Since such a process inevitably produces three different products (two symmetrical dyes and the desired asymmetric dye), when an asymmetric squarylium dye is required, it is normally preferred to use the synthesis described in the aforementioned copending applications Ser. Nos. 07/696,222 and 08/052,212, and European Patent Application No. 92107574.3. As described in more detail below with reference to FIG. 4, this synthesis involves first preparing a squaric acid derivative of the formula:

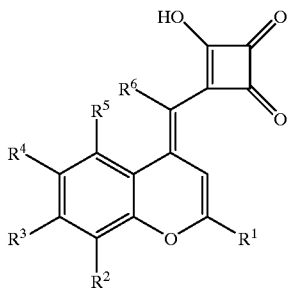

(II)

and then condensing this squaric acid derivative with one mole of the appropriate 4-$R^7$-benzpyrylium compound to produce the final dye. The final condensation may be catalyzed by a base, for example quinoline, or by a Lewis acid, for example titanium tetrachloride.

FIG. 1 shows a first synthetic route for preparing a bis(benzpyrylium) squarylium dye (IA) of the invention from the corresponding substituted phenol (V), in which $R^2$, $R^3$, $R^4$, and $R^5$ are as defined above with reference to Formula I. This phenol is first condensed with the appropriate β-ketoester (VI), in which $R^1$ is as defined above with reference to Formula I and R is conveniently an alkyl group, typically a methyl group, to produce a 4-oxobenz-4H-pyran or chromone (III). (The term "β-ketoester" is used herein to include any compound having a tautomer of the Formula VI, even though the compound normally exists wholly or partially in a different tautomer, such as an enol form.) This condensation may be effected by heating the two reactants together, typically at about 200° C. The chromone (III) is then treated with an organometallic alkylating agent, preferably an alkyl Grignard reagent, for example methyl magnesium bromide, and then subjected to acid-mediated dehydration with, for example, fluoboric acid, to produce the corresponding 4-$R^7$-benzpyrylium salt (IV). This salt (IV) is then condensed with squaric acid under basic or acidic conditions as described above, to give the final dye (IA).

When this condensation is to be used to produce a bis(benzthiopyrylium) dye rather than a bis(benzpyrylium) dye, it has been found advantageous to include a radical inhibitor in the final condensation, since the presence of such a radical inhibitor improves the yield. A preferred radical inhibitor is triphenylmethane. The presence of a radical inhibitor is unnecessary when a bis(benzpyrylium) dye is being prepared.

The benzpyrylium salt (IV) will of course contain the counterion of the acid used to produce it. Since the salt is intended for use in the production of the dye (IA), which does not contain the counterion, the choice of counterion is normally of little importance. However, if it is desired to store the salt (IV) for a long period, it may be desirable to convert this salt to one with a different counterion; the necessary counterion exchange can be effected by conventional techniques which are well-known to those skilled in the synthesis of pyrylium dyes.

In certain cases, it may be advantageous to modify the above synthesis in order to vary the substituent $R^1$. For example, if it is desired to produce a dye in which $R^1$ is an unsaturated group containing an α,β-ethylenic linkage, one could first prepare a chromone of Formula III having $R^1$ a methyl group and then perform an aldol condensation between this chromone and an appropriate aldehyde to form the desired unsaturated group $R^1$. A condensation of this type is illustrated in Example 43 below. Other similar methods of modifying the group $R^1$, for example to introduce acetylenic linkages therein, will readily be apparent to those skilled in the art.

Other substituents on the benzpyrylium nucleus may also, of course, be modified during the synthesis. In particular, when preparing the preferred 6-alkoxy and -alicyclyloxy dyes of the present invention, it is convenient to use a hydroquinone as the starting material (V), thus preparing a 6-hydroxychromone (III). This 6-hydroxychromone may then be converted to the corresponding 6-alkoxychromone by treatment with a conventional alkylating agent (for example, an alkyl halide) in the presence of a base. An alkylation of this type is described in Example 62 below.

Croconylium dyes can be produced in exactly the same manner except that a croconate salt is used instead of squaric acid in the final step. Processes for the preparation of the thio- and seleno-analogues of the salt (III) are described in the literature.

Figure 2:
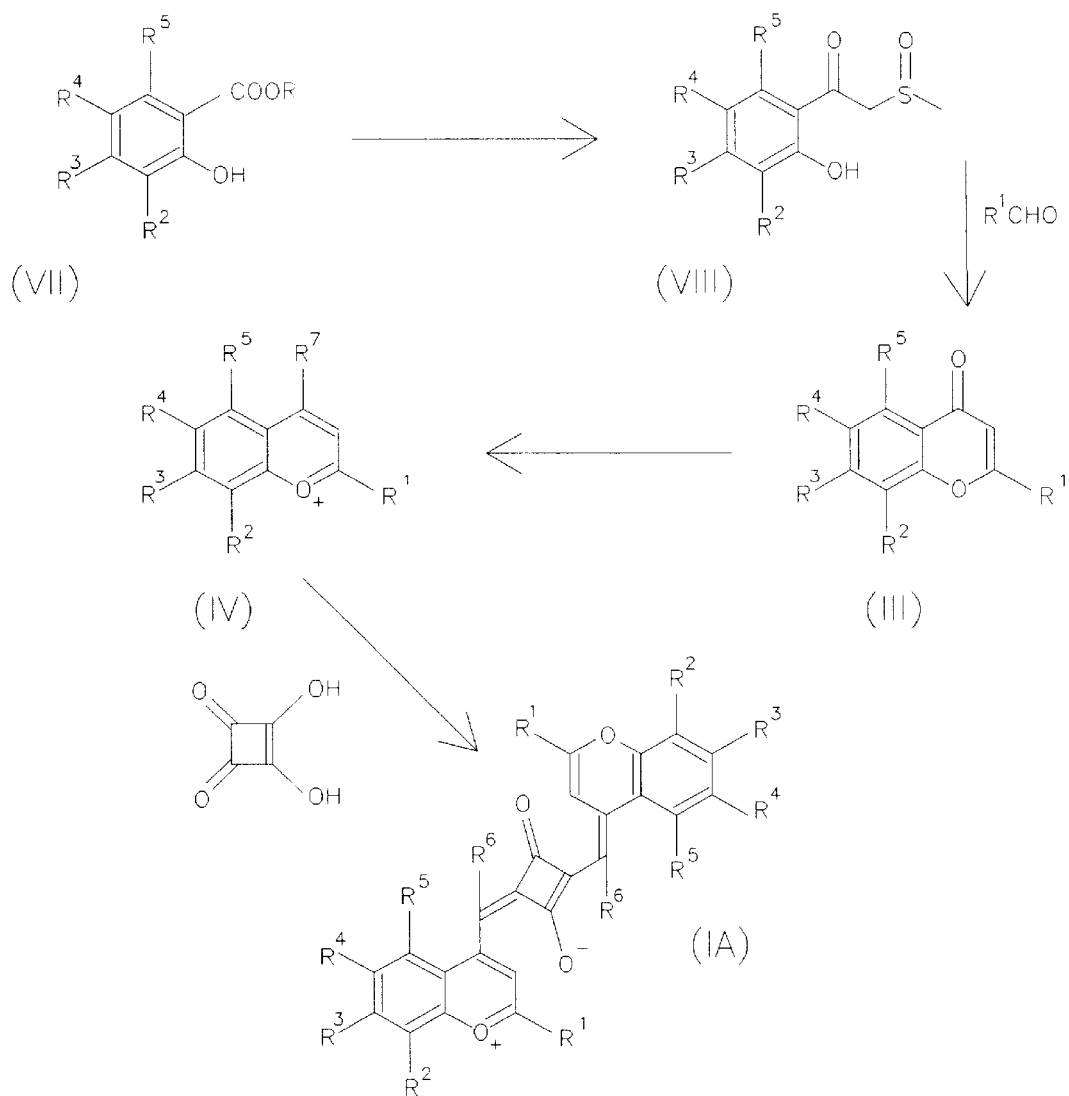
FIG. 2 shows a second synthetic route which may be used to produce the dyes of the present invention.

FIG. 2 shows a second route to the preparation of the chromone (III). In the route shown in FIG. 2, an appropriate ester (VII) of salicylic acid is reacted with dimethyl sulfoxide in the presence of a base to prepare the corresponding 2-($CH_3$—SO—$CH_2$—CO)-phenol (VIII), which is then condensed with an aldehyde $R^1$CHO containing the $R^1$ substituent desired in the final dye to produce the chromone (III). This chromone is converted to the dye (IA) in the same way as described above with reference to FIG. 1. The corresponding benzthiopyrylium and benzselenopyrylium compounds may be prepared from the thio- and seleno-analogues of the compound (VII). Again, croconylium dyes can be produced in exactly the same manner except that a croconate salt is used instead of squaric acid in the final step.

Figure 3:
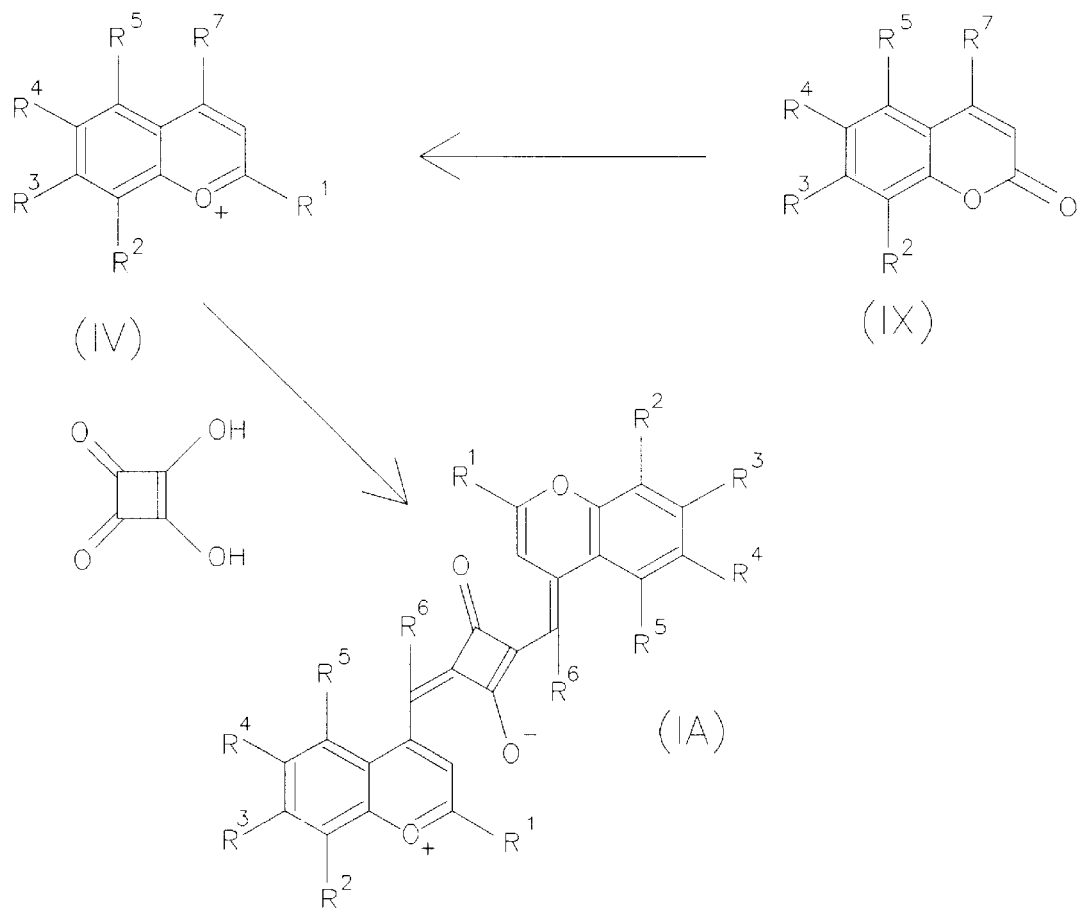
FIG. 3 shows a third synthetic route which may be used to produce the dyes of the present invention.

FIG. 3 shows a third synthetic route in which the 4-$R^7$-benzpyrylium salt (IV) is prepared without first preparing a chromone (III). In the route shown in FIG. 3, the appropriate 4-$R^7$-2-oxobenz-2H-pyran (IX) is reacted with an organometallic alkylating agent (preferably a Grignard reagent) containing the desired substituent $R^1$ in a dialkoxyalkane, preferably dimethoxyethane, and then subjected to acid-mediated dehydration with, for example, fluoboric acid, to produce the benzpyrylium salt (IV). The salt (IV) is then converted to the dye (IA) in the same way as described above with reference to FIG. 1. The compound of Formula IX in which $R^3$ is diethylamino and $R^2$, $R^4$, $R^5$ and $R^6$ are each a hydrogen atom is available commercially.

Figure 4:
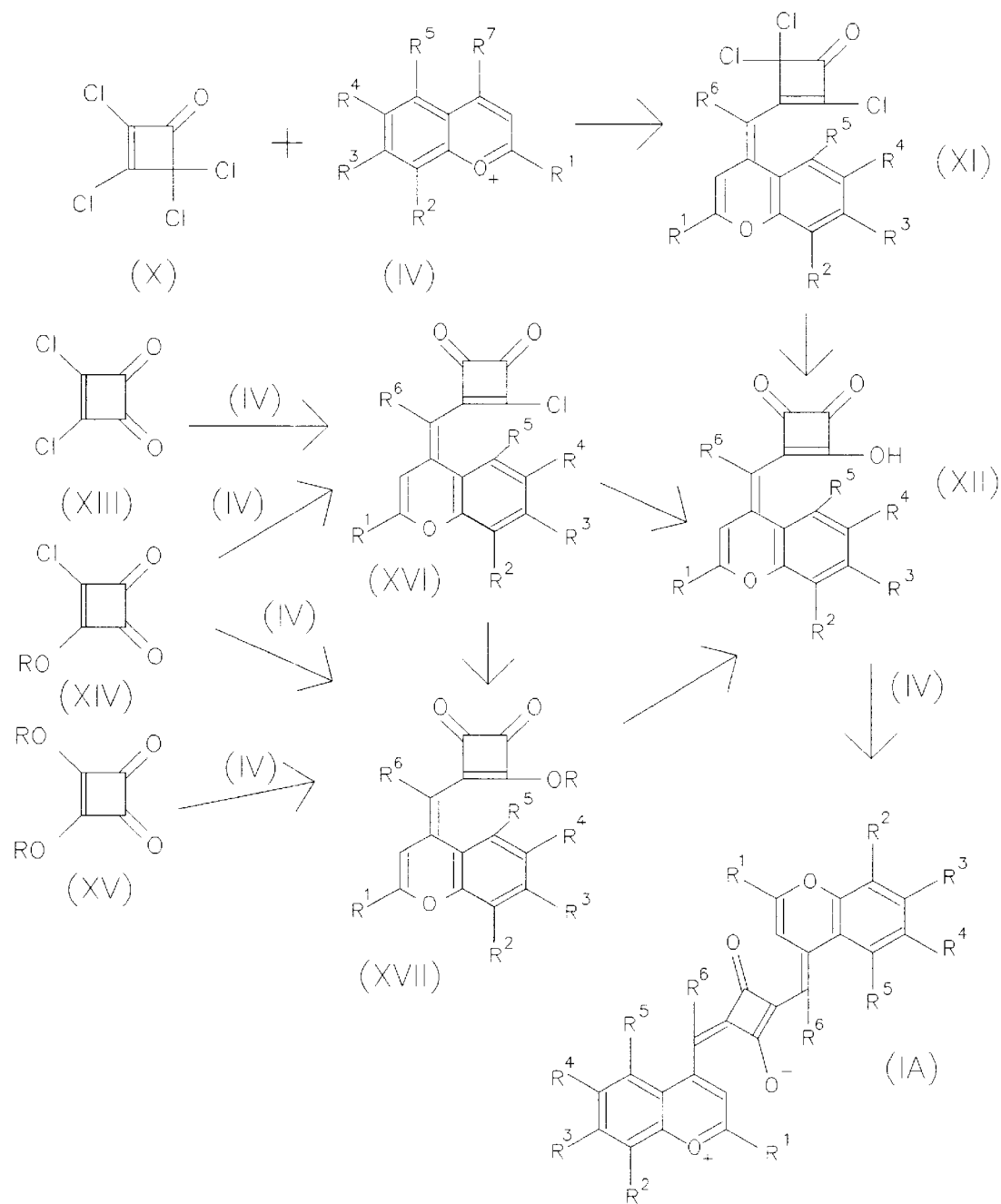
FIG. 4 shows a fourth synthetic route especially adapted for the production of asymmetric squarylium dyes of the present invention.

FIG. 4 shows the presently preferred route for producing asymmetric squarylium dyes of the present invention. Fuller details of this synthesis are given the aforementioned copending Applications Serial No. 07/696,222 and 08/052,212 and European Patent Application No. 92107574.3. One form of this synthesis begins with the condensation of the appropriate 4-$R^7$-benzpyrylium salt (IV) with 2,3,4,4-tetrachlorocyclobut-1-en-2-one (X) to give a trihalosquaric acid derivative (XI). The tetrachloro compound (X) and its synthesis are described in Maahs et al., "Syntheses and Derivatives of Squaric Acid", Angew. Chem. Int. Ed., 5, 888–893 (1966). This reaction is conducted in the presence of a base, preferably triethylamine. As noted above, the anion of the salt (IV) can be any anion which provides a stable salt and which does not interfere with the desired reaction; conveniently the tetrafluoroborate salt is used. The tetrabromo homologue may be used in place of the tetrachloro compound (X).

In the next step of the synthesis, the trihalosquaric acid derivative (XI) is hydrolyzed to the corresponding non-halogenated derivative (XII). Desirably, this hydrolysis is effected by heating the derivative (XI) with triflic acid, then adding water.

Alternatively, the non-halogenated derivative (XII) may be prepared by condensing the diacid chloride (XIII), an ester/acid chloride (XIV; R is preferably an alkyl group containing 1 to about 6 carbon atoms) or a diester (XV) of squaric acid with the appropriate 4-$R^7$-benzpyrylium salt (IV), followed by hydrolysis of the resultant product. With both the monoacid chloride/monoester (XIV) and the diester (XV), this reaction requires the presence of a base to produce useful yields; with the more reactive diacid chloride (XIII), this reaction can be conducted without base. The reaction of the diacid chloride (XIII) may also be catalyzed by a Lewis acid.

When the diacid chloride (XIII) is used as starting material in this reaction, the intermediate is (XVI), the acid chloride of (XII), whereas when the diester (XV) is used as starting material, the intermediate is (XVII), the ester of (XII). When the ester/acid chloride (XIV) is used, both (XVI) and (XVII) are produced, but the production of this mixture poses no problems, since both compounds are readily hydrolyzed to give the derivative (XII). If desired, the acid chloride (XVI) may be treated with an alkanol to convert it to the ester (XVII). Acid bromides may be used in place of the acid chlorides.

The final step of the synthesis is the condensation of the squaric acid derivative (XII) with one mole of the appropriate 4-$R^7$-benzpyrylium salt (IV) to give the dye (IA); to produce an asymmetric dye (IA), the substituents on the salt (IV) condensed with the squaric acid derivative (XII) must of course be different from those on the salt (IV) used to produce the squaric acid derivative (XII). The conditions required for this reaction are substantially the same as those used for the reaction in which two moles of the salt (IV) are condensed with squaric acid to produce a dye (IA) as described above with reference to FIG. 1.

Figure 5:
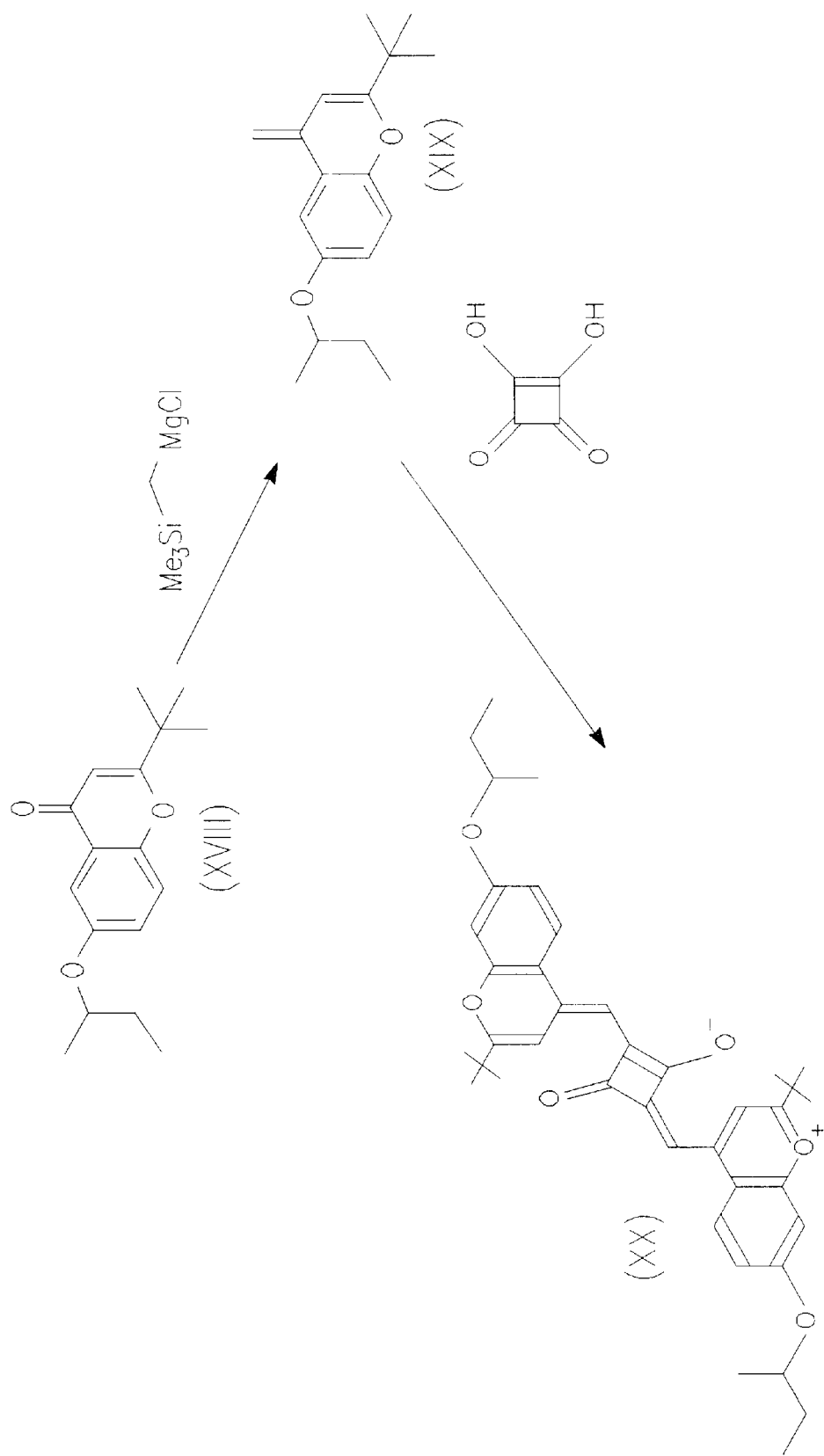
FIG. 5 shows a fifth synthetic route which may be used to produce the dyes of the present invention, proceeding via an exo-methylene benzpyran.

FIG. 5 illustrates the preparation of a dye (XX) by a synthetic route which proceeds via an exo-alkylene benzpyran. The synthesis shown in FIG. 5 begins from a chromone (XVIII), which can be prepared by the same methods as the chromone (III) described above. The chromone (XVIII) is first converted to the corresponding exo-methylene compound (XIX) by means of a Peterson olefination, as described in, for example, Organic Reactions, Vol. 38, 1–225 (Wiley, New York, 1990); alternatively the exo-methylene compound may be produced by treating the corresponding 4-alkylbenzpyrylium salt with a strong base. The exo-methylene compound (XIX) is then reacted with squaric acid, preferably in solution in butanol to produce the final dye (XX).

The dyes of the present invention may be used in any of the applications in which prior art near infra-red absorbers have been used. Thus, the dyes may be used as dyes in printing inks intended to provide markings which can be read under near infra-red radiation, for example, on packages of consumer items intended to be scanned by near infra-red laser scanners. At least some of the present dyes may also be useful as charge transfer materials for use in xerography, electrophotography and similar processes, and as laser dyes.

However, because of their high extinction coefficients in the near infra-red region, the present dyes are especially useful in processes for generating heat in a medium; in such a process at least part of the medium is exposed to near infra-red actinic radiation of a frequency absorbed by the dye, so that the radiation is absorbed by the dye and heat is generated within the parts of the medium exposed to the radiation. Typically, in such a process, the radiation is provided by a laser. The medium may also comprise a thermally sensitive material capable of undergoing a color change upon exposure to heat; the medium is exposed imagewise to the radiation, and the heat generated by the dye is sufficient to effect a color change in the thermally sensitive material, so that an image is formed in the medium. Thus, for example, the present dyes may be used as the near infra-red absorbers in the thermal imaging processes described in the aforementioned U.S. Pat. Nos. 4,602,263 and 4,826,976.

(The term "image" is used herein to refer to any arrangement of areas which exhibit differing transmission and/or reflectance characteristics under electromagnetic radiation. Thus, the term "image" is used herein to include not only graphic or pictorial images but also textual material and quasi-textual material for machine "reading", for example, bar codes.)

In such a process, preferably the thermally sensitive material is originally substantially colorless and is converted by the heat generated to a colored material in exposed areas of the image.

Figure 6:
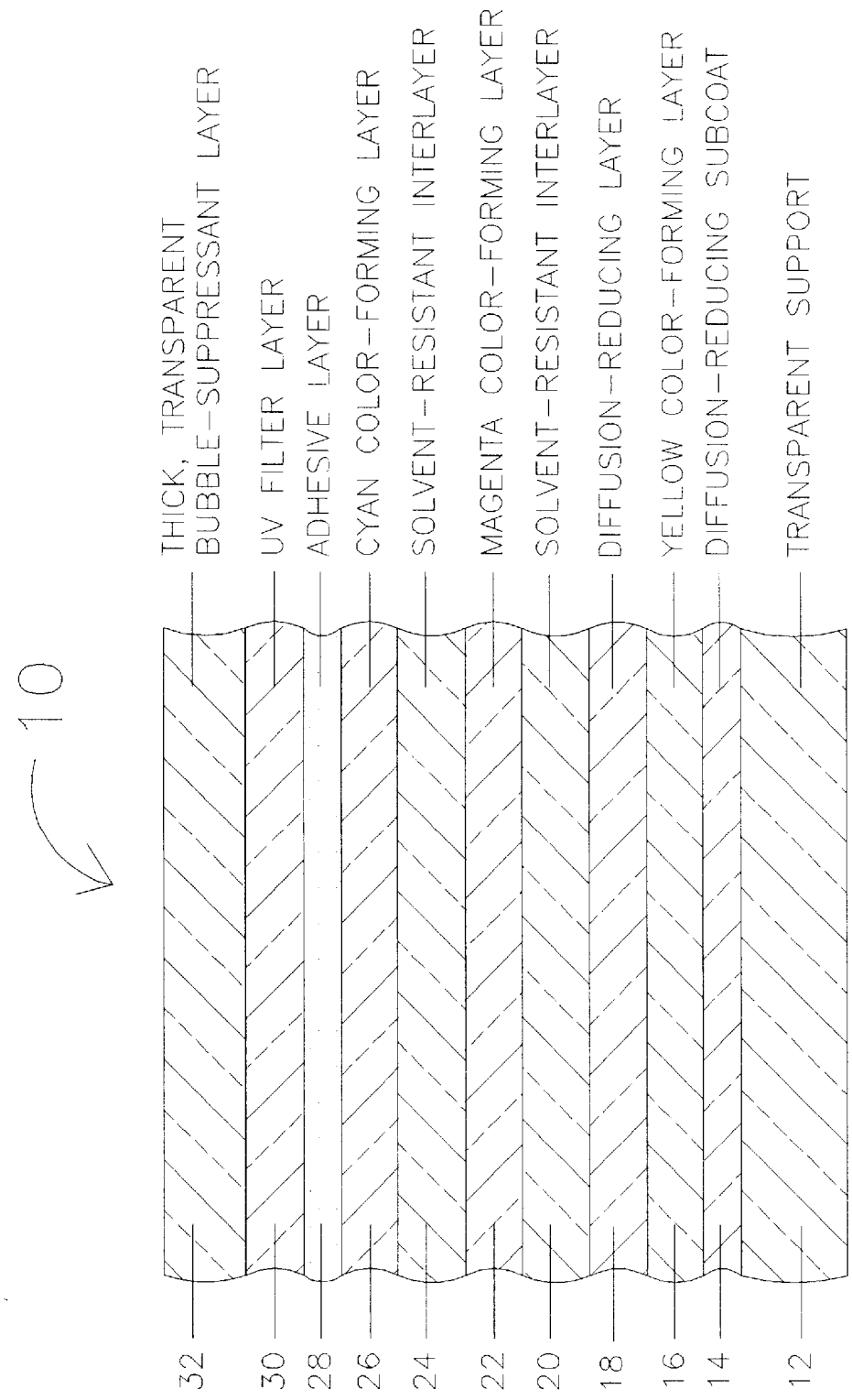
FIG. 6 is a schematic cross-section through a thermal imaging medium used in a process of the present invention, this medium containing a plurality of thermally sensitive materials capable of undergoing a color change upon exposure to heat.

FIG. 6 of the accompanying drawings illustrates an imaging medium (generally designated 10) of this type. This imaging medium 10 is intended for use in the production of transparencies and comprises a substantially transparent support 12 formed of 4 mil (101 $\mu$m) poly(ethylene terephthalate) (PET) film incorporating an ultra-violet absorber. Appropriate PET films are readily available commercially, for example as P4C1A film from DuPont de Nemours., Wilmington, Del.

The imaging medium 10 also comprises a diffusion-reducing subcoat 14 approximately 1 $\mu$m thick formed from a 10:1 w/w mixture of a water-dispersible styrene acrylic polymer (Joncryl 538 sold by S.C. Johnson & Son, Inc., Racine Wis. 53403) and a water-soluble acrylic polymer (Carboset 526 sold by The B.F. Goodrich Co., Akron Ohio 44313). The presence of the minor proportion of water-soluble acrylic polymer reduces the tendency for the layer 14 to crack during the coating process. The diffusion-reducing subcoat 14, which has a glass transition temperature of approximately 55° C., serves the function of a conventional subcoat, namely increasing the adhesion of the imaging layer 16 (described in detail below) to the support 12. The subcoat 14 also serves to reduce or eliminate migration of dye compound from the imaging layer 16 after imaging; if a conventional subcoat were employed in place of the diffusion-reducing subcoat 14, diffusion of the dye compound from the layer 16 into the subcoat after imaging might cause loss of sharpness of the image. The subcoat 14 is coated onto the support 12 from an aqueous medium containing the water-dispersible and water-soluble polymers.

A yellow imaging layer 16 is in contact with the diffusion-reducing subcoat 14. This imaging layer 16 is approximately 5 $\mu$m thick and comprises approximately 47.5 parts by weight of a leuco dye of the formula:

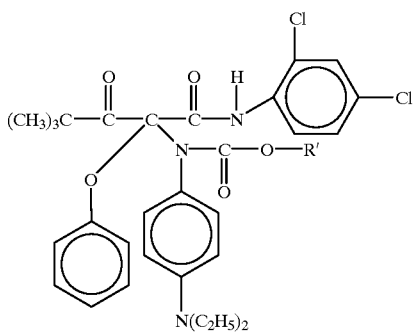

(LD1)

in which R' is a tertiary butyl group (the compounds in which R' is an isobutyl or benzyl group may alternatively be used), 1.6 parts by weight of an infra-red dye of the formula:

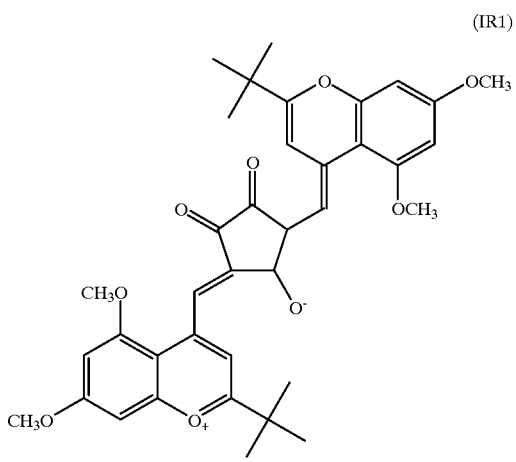

(IR1)

(prepared in Example 55 below), 3.3 parts by weight of a hindered amine stabilizer (HALS-63, sold by Fairmount Chemical Co.), and 47.5 parts by weight of a poly(methyl methacrylate) binder (Elvacite 2021, sold by DuPont de Nemours, Wilmington, Del.; this material is stated by the manufacturer to be a methyl methacrylate/ethyl acrylate copolymer, but its glass transition temperature approximates that of poly(methyl methacrylate)). This binder has a glass transition temperature of approximately 110° C. The imaging layer 16 is applied by coating from a mixture of heptanes and methyl ethyl ketone.

Superposed on the yellow imaging layer 16 is a diffusion-reducing layer 18, which, like the first diffusion-reducing layer 14, serves to prevent migration of dye compound from the yellow imaging layer 16 on storage after imaging. The diffusion-reducing layer 18, which is approximately 2 μm thick, is formed of a water-dispersible styrene acrylic polymer (Joncryl 138 sold by S.C. Johnson & Son, Inc., Racine Wis. 53403), and is coated from an aqueous dispersion. This layer has a glass transition temperature of approximately 60° C.

The next layer of the imaging medium 10 is a solvent-resistant interlayer 20 approximately 4.6 μm thick and composed of a major proportion of partially cross-linked polyurethane (NeoRez XR-9637 polyurethane sold by ICI Resins US, Wilmington, Mass.) and a minor proportion of poly(vinyl alcohol) (Airvol 540, sold by Air Products and Chemicals, Inc., Allentown Pa. 18195). This solvent-resistant interlayer 20 is coated from an aqueous dispersion. The interlayer 20 not only helps to thermally insulate the imaging layers 14 and 22 (described below) from one another during imaging, but also prevents disruption and/or damage to the yellow imaging layer 16 and the diffusion-reducing layer 18 during coating of the magenta imaging layer 22. Since the yellow imaging layer 16 and the magenta imaging layer 22 are both coated from organic solution, if a solvent-resistant interlayer were not provided on the layer 16 before the layer 22 was coated, the organic solvent used to coat the layer 22 might disrupt, damage or extract leuco dye or infra-red absorber from the layer 16. Provision of the solvent-resistant interlayer 20, which is not dissolved by and does not swell in the organic solvent used to coat the layer 22, serves to prevent disruption of or damage to the layer 16 as the layer 22 is coated. Furthermore, the solvent-resistant interlayer 20 serves to prevent the magenta leuco dye, infra-red dye and hindered amine light stabilizer from the layer 22 sinking into the diffusion-reducing layer 18 and the yellow imaging layer 16 as the layer 22 is being coated.

Superposed on the solvent-resistant interlayer 20 is the magenta imaging layer 22, which is approximately 3 μm thick and comprises approximately 47.25 parts by weight of a leuco dye of the formula:

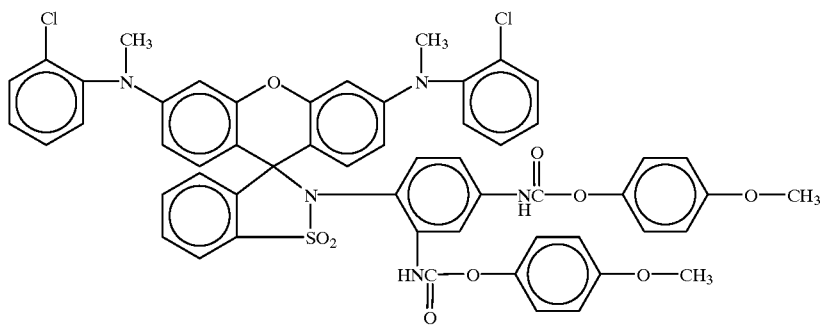

(LD2)

(this leuco dye may be prepared by the methods described in the aforementioned U.S. Pat. Nos. 4,720,449 and 4,960,901), approximately 3.4 parts by weight of zinc acetate (thus giving a leuco dye: zinc cation molar ratio of about 1:0.4), 1.62 parts by weight of an infra-red dye of the formula:

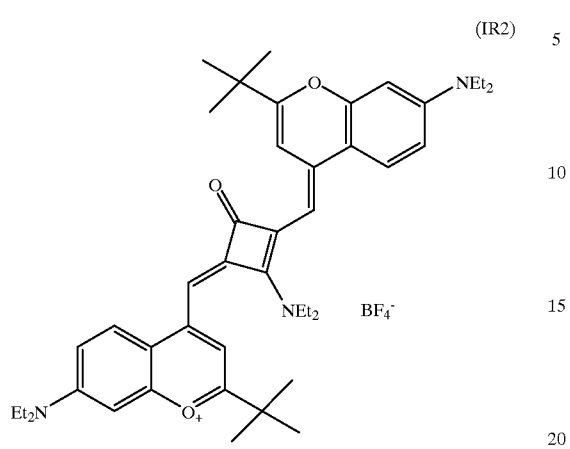

(IR2)

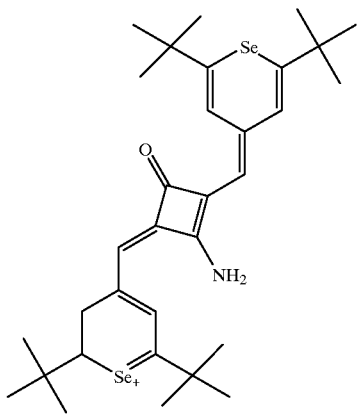

(IR3)

(which may be prepared by the process described in the aforementioned U.S. Pat. No. 5,227,498, copending application Ser. No. 07/979,250, or International Application PCT/US92/09992; essentially, this dye is produced by reacting a compound of Formula XVI or XVII shown in FIG. 4 with diethylamine to introduce the -NEt$_2$ group on the squarylium ring, and then reacting the product with the benzpyrylium salt (IV) in the same way as described above with reference to FIG. 4), 3.6 parts by weight of a hindered amine stabilizer (HALS-63), 0.27 parts by weight of a wetting agent, and 47.25 parts by weight of a polyurethane binder (Estane 5715, supplied by The B.F. Goodrich Co., Akron Ohio 44313). The imaging layer 22 is applied by coating from a cyclohexanone/methyl ethyl ketone mixture.

(Alternatively, the infra-red dye of Formula IR2 above may be replaced by the dye of formula:

(used in the form of its tetrafluoroborate salt) (this infra-red dye may be prepared by the process analogous to that used to prepare the infra-red dye of Formula IR2 above using the corresponding selenopyrylium squaric acid derivative and ammonia to introduce the amino group, followed by condensation of the product with a selenopyrylium salt; to prepare the selenopyrylium squaric acid derivative, the corresponding selenopyrylium salt is substituted for the benzpyrylium salt IV in the reactions shown in FIG. 4).)

On the imaging layer 22 is coated a second solvent-resistant interlayer 24 which is formed from the same material, and coated in the same manner as, the solvent-resistant interlayer 20.

Superposed on the second solvent-resistant interlayer 24 is a cyan imaging layer 26, which is approximately 3 μm thick and comprises approximately 49.5 parts by weight of a leuco dye of the formula:

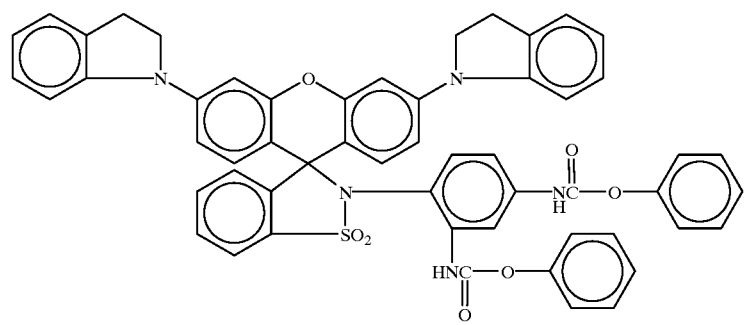

(LD3)

(this leuco dye may be prepared by the methods described in the aforementioned U.S. Pat. Nos. 4,720,449 and 4,960,901), approximately 3.97 grams of zinc acetate (thus giving a leuco dye: zinc cation molar ratio of about 1:0.4), 1.62 parts by weight of an infra-red dye of the formula:

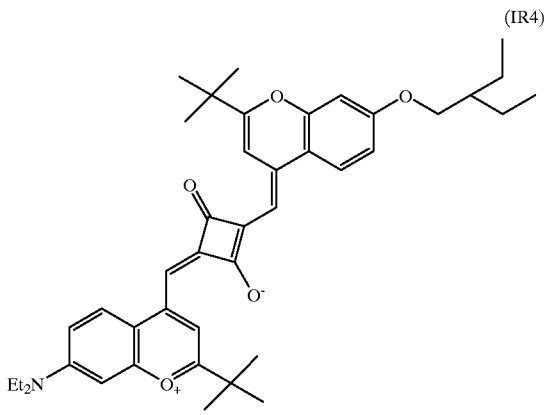

(IR4)

(prepared in Example 51 below), 0.2 parts of a wetting agent, and 49.5 parts by weight of a polyurethane binder (Estane 5715). The imaging layer 26 is applied by coating from methyl ethyl ketone.

Alternatively, the infra-red dye of Formula IR4 above may be replaced by the dye of formula:

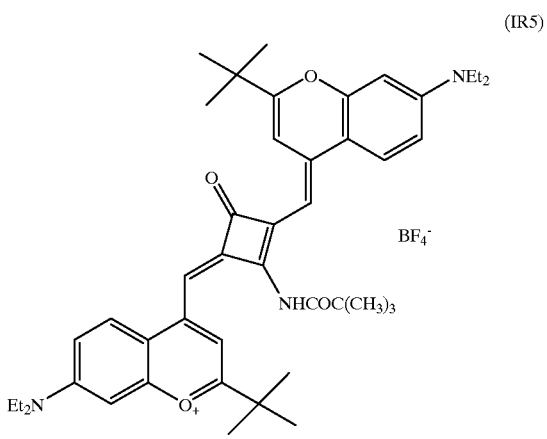

(IR5)

(which may be prepared by a process analogous to that used to prepare the infra-red dye of Formula IR2 above, by reacting a compound of Formula XVI or XVII shown in FIG. 4 with ammonia to introduce an amino group on the squarylium ring, then reacting the product with the benz-pyrylium salt (IV) to produce the amino squarylium dye, and finally reacting this amino squarylium dye with pivaloyl chloride to produce the final pivaloylamino group on the squarylium ring).

As already indicated, the layers 14–26 of the imaging medium 10 are produced by coating on to the transparent support 12. However, the remaining layers of the imaging medium 10, namely the transparent bubble-suppressant layer 32, the ultraviolet filter layer 30 and the adhesive layer 28 are not coated on to the layer 26 but rather are prepared as a separate unit and then laminated to the remaining layers of the medium.

The transparent bubble-suppressant layer 32 is a 1.75 mil (44μm) PET film, a preferred film being that sold as ICI 505 film by ICI Americas, Inc., Wilmington, Del. The bubble-suppressant layer 32 prevents the formation of bubbles in the imaging layers 16, 22 and 26 of the imaging medium 10 during imaging.

The ultraviolet filter layer 30 serves to protect the imaging layers 16, 22 and 26 from the effects of ambient ultraviolet radiation. It has been found that the leuco dyes are susceptible to undergoing color changes when exposed to ultraviolet radiation during storage before or after imaging; such color changes are obviously undesirable since they increase the $D_{min}$ of the image and may distort the colors therein. The ultraviolet filter layer 30 is approximately 5 μm thick and comprises approximately 83 percent by weight of a poly (methyl methacrylate) (Elvacite 2043, sold by DuPont de Nemours, Wilmington, Mass.), 16.6 percent by weight of an ultraviolet filter (Tinuvin 328 sold by Ciba-Geigy, Ardsdale N.Y.) and 0.4 percent by weight of a wetting agent. The ultraviolet filter layer 30 is prepared by coating on to the bubble-suppressant layer 32 from a solution in methyl ethyl ketone.

The adhesive layer, which is approximately 2 μm thick, is formed of a water-dispersible styrene acrylic polymer (Joncryl 138 sold by S.C. Johnson & Son, Inc., Racine Wis. 53403) and is coated on to the ultraviolet filter layer 30 from an aqueous dispersion.

After the layers 30 and 28 have been coated on to the bubble-suppressant layer 32, the entire structure containing these three layers is laminated under heat (approximately 225° F., 107° C.) and pressure to the structure containing the layers 12–26 to form the complete imaging medium 10.

If desired, the bubble-suppressant layer 32 may be formed by coating, rather than by lamination of a pre-formed film on to the layers 12–26. If the bubble-suppressant layer 32 is to be formed by coating, it is convenient to incorporate an ultra-violet absorber into the bubble-suppressant layer, thereby avoiding the need for a separate ultra-violet absorber layer. Thus, in this case, the layer 28 is coated on to the layer 26 using the solvent already described, and then the bubble-suppressant layer 32 containing the ultra-violet absorber may be coated on to the layer 28 from an aqueous medium.

The medium 10 is imaged by exposing it simultaneously to the beams from three infra-red lasers having wavelengths of approximately 792, 848 and 926 nm. The 926 nm beam images the yellow imaging layer 16, the 848 nm beam images the magenta imaging layer 22 and the 792 nm beam images the cyan imaging layer 26. Thus, a multicolor image is formed in the imaging medium 10, and this multicolor image requires no further development steps. Furthermore, the medium 10 may be handled in normal room lighting prior to exposure, and the apparatus in which the imaging is performed need not be light-tight.

Figure 7:
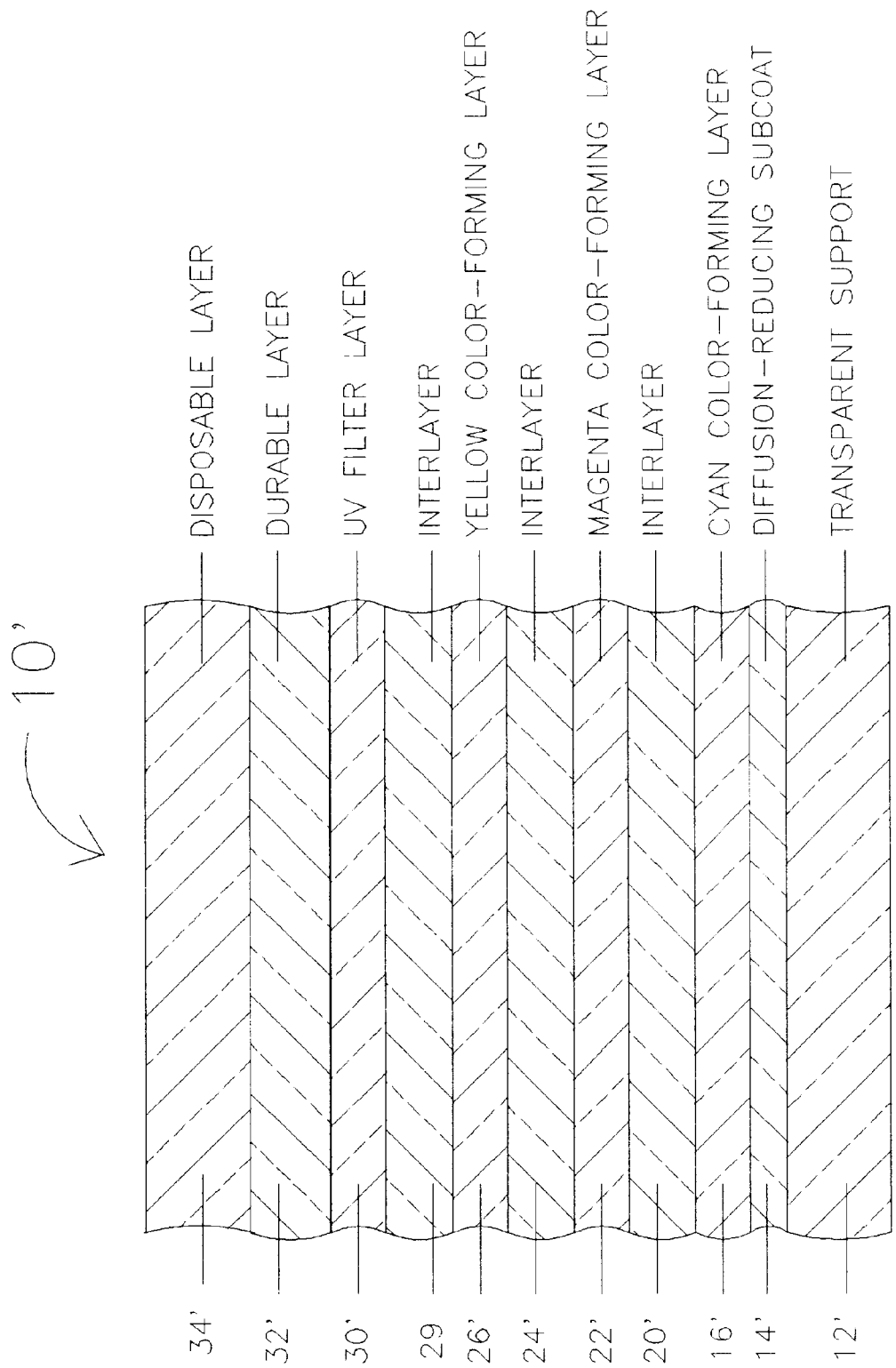
FIG. 7 is a schematic cross-section through a second thermal imaging medium generally similar to that shown in FIG. 6.

The second imaging medium of the invention shown in FIG. 7, generally designated 10', is similar to that shown in FIG. 6 and is also intended for the production of transparencies. However, the imaging medium 10' is designed so that the various layers thereof can be coated without the use of organic solvents. This imaging medium 10' comprises a transparent support 12', identical to the support 12 shown in FIG. 6. The imaging medium 10' also comprises a diffusion-reducing subcoat 14', which is similar to the subcoat 14 shown in FIG. 6, but is formed from a 2:1 w/w mixture of two water-soluble acrylic polymers, (Carboset XL-37 and Carboset 526, both sold by B.F. Goodrich Co., Akron Ohio 44313). The subcoat 14' is coated on to the support 12' from aqueous solution at a dried coating weight of 437 mg/ft$^2$, and serves to increase the adhesion of the cyan imaging layer 16' (see below) to the support 12'.

A cyan imaging layer 16' is in contact with the subcoat 14'. To prepare the cyan imaging layer 16', 52.24 parts by weight of the leuco dye of Formula LD3 above, 2.37 parts by weight of an infra-red dye of formula:

(IR6)

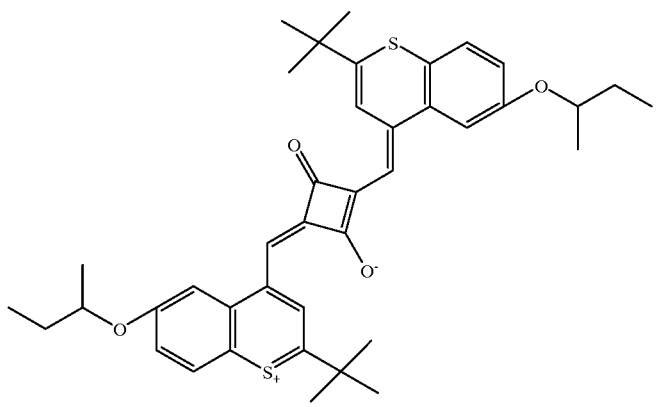

(prepared in Example 69 below), 1.6 parts by weight of a hindered amine light stabilizer HALS-63, 7.84 parts by weight of di-tert-butyl hydroquinone (a light stabilizer), 12.82 parts by weight of a surfactant (Aerosol TR-70, supplied by American Cyanamid Co., Wayne, N.J. 07470, with pH adjusted to 5.6 using a 1.0 M aqueous solution of sodium hydroxide) and 31.32 parts by weight of a poly(ethyl methacrylate) binder (Elvacite 2043, sold by E.I. DuPont de Nemours and Company, Wilmington, Del.) were dissolved in 1282 parts by weight of dichloromethane. 1134 Parts by weight of deionized water was added to this solution, and the resulting mixture was homogenized. The dichloromethane was then removed by rotary evaporation under reduced pressure to leave a dispersion in water of particles whose size was in the 100–300 nm range. A water-soluble binder, poly(vinyl alcohol) (Airvol 540, supplied by Air Products, Allentown, Pa. 18195, 219.3 parts by weight of a 9.8% aqueous solution) was added to 1200 parts by weight of the dispersion prepared above, followed by a fluorinated surfactant (FC-120, supplied by the Minnesota Mining and Manufacturing Corporation, Minneapolis, Minn., 1.23 parts by weight of a 25% aqueous solution) to provide the coating fluid. To form the cyan color-forming layer 16', this coating fluid was coated to a dried coating weight of 360 mg/ft$^2$.

The next layer of the imaging medium 10' is an interlayer 20', which is identical in composition and dried coating weight to the diffusion-reducing subcoat 14' described above. This interlayer 20' serves as a thermal insulator to prevent coloration of the cyan imaging layer by heat generated during exposure of the magenta imaging layer (and vice versa). The interlayer 20' also serves to reduce or eliminate migration of dye compound from the cyan and magenta imaging layers, and to increase adhesion between these layers.

Superposed on the interlayer 20' is a magenta imaging layer 22'. To prepare the magenta imaging layer 22', 45 parts by weight of the leuco dye of Formula LD2 above, 1.875 parts by weight of an infra-red dye of formula:

(IR7)

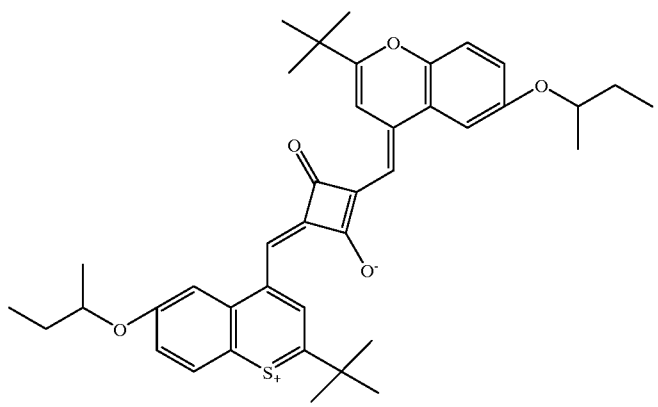

(prepared in Example 72 below), 1.725 parts by weight of a hindered amine light stabilizer HALS-63, 11.275 parts by weight of a surfactant (Aerosol TR-70, with pH adjusted to 5.6 using a 1.0 M aqueous solution of sodium hydroxide) and 33.9 parts by weight of a poly(ethyl methacrylate) binder (Elvacite 2043) were dissolved in 1060 parts by weight of dichloromethane. 1125 Parts by weight of deionized water was added to this solution, and the resulting mixture was homogenized. The dichloromethane was then removed by rotary evaporation under reduced pressure to leave a dispersion in water of particles whose size was in the 100–300 nm range. A water-soluble binder, poly(vinyl alcohol) (Airvol 540, 195.3 parts by weight of a 9.8% aqueous solution) was added to 1145 parts by weight of the dispersion prepared above, followed by a fluorinated surfactant (FC-120, 1.07 parts by weight of a 25% aqueous solution) to provide the coating fluid. To form the magenta imaging layer 22', this coating fluid was coated to a dried coating weight of 334 mg/ft$^2$.

The next layer of the imaging medium 10' is an interlayer 24', which is identical in composition, function and dried coating weight to the interlayer 20' described above.

Superposed on the interlayer 24' is a yellow imaging layer 26'. To prepare the yellow imaging layer 26', 61.6 parts by weight of the leuco dye of Formula LD1 above, in which R' is an isopropyl group, 1.54 parts by weight of an infra-red dye of formula:

Mich. 48674) and a fluorinated surfactant (FC-431, supplied by the Minnesota Mining and Manufacturing Corporation, Minneapolis, Minn., 3.5 parts by weight of a 50% solution in ethyl acetate) were dissolved in a mixture of 2205 parts by weight of ethyl acetate and 945 parts by weight of toluene to provide the coating solution. To form the durable layer 32', this coating solution was coated to a dried coating weight of 988 mg/ft$^2$.

On to the durable layer 32' is coated an ultra-violet filter layer 30', which serves the same function as the filter layer 30 shown in FIG. 6. To prepare the filter layer 30', 350 parts by weight of ethyl cellulose (Ethocel, 10 cps, Standard

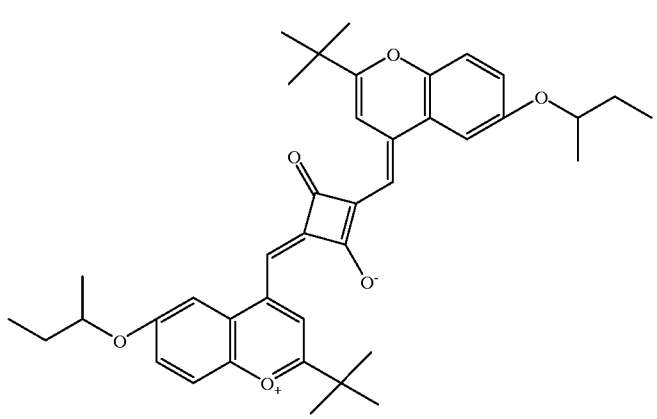

(IR8)

(prepared in Example 64 below), 1.715 parts by weight of a hindered amine light stabilizer HALS-63, 15.435 parts by weight of a surfactant (Aerosol TR-70, with pH adjusted to 5.6 using a 1.0 M aqueous solution of sodium hydroxide) and 46.2 parts by weight of a poly(ethyl methacrylate) binder (Elvacite 2043) were dissolved in 1235 parts by weight of dichloromethane. 1116 Parts by weight of deionized water was added to this solution, and the resulting mixture was homogenized. The dichloromethane was then removed by rotary evaporation under reduced pressure to leave a dispersion in water of particles whose size was in the 100–300 nm range. A water-soluble binder, poly(vinyl pyrrolidone) (PVP K-120, supplied by International Specialty Products, Wayne, N.J. 07470, 220.7 parts by weight of a 9.2% aqueous solution) was added to 875 parts by weight of the dispersion prepared above, followed by a fluorinated surfactant (FC-120, 1.14 parts by weight of a 25% aqueous solution) to provide the coating fluid. To form the yellow imaging layer 26', this coating fluid was coated to a dried coating weight of 415 mg/ft$^2$.

The next layer of the imaging medium 10' is an interlayer 29, which is identical in composition, function and dried coating weight to the interlayers 20' and 24' described above.

As already mentioned, the layers 14'–29 of the imaging medium 10' are formed by coating, from aqueous dispersion, on to the support 12'. However, the remaining layers of the medium 10' are coated on to a disposable support 34' (described below) and then laminated to form the final imaging medium 10'.

The disposable support 34' is conveniently 3 mil (76 μm) poly(ethylene terephthalate) film (Melinex 505, supplied by ICI Films, Hopewell, Va. 23860). On to this support 34 is coated a durable layer 32'. To form this durable layer 34', 350 parts by weight of ethyl cellulose (Ethocel, 10 cps, Standard Grade, supplied by Dow Chemical, Midland, Grade), 35 parts by weight of Tinuvin 328 (an ultra-violet filter) and a fluorinated surfactant (FC-431, 3.5 parts by weight of a 50% solution in ethyl acetate) were dissolved in a mixture of 2205 parts by weight of ethyl acetate and 945 parts by weight of toluene to provide the coating solution. To form the filter layer 30', this coating solution was coated to a dried coating weight of 991 mg/ft$^2$.

In combination, the durable layer 32', the filter layer 30' and the interlayer 29 are sufficiently thick to fulfil the same function as the bubble-suppressant layer 32 shown in FIG. 6.

The structure comprising the disposable layer 34', the durable layer 32' and the filter layer 30' is laminated under heat (250° F., 121° C.) and pressure to the structure comprising the layers 12'–29, and then the disposable layer 34' is peeled away to form the final imaging medium 10'.

The medium 10' is imaged by exposing it simultaneously to the beams from three infra-red lasers having wavelengths in the ranges of 780–815 nm, 840–870 nm and 910–930 nm. The 910–930 nm beam images the cyan imaging layer 16', the 840–870 nm beam images the magenta imaging layer 22' and the 780–815 nm beam images the yellow imaging layer 26'. Thus, a multicolor image is formed in the imaging medium 10', and this multicolor image requires no further development steps. Furthermore, the medium 10' may be handled in normal room lighting prior to exposure, and the apparatus in which the imaging is performed need not be-light-tight.

The present dyes may also be used in a thermal imaging process in which the medium comprises one layer of a multi-layer structure, this structure further comprising a support layer disposed on one side of the medium and a colored layer adhering to the opposed side of the medium. In this type of thermal imaging process, the heat generated on exposure of the dye to actinic radiation causes increased adhesion of the colored layer to the support layer, such that upon application of a peeling force to the colored layer, the colored layer will peel from the support layer in areas which have not been exposed to the radiation, but in areas which have been exposed to radiation the colored layer will remain attached to the support layer. A preferred thermal imaging process of this type is described and claimed in the aforementioned International Patent Application No. PCT/US87/03249.

In this type of thermal imaging process, desirably the support layer is formed of a material transparent to the radiation, and the colored layer comprises a layer of porous or particulate imaging material uniformly coated on the medium, the colored layer exhibiting a cohesive strength which is greater than the adhesive strength between the colored layer and the support layer. Preferably, the colored layer comprises carbon black, although other colored pigments or dyes may also be used.

Figure 8:
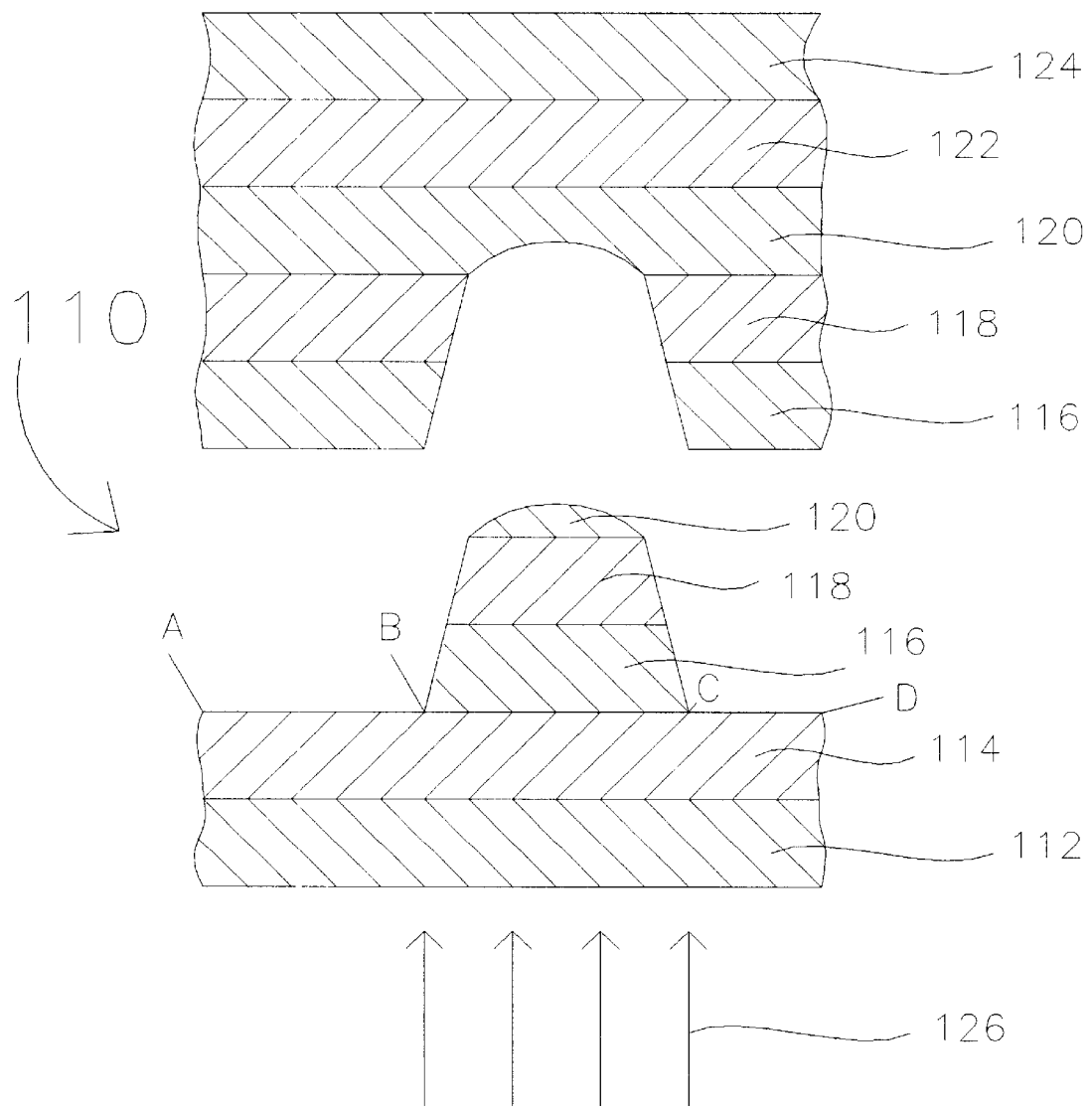
FIG. 8 is a schematic cross-section through a third, peel-apart thermal recording medium used in a process of the present invention, this medium comprising a multi-layer structure.

FIG. 8 is a schematic cross-section through a thermal recording medium of this type being used in a process of the present invention, this recording medium being shown in its exposed form with the two parts of the recording medium being separated to reveal the respective images. The thermal recording medium (generally designated 110) comprises a lower sheet 112 formed from a plastic film, preferably of polyethylene terephthalate, and carrying on its upper surface a sub-coat 114 formed of polystyrene or poly(styrene/acrylonitrile). (The thicknesses of the various layers are not drawn to scale in FIG. 8, the sub-coat being of course much thinner than the lower sheet 112.) Above the sub-coat 114 are provided an overcoat 116 formed of an abrasion-resistant plastic, for example poly(methyl methacrylate) and a colorant/binder layer 118; this colorant/binder layer is preferably formed from a mixture of carbon black and polyvinyl alcohol.

A release layer 120 is provided above the colorant/binder layer 118, and an adhesive layer 122 above the release layer 120. Finally, a second sheet 124 formed from a plastic film, for example polyethylene terephthalate, completes the thermal recording medium 110.

The dye of the present invention may be incorporated in the sub-coat 114 or in the overcoat 116 or both. The dye serves to absorb near infra-red radiation from a laser which is used to expose the thermal recording medium and convert this radiation into heat, thereby raising the temperature of the interface between the sub-coat 114 and the overcoat 116; this interface constitutes the heat-activatable imaging surface of the thermal recording medium 110.

FIG. 8 shows the thermal recording medium being separated after it has been exposed using radiation from an infra-red laser. As indicated by the arrows 126, exposure has been effected such that the region from point B to point C is exposed, while the regions from point A to point B and from point C to point D are not exposed.

The various layers of the thermal recording medium 110 are chosen such that if in the unexposed medium the second sheet 124 is separated from the lower sheet 112, failure will occur at the imaging surface between the sub-coat 114 and the overcoat 116, so that all the colorant/binder layer 118 will be a part of the image on the second sheet 124. However, when the medium 110 is exposed through the lower sheet 112, the heat which is generated adjacent the imaging surface in exposed regions (such as region BC in FIG. 8) causes increased adhesion of the overcoat 116 to the sub-coat 114. Accordingly, when the sheets 112 and 124 are separated, in such exposed regions failure occurs within the release layer 120. Thus, as shown in FIG. 8, at the boundaries between the exposed and unexposed regions, the failure line extends through the overcoat 116 and the colorant/binder layer 118, so that in the exposed regions the colorant/binder layer remains with the lower sheet 112.

Finally, the present dyes may also be used in a process in which the heat generated by exposure of the dye to radiation causes a visually perceptible change in the medium, so that the medium forms an optical recording element.

The dyes of the present invention are inherently stable and possess high extinction coefficients in the near infra-red region; preferred benzpyrylium squarylium dyes have strong absorptions at about 750–850 nm, while preferred benzthiopyrylium dyes have strong absorptions at about 850–950 nm, and preferred croconylium dyes have strong absorptions at about 900–1050 nm, all of which are convenient for use with present infra-red lasers. The absorption coefficients of the present dyes, which are typically around 300,000, are considerably greater than those of the dyes disclosed in the aforementioned Japanese Patent Application No. 103,604/82, which have absorption coefficients of about 50,000–60,000. The dyes are more soluble in semi-polar organic solvents and polymeric media than the corresponding dyes which contain 2-phenylbenzpyrylium nuclei. The present dyes normally have only a single strong absorption peak, and thus allow one to avoid unwanted absorptions; in particular, the dyes normally have low visible absorptions. The present dyes tend to be resistant to aggregation. At least the benzpyrylium dyes of the present invention are believed to be of low toxicity and are substantially odor-free, in contrast to, for example, some prior art thiopyrylium dyes, many of which have strong, objectionable smells. Furthermore, the benzthiopyrylium dye of the present invention produced in Example 60 below does not have a strong odor. As explained above, the dyes can be synthesized in a small number of steps. The present dyes are of low molecular weight, and thus a high molar concentration of dye can be incorporated into polymeric media, thereby improving absorption of radiation as compared with other dyes having similar molar extinction coefficients but higher molecular weights. Moreover, straightforward modifications of the dyes of the invention allow tuning of physical properties, such as absorption wavelength, solubility in various media and tendency to aggregation in order to meet the needs of specific applications.

The following Examples are now given, though by way of illustration only, to show details of particularly preferred reagents, conditions and techniques used in the compositions and methods of the present invention.

EXAMPLE 1

Preparation of 7-dimethylamino-2-(1,1-dimethylethyl)benz-4H-pyran-4-one

This Example illustrates the preparation, by the reaction shown in FIG. 1, of the chromone of Formula III in which $R^1$ is a tertiary butyl group, $R^3$ is a dimethylamino group, and $R^2$, $R^4$ and $R^5$ are each a hydrogen atom.

3-Dimethylaminophenol (5.0 g, 36.5 mmole) and methyl 4,4-dimethyl-3-oxopentanoate (5.0 g, 31.6 mmole) were heated together under nitrogen at 200° C. for 2 hours. The reaction mixture was cooled to room temperature, dissolved in dichloromethane and applied to a short column containing approximately 200 g of silica gel. The column was first eluted with dichloromethane to remove non-polar by-products, and subsequently eluted with ether to give 7-dimethylamino-2-(1,1-dimethylethyl)benz-4H-pyran-4-one (1.16 g, 15% yield) as a tan solid, m.p. 141–142° C. The structure of this compound was confirmed by mass spectroscopy and by $^1$H and $^{13}$C nuclear magnetic resonance (NMR) spectroscopy.

EXAMPLE 2

Preparation of 7-dimethylamino-2-(1,1-dimethylethyl)-4-methylbenzpyrylium tetrafluoroborate This Example illustrates the preparation, by the reaction shown in FIG. 1, of the tetrafluoroborate salt of Formula IV in which $R^1$ is a tertiary butyl group, $R^3$ is a dimethylamino group, and $R^2$, $R^4$ and $R^5$ are each a hydrogen atom, and $R^7$ is a methyl group.

Methyl magnesium bromide (0.6 mL of a 3.0M solution in ether, 1.8 mmole) was added dropwise to a solution of 7-dimethylamino-2-(1,1-dimethylethyl)benz-4H-pyran-4-one (0.20 g, 0.82 mmole, prepared in Example 1 above) in dry tetrahydrofuran (10 mL) at 0° C. under nitrogen. The reaction mixture was stirred at 25° C. for 5 hours and the solvent subsequently removed. Ethanol (2 mL) was added to the residue, followed by tetrafluoroboric acid (1 mL of a 50% solution in water), and precipitate formed. This precipitate was collected by vacuum filtration, washed with ethanol and dried in air to yield 7-dimethylamino-2-(1,1-dimethylethyl)-4-methylbenzpyrylium tetrafluoroborate (80 mg, 29% yield) as an orange solid melting at 242–243° C. with decomposition. The structure of this compound was confirmed by mass spectroscopy and by $^1$H NMR spectroscopy.

EXAMPLE 3

Preparation of 4-[[3-[7-dimethylamino-2-(1,1-dimethylethyl)-(benz[b]-4H-pyran-4-ylidene)methyl]-2-hydroxy-4-oxo-2-cyclobuten-1-ylidene]methyl]-7-dimethylamino-2-(1,1-dimethylethyl)-benz[b]pyrylium hydroxide inner salt dye This Example illustrates the preparation, by the reaction shown in FIG. 1, of the dye of Formula IA in which each $R^1$ is a tertiary butyl group, each $R^3$ is a dimethylamino group, and each $R^2$, $R^4$, $R^5$ and $R^6$ is a hydrogen atom. This compound will hereinafter be referred to as "Dye A".

A mixture of 7-dimethylamino-2-(1,1-dimethylethyl)-4-methylbenzpyrylium tetrafluoroborate (50 mg, 0.15 mmole, prepared in Example 2 above), squaric acid (6.5 mg, 0.057 mmole) and quinoline (40 mg, 0.31 mmole) in n-butanol (5 mL) was heated at reflux for 2 hours. The reaction mixture was then cooled to room temperature, the solvent removed in vacuo and the residue dissolved in dichloromethane and the resultant solution washed sequentially with 1M hydrochloric acid and saturated sodium bicarbonate solution. The organic layer was dried and evaporated to afford crude Dye A, which was recrystallized from ethanol to give a brown solid (26 mg, 62% yield), which decomposed at 305° C. The dye had a strong infra-red absorption at 800 nm in dichloromethane solution, $\epsilon$=407,000. The structure of this dye was confirmed by mass spectroscopy and by $^1$H NMR spectroscopy.

EXAMPLE 4

Preparation of 7-diethylamino-2-(1,1-dimethylethyl) benz-4H-pyran-4-one

This Example illustrates the preparation, by the reaction shown in FIG. 1, of the chromone of Formula III in which $R^1$ is a tertiary butyl group, $R^3$ is a diethylamino group, and $R^2$, $R^4$ and $R^5$ are each a hydrogen atom.

3-Diethylaminophenol (5.0 g, 30.3 mmole) and methyl 4,4-dimethyl-3-oxopentanoate (5.0 g, 31.6 mmole) were heated together under nitrogen at 200° C. for 2 hours. The reaction mixture was cooled to room temperature, dissolved in dichloromethane and applied to a short column containing approximately 200 g of silica gel. The column was first eluted with dichloromethane to remove non-polar by-products, and subsequently eluted with ether to give 7-diethylamino-2-(1,1-dimethylethyl)benz-4H-pyran-4-one (2.7 g, 33% yield) as a brown oil. The structure of this compound was confirmed by mass spectroscopy and by $^1$H and $^{13}$C NMR spectroscopy; the $^{13}$C NMR spectrum was:

$\delta_C$ (75 MHz in CHCl$_3$) 178.1, 174.4, 158.9, 151.8, 126.5, 112.5, 110.1, 105.8, 96.1, 44.6, 36.1, 27.8 and 12.4 ppm.

EXAMPLE 5

Preparation of 7-diethylamino-2-(1,1-dimethylethyl) benz-4H-pyran-4-one

This Example illustrates an improved version of the preparation of the same chromone as in Example 4 above.

3-Diethylaminophenol (500 g, 3.025 mole) and methyl 4,4-dimethyl-3-oxopentanoate (957 g, 6.05 mole) were stirred together at 180° C. under nitrogen with continuous removal of volatile reaction products for 36 hours. After this time, more methyl 4,4-dimethyl-3-oxopentanoate (47.85 g) was added and heating was continued for a further 3 hours. The reaction mixture was then cooled to room temperature and diluted with heptanes (4 L). The resultant solution was extracted with hydrochloric acid (0.5 M, 6 L) and the aqueous layers were back-extracted with heptanes (4×2L). The organic layers were combined, dried and concentrated in vacuo to give 7-diethylamino-2-(1,1-dimethylethyl)-benz-4H-pyran-4-one (673 g, 81% yield) as a brown oil which solidified upon standing. A small sample was further purified by silica gel chromatography and recrystallization from hexanes to give tan crystals which melted at 64.5–65° C. The structure of this compound was confirmed by mass spectroscopy and by $^1$H and $^{13}$C NMR spectroscopy.

EXAMPLE 6

Preparation of 7-diethylamino-2-(1,1-dimethylethyl) benz-4H-pyran-4-one

This Example illustrates the preparation, by the reactions shown in FIG. 2, of the same chromone of Formula III as in Example 4 above.

Part A: Preparation of 4-diethylamino-2-hydroxy-2'-(methylsulfonyl)acetophenone

This Part illustrates the preparation of the methylsulfonyl compound of Formula VIII in which $R^3$ is a diethylamino group, and $R^2$, $R^4$ and $R^5$ are each a hydrogen atom. The procedure followed is analogous to that described in Von Strandtmann et al., J. Het. Chem., 9, 171 (1972).

Sodium hydride (2 g of a 50% dispersion in mineral oil, 0.042 mole) was added to dry dimethyl sulfoxide (25 mL). The resultant mixture was stirred at 60–70° C. under nitrogen until hydrogen evolution ceased (approximately 1 hour). The solution was then cooled to 50° C. and a solution of methyl 4-diethylaminosalicylate (2.23 g, 0.01 mole) in toluene (25 mL) was added over a period of 5 minutes. The resultant solution was stirred at 40–50° C. for 3 hours, then cooled to 20° C. and allowed to stand for 17 hours. The mixture was then poured into ice/water (150 mL) containing conc. hydrochloric acid (5 mL). Toluene (25 mL) was added and the mixture was extracted. The toluene layer was separated, washed with brine, dried over sodium sulfate and evaporated to afford the crude product as a yellow oil. Trituration with ether produced purified 4-diethylamino-2-hydroxy-2'-(methylsulfonyl)-acetophenone (1.6 g, 59% yield) as a waxy brown solid, m.p. 91–92° C. The structure of this compound was confirmed by mass spectroscopy and by $^1$H and $^{13}$C NMR spectroscopy.

Part B: Preparation of chromone

Piperidine (5 drops) was added to a solution of 4-diethylamino-2-hydroxy-2'-(methylsulfonyl) acetophenone (0.25 g, 0.93 mmole) and trimethylacetaldehyde (0.1 g, 1.2 mmole) in toluene (50 mL). The resultant clear solution was heated at reflux for 18 hours, after which more piperidine (20 drops) was added and heating was continued for a further 24 hours. The tan solution was poured into water (50 mL) containing conc. hydrochloric acid (1 mL) and the resultant mixture extracted with toluene. The organic layer was separated, washed with brine, dried over sodium sulfate and evaporated to afford the crude product (0.14 g) as a brown oil. Mass spectroscopy and $^1$H and $^{13}$C NMR spectroscopy showed that the product contained the same chromone as prepared in Example 4 above.

EXAMPLE 7

Preparation of 7-diethylamino-2-(1,1-dimethylethyl)-4-methylbenzpyrylium tetrafluoroborate This Example illustrates the preparation, by the reaction shown in FIG. 1, of the tetrafluoroborate salt of Formula IV in which $R^1$ is a tertiary butyl group, $R^3$ is a diethylamino group, and $R^2$, $R^4$ and $R^5$ are each a hydrogen atom, and $R^7$ is a methyl group.

Methyl magnesium bromide (15.0 mL of a 3.0M solution in ether, 45 mmole) was added dropwise to a solution of 7-diethylamino-2-(1,1-dimethylethyl)benz-4H-pyran-4-one (7.9 g, 29 mmole, prepared in Example 4 above) in dry tetrahydrofuran (100 mL) at 0° C. under nitrogen. The reaction mixture was stirred at 25° C. for 64 hours; repetitions of the procedure indicated that only 17 hours was required for complete reaction. The reaction mixture was poured into a saturated ammonium chloride solution and the resultant mixture was extracted with dichloromethane. The organic layer was separated, dried over magnesium sulfate and evaporated. The residue was dissolved in methanol (30 mL) and tetrafluoroboric acid (4 mL of a 50% solution in water) was added. The solvents were removed and the residue was triturated with ether (4×50 mL). Evaporation of residual solvent in vacuo yielded 7-diethylamino-2-(1,1-dimethylethyl)-4-methylbenzpyrylium tetrafluoroborate (8.5 g, 82% yield) as a yellow foam. The structure of this compound was confirmed by mass spectroscopy and by $^1$H and $^{13}$C NMR spectroscopy; the $^{13}$C NMR spectrum was:

$\delta_C$ (75 MHz in CHCl$_3$) 179.9, 164.1, 159.8, 156.5, 129.3, 118.4, 117.5, 111.3, 95.3, 46.2, 37.9, 28.2, 27.4 and 19.9 ppm.

EXAMPLE 8

Preparation of 7-diethylamino-2-(1,1-dimethylethyl)-4-methylbenzpyrylium tetrafluoroborate This Example illustrates an improved version of the preparation of the same salt as in Example 7 above.

Methyl magnesium bromide (40 mL of a 3M solution in ether, 0.12 mole) was added dropwise to a solution of 7-diethylamino-2-(1,1-dimethylethyl)-benz-4H-pyran-4-one (24.52 g, 0.0897 mole, prepared in Example 5 above) in dry tetrahydrofuran (240 mL) at 0° C. under nitrogen. The reaction mixture was stirred at 25° C. for 17 hours, whereupon a further amount of methyl magnesium bromide (6 mL of a 3M solution in ether, 0.018 mole) was added. The resultant mixture was stirred at 25° C. for another four hours, then poured into water. Tetrafluoroboric acid (50 mL of a 48% solution in water) was added, and the mixture was extracted with dichloromethane. The resultant solution was dried over sodium sulfate and partially evaporated. Ethyl acetate was added and the remaining dichloromethane was removed. Filtration and drying afforded 7-diethylamino-2-(1,1-dimethylethyl)-4-methylbenzpyrylium tetrafluoroborate (25.33 g, 79% yield) as orange crystals which melted at 161° C. The structure of this compound was confirmed by mass spectroscopy and by $^1$H and $^{13}$C NMR spectroscopy.

Example 9

Preparation of 7-diethylamino-2-(1,1-dimethylethyl)-4-methylbenzpyrylium tetrafluoroborate This Example illustrates the preparation, by the reaction shown in FIG. 3, of the same salt of Formula IV as in Example 7 above.

A solution of 7-diethylamino-4-methylcoumarin (2.3 g, 10 mmole) in dimethoxyethane (20 mL) was added dropwise at 25° C. to a vigorously stirred 2.0 M solution of t-butyl magnesium chloride in tetrahydrofuran (10 mL). After the addition had been completed, the resultant mixture was stirred for 12 hours at ambient temperature, then poured into saturated ammonium chloride solution (100 mL) and the mixture was extracted twice with 100 mL aliquots of dichloromethane. The organic extracts were combined, dried over magnesium sulfate and evaporated to a volume of approximately 10 mL. The concentrate thus produced was diluted with ether (100 mL), and tetrafluoroboric acid (7 mL of a 50–52% solution in ether) was added immediately, causing separation of a black oil. The supernatant liquor was decanted and the residue washed with several portions of ether, then pumped under high vacuum overnight to give 4.1 g of a partially solidified black residue. Silica gel thin layer chromatography of this residue, eluting with 10% methanol in dichloromethane, showed a band at $R_f$ 0.3, which co-eluted with the salt produced in Example 7 above. Ultra-violet and visible spectroscopy further confirmed the identity of the product with the salt produced in Example 7 above, and indicated a yield of 24% based upon the coumarin starting material.

EXAMPLE 10

Preparation of 4-[[3-[7-diethylamino-2-(1,1-dimethylethyl)-(benz[b]-4H-pyran-4-ylidene) methyl]-2-hydroxy-4-oxo-2-cyclobuten-1-ylidene] methyl]-7-diethylamino-2-(1,1-dimethylethyl)-benz [b]pyrylium hydroxide inner salt dye This Example illustrates the preparation, by the reaction shown in FIG. 1, of the dye of Formula IA in which each $R^1$ is a tertiary butyl group, each $R^3$ is a diethylamino group, and each $R^2$, $R^4$, $R^1$ and $R^6$ is a hydrogen atom. This compound will hereinafter be referred to as "Dye B".

A mixture of 7-diethylamino-2-(1,1-dimethylethyl)-4-methylbenzpyrylium tetrafluoroborate (7.62 g, 21 mmole, prepared in Example 7 above), squaric acid (1.21 g, 10.6 mmole) and quinoline (2.7 g, 21 mmole) in n-butanol (25 mL) was heated at reflux for 4 hours. The reaction mixture was then cooled to room temperature, the solvent removed in vacuo and the residue washed with ether (200 mL). Methanol (500 mL) was added to the residue, causing the dye to crystallize. Filtration yielded crude Dye B, which was re-precipitated from acetone to give a brown solid (2.3 g, 34% yield), melting at 288–289° C. with decomposition. The dye had a strong infra-red absorption at 804 nm in dichloromethane solution, $\epsilon$=402,000. The structure of this dye was confirmed by mass spectroscopy and by $^1$H and $^{13}$C NMR spectroscopy.

EXAMPLE 11

Preparation of 4-[[3-[7-diethylamino-2-(1,1-dimethylethyl)-(benz[b]-4H-pyran-4-ylidene)methyl]-2-hydroxy-4-oxo-2-cyclobuten-1-ylidene]methyl]-7-diethylamino-2-(1,1-dimethylethyl)-benz[b]pyrylium hydroxide inner salt dye This Example illustrates an improved version of the preparation of the same dye as in Example 10 above.

A mixture of 7-diethylamino-2-(1,1-dimethylethyl)-4-methylbenzpyrylium tetrafluoroborate (36.07 g, 0.1 mole, prepared in Example 8 above), squaric acid (5.73 g, 0.05 mole) and quinoline (12.76 g, 0.1 mole) in n-butanol (117 mL) was heated at reflux for 4 hours. The reaction mixture was then cooled to 0° C. and allowed to stand at this temperature for 17 hours, after which it was diluted with methanol (230 mL) and cooled to 0° C. for an additional 2 hours. The mixture was filtered, rinsed with cold methanol and triturated with cold acetone to give Dye B as copper crystals which melted at 288–289° C. with decomposition. The dye had a strong absorption at 808 nm in dichloromethane solution, $\epsilon$=450,000. The structure of this dye was confirmed by $^1$H and $^{13}$C NMR spectroscopy.

EXAMPLE 12

Preparation of 7-indolinyl-2-(1,1-dimethylethyl)benz-4H-pyran-4-one

This Example illustrates the preparation, by the reaction shown in FIG. 1, of the chromone of Formula III in which $R^1$ is a tertiary butyl group, $R^3$ is an indolinyl group, and $R^2$, $R^4$ and $R^5$ are each a hydrogen atom.

3-Indolinylphenol (2.9 g, 14.5 mmole) and methyl 4,4-dimethyl-3-oxopentanoate (2.5 g, 15.8 mmole) were heated together under nitrogen at 200° C. for 2 hours. The reaction mixture was cooled to room temperature, dissolved in dichloromethane and applied to a short column containing approximately 100 g of silica gel. The column was first eluted with dichloromethane to remove non-polar by-products, and subsequently eluted with ether to give 7-indolinyl-2-(1,1-dimethylethyl)-benz-4H-pyran-4-one (1.2 g, 26% yield) as a yellow oil. The structure of this compound was confirmed by mass spectroscopy and by $^1$H and $^{13}$C NMR spectroscopy.

EXAMPLE 13

Preparation of 7-indolinyl-2-(1,1-dimethylethyl)-4-methylbenzpyrylium tetrafluoroborate This Example illustrates the preparation, by the reaction shown in FIG. 1, of the tetrafluoroborate salt of Formula IV in which $R^1$ is a tertiary butyl group, $R^3$ is an indolinyl group, $R^2$, $R^4$ and $R^5$ are each a hydrogen atom, and $R^7$ is a methyl group.

Methyl magnesium bromide (2 mL of a 3.0 M solution in ether, 6 mmole) was added dropwise at 0° C. to a solution of 7-indolinyl-2-(1,1-dimethylethyl)benz-4H-pyran-4-one (1.2 g, 3.82 mmole, prepared in Example 12 above) in dry tetrahydrofuran (20 mL) and the solution was allowed to stand at room temperature for 1 hour. The reaction mixture was then quenched into saturated ammonium chloride solution and the resultant mixture was extracted with dichloromethane. The organic layer was separated, washed with brine, dried over magnesium sulfate and evaporated. The residue was dissolved in ethanol (5 mL) and tetrafluoroboric acid (1 mL of a 50% solution in water) was added. The solvents were removed and the magenta oil remaining was triturated with ether to give 7-indolinyl-2-(1,1-dimethylethyl)-4-methylbenzpyrylium tetrafluoroborate, which was used without further purification to form the corresponding dye (see Example 14 below).

EXAMPLE 14

Preparation of 4-[[3-[7-indolinyl-2-(1,1-dimethylethyl)-(benz[]-4H-pyran-4-ylidene)methyl]-2-hydroxy-4-oxo-2-cyclobuten-1-ylidene]methyl]-7-indolinyl-2-(1,1-dimethylethyl)-benz[b]pyrylium hydroxide inner salt dye This Example illustrates the preparation, by the reaction shown in FIG. 1, of the dye of Formula IA in which each $R^1$ is a tertiary butyl group, each $R^3$ is an indolinyl group, and each $R^2$, $R^4$, $R^5$ and $R^6$ is a hydrogen atom. This compound will hereinafter be referred to as "Dye C".

A solution of the crude salt prepared in Example 13 above, squaric acid (200 mg, 1.75 mmole) and quinoline (500 mg, 3.9 mmole) in n-butanol (10 mL) was heated at reflux for 2 hours. The solvent was removed in vacuo, and the residue was washed with ether, causing crude Dye C to crystallize out. The crude dye thus obtained was collected by vacuum filtration and recrystallized from ethanol to give a brown solid (152 mg, 11% yield based upon the chromone starting material), melting at 285–286° C. with decomposition. The dye had a strong infra-red absorption at 821 nm in dichloromethane solution, $\epsilon$=350,000. The structure of this dye was confirmed by mass spectroscopy and by $^1$H and $^{13}$C NMR spectroscopy.

EXAMPLE 15

Preparation of 7-morpholino-2-(1,1-dimethylethyl)benz-4H-pyran-4-one

This Example illustrates the preparation, by the reaction shown in FIG. 1, of the chromone of Formula III in which $R^1$ is a tertiary butyl group, $R^3$ is a morpholino group, and $R^2$, $R^4$ and $R^5$ are each a hydrogen atom.

3-Morpholinophenol (15.0 g, 84 mmole) and methyl 4,4-dimethyl-3-oxopentanoate (15 g, 95 mmole) were heated together under nitrogen at 200° C. for 12 hours. The reaction mixture was cooled to room temperature, dissolved in dichloromethane and the resulting solution (200 mL) was washed sequentially with 1M sodium hydroxide and water. The organic layer was then separated and dried over magnesium sulfate. The solvent was evaporated and the residue applied to a short column containing approximately 400 g of silica gel. The column was first eluted with dichloromethane to remove non-polar by-products, and subsequently eluted with ether to give 7-morpholino-2-(1,1-dimethylethyl)benz- 4H-pyran-4-one (6.72 g, 28% yield) as a yellow oil. The structure of this compound was confirmed by mass spectroscopy and by $^1$H and $^{13}$C NMR spectroscopy.

EXAMPLE 16

Preparation of 7-morpholino-2-(1,1-dimethylethyl)-4-methylbenzpyrylium tetrafluoroborate This Example illustrates the preparation, by the reaction shown in FIG. 1, of the tetrafluoroborate salt of Formula IV in which $R^1$ is a tertiary butyl group, $R^3$ is a morpholino group, $R^2$, $R^4$ and $R^5$ are each a hydrogen atom, and $R^7$ is a methyl group.

Methyl magnesium bromide (3 mL of a 3.0 M solution in ether, 9 mmole) was added dropwise at 0° C. to a solution of 7-morpholino-2-(1,1-dimethylethyl)benz-4H-pyran-4-one (2.0 g, 7 mmole, prepared in Example 15 above) in dry tetrahydrofuran (20 mL) and the solution was allowed to stand at room temperature for 17 hours. The reaction mixture was then quenched into saturated ammonium chloride solution and the resultant mixture was extracted with dichloromethane. The organic layer was separated, washed with brine, dried over magnesium sulfate and evaporated. The residue was dissolved in ethanol (5 mL) and tetrafluoroboric acid (1 mL of a 50% solution in water) was added. The solvents were removed and the red mass remaining was triturated with ether to give 7-morpholino-2-(1,1-dimethylethyl)-4-methylbenzpyrylium tetrafluoroborate as a red oil, which was used without further purification to form the corresponding dye (see Example 17 below).

EXAMPLE 17

Preparation of 4-[[3-[7-morpholino-2-(1,1-dimethylethyl)-(benz[b]-4H-pyran-4-ylidene) methyl]-2-hydroxy-4-oxo-2-cyclobuten-1-ylidene] methyl]-7-morpholino-2-(1,1-dimethylethyl)-benz[b] pyrylium hydroxide inner salt dye This Example illustrates the preparation, by the reaction shown in FIG. 1, of the dye of Formula IA in which each $R^1$ is a tertiary butyl group, each $R^3$ is a morpholino group, and each $R^2$, $R^4$, $R^5$ and $R^6$ is a hydrogen atom. This compound will hereinafter be referred to as "Dye D".

A solution of the red oil prepared in Example 16 above, squaric acid (285 mg, 2.5 mmole) and quinoline (900 mg, 7 mmole) in n-butanol (20 mL) was heated at reflux for 2 hours. The solvent was removed in vacuo, and the residue was dissolved in dichloromethane. The resultant solution was washed successively with 1M hydrochloric acid, saturated sodium bicarbonate solution, and brine. The organic layer was then dried over magnesium sulfate and the solvent evaporated. The residue was dissolved in ethanol (20 mL) and water was added to the solution until crude Dye D crystallized. The crude dye thus obtained was collected by vacuum filtration, washed with ether and dried in air to give a green solid (250 mg, 10% yield based upon the chromone starting material), which decomposed at 305° C. The dye had a strong infra-red absorption at 795 nm in dichloromethane solution, $\epsilon$=400,000. The structure of this dye was confirmed by mass spectroscopy and by $^1$H and $^{13}$C NMR spectroscopy.

EXAMPLE 18

Preparation of 7-piperidino-2-(1,1-dimethylethyl) benz-4H-pyran-4-one

This Example illustrates the preparation, by the reaction shown in FIG. 1, of the chromone of Formula III in which $R^1$ is a tertiary butyl group, $R^3$ is a piperidino group, and $R^2$, $R^4$ and $R^5$ are each a hydrogen atom.

3-Piperidinophenol (1.0 g, 5.7 mmole) and methyl 4,4-dimethyl-3-oxopentanoate (1.0 g, 6.3 mmole) were heated together under nitrogen at 200° C. for 5 hours. The reaction mixture was cooled to room temperature, dissolved in dichloromethane and the resulting solution was washed sequentially with 1M sodium hydroxide and water. The organic layer was then separated and dried over magnesium sulfate. The solvent was evaporated and the residue applied to a short column containing approximately 50 g of silica gel. The column was first eluted with dichloromethane to remove non-polar by-products, and subsequently eluted with ether to give 7-piperidino-2-(1,1-dimethylethyl)benz-4H-pyran-4-one (0.23 g, 14% yield) as a red oil. The structure of this compound was confirmed by mass spectroscopy and by $^1$H and $^{13}$C NMR spectroscopy.

EXAMPLE 19

Preparation of 7-piperidino-2-(1,1-dimethylethyl)-4-methylbenzpyrylium tetrafluoroborate This Example illustrates the preparation, by the reaction shown in FIG. 1, of the tetrafluoroborate salt of Formula IV in which $R^1$ is a tertiary butyl group, $R^3$ is a piperidino group, $R^2$, $R^4$ and $R^5$ are each a hydrogen atom, and $R^7$ is a methyl group.

Methyl magnesium bromide (1 mL of a 3.0 M solution in ether, 3 mmole) was added dropwise at 0° C. to a solution of 7-piperidino-2-(1,1-dimethylethyl)benz-4H-pyran-4-one (230 mg, 0.81 mmole, prepared in Example 18 above) in dry tetrahydrofuran (10 mL) and the solution was allowed to stand at room temperature for 17 hours. The reaction mixture was then quenched into saturated ammonium chloride solution and the resultant mixture was extracted with dichloromethane. The organic layer was separated, washed with brine, dried over magnesium sulfate and evaporated. The residue was dissolved in ethanol (2 mL) and tetrafluoroboric acid (0.5 mL of a 50% solution in water) was added. The solvents were removed and the red mass remaining was triturated with ether to give 7-piperidino-2-(1,1-dimethylethyl)-4-methylbenzpyrylium tetrafluoroborate as a red oil, which was used without further purification to form the corresponding dye (see Example 20 below).

EXAMPLE 20

Preparation of 4-[[3-[7-piperidino-2-(1,1-dimethylethyl)-(benz[b]-4H-pyran-4-ylidene) methyl]-2-hydroxy-4-oxo-2-cyclobuten-1-ylidene] methyl]-7-piperidino-2-(1,1-dimethylethyl)-benz[b] pyrylium hydroxide inner salt dye This Example illustrates the preparation, by the reaction shown in FIG. 1, of the dye of Formula IA in which each $R^1$ is a tertiary butyl group, each $R^3$ is a piperidino group, and each $R^2$, $R^4$, $R^5$ and $R^6$ is a hydrogen atom. This compound will hereinafter be referred to as "Dye E".

A solution of the red oil prepared in Example 19 above, squaric acid (40 mg, 0.35 mmole) and quinoline (200 mg, 1.6 mmole) in n-butanol (5 mL) was heated at reflux for 4 hours. The solvent was removed in vacuo, and the residue was washed with ether causing crude Dye E to crystallize out. The crude dye thus obtained was collected by vacuum filtration, washed with acetone and dried in air to give a red solid (52 mg, 20% yield based upon the chromone starting material), which decomposed at 305° C. The dye had a strong infra-red absorption at 801 nm in dichloromethane solution, $\epsilon$=350,000. The structure of this dye was confirmed by mass spectroscopy and by $^1$H and $^{13}$C NMR spectroscopy.

EXAMPLE 21

Preparation of 2-cyclohexyl-7-diethylaminobenz-4H-pyranone

This Example illustrates the preparation, by the reaction shown in FIG. 2, of the chromone of Formula III in which $R^1$ is a cyclohexyl group, $R^3$ is a diethylamino group, and $R^2$, $R^4$ and $R^5$ are each a hydrogen atom.

Piperidine (0.5 g) was added to a solution of 4-diethylamino-2-hydroxy-2'-(methylsulfonyl)-acetophenone (2.69 g, 10 mmole, prepared as in Example 6, Part A above) and cyclohexanecarboxaldehyde (1.18 g, 10.5 mmole) in toluene (50 mL). The resultant solution was heated at reflux for 4 hours. After cooling to room temperature, the solvent was removed and the crude product was purified by sequential triturations with ice-cold hexanes and ice-cold ether. 2-Cyclohexyl-7-diethylaminobenz-4H-pyranone (1.96 g, 85% yield) was obtained as a yellow powder which melted at 109–110° C. The structure of this compound was confirmed by mass spectroscopy and by $^1$H and $^{13}$C NMR spectroscopy.

EXAMPLE 22

Preparation of 2-cyclohexyl-7-diethylamino-4-methylbenzpyrylium tetrafluoroborate This Example illustrates the preparation, by the reaction shown in FIG. 1, of the tetrafluoroborate salt of Formula IV in which $R^1$ is a cyclohexyl group, $R^3$ is a diethylamino group, $R^2$, $R^4$ and $R^5$ are each a hydrogen atom, and $R^7$ is a methyl group.

Methyl magnesium bromide (3.15 mL of a 3.0 M solution in ether, 9.4 mmole) was added dropwise at 0° C. to a solution of 2-cyclohexyl-7-diethylaminobenz-4H-pyranone (0.9 g, 3 mmole, prepared in Example 21 above) in dry tetrahydrofuran (50 mL) and the solution was allowed to stand at room temperature for about 17 hours. The reaction mixture was then poured into saturated ammonium chloride solution and the resultant mixture was extracted with dichloromethane. The organic layer was separated, washed with water, and then treated with tetrafluoroboric acid (10 mL of a 40% solution in water). After 1 hour, the solution was washed with water and dried over sodium sulfate. Removal of solvent yielded 2-cyclohexyl-7-diethylamino-4-methyl-benzpyrylium tetrafluoroborate (0.75 g, 67% yield) as a glassy solid. The structure of this compound was confirmed by mass spectroscopy and by $^1$H and $^{13}$C NMR spectroscopy.

EXAMPLE 23

Preparation of 4-[f[3-[2-cyclohexyl-7-diethylamino-(benz[b]-4H-pyran-4-ylidene)methyl]-2-hydroxy-4-oxo-2-cyclobuten-1-ylidene]methyl]-2-cyclohexyl-7-diethylaminobenz[b]pyrylium hydroxide inner salt dye This Example illustrates the preparation, by the reaction shown in FIG. 1, of the dye of Formula IA in which each $R^1$ is a cyclohexyl group, each $R^3$ is a diethylamino group, and each $R^2$, $R^4$, $R^5$ and $R^6$ is a hydrogen atom. This compound will hereinafter be referred to as "Dye F".

A mixture of 2-cyclohexyl-7-diethylamino-4-methylbenzpyrylium tetrafluoroborate (0.66 g, 1.71 mmole prepared in Example 22 above), squaric acid (0.101 g, 0.89 mmole) and quinoline (0.23 g, 1.78 mmole) in n-butanol (50 mL) was heated at reflux for 4 hours. The reaction mixture was then cooled to room temperature, the solvent was removed, and the residue was triturated with methanol. The red solid produced was collected by vacuum filtration and washed with more methanol to give Dye F (0.25 g, 43% yield) as a copper-colored solid. The dye had a strong absorption at 804 nm in dichloromethane solution, $\epsilon$=290,000. The structure of this dye was confirmed by mass spectroscopy and by $^1$H and $^{13}$C NMR spectroscopy.

EXAMPLE 24

Preparation of 2-[1,1-dimethylethyl]-4-methylbenzpyrylium tetrafluoroborate

This Example illustrates the preparation, by the reaction shown in FIG. 1, of the tetrafluoroborate salt of Formula IV in which $R^1$ is a tertiary butyl group, $R^2$, $R^3$, $R^4$ and $R^5$ are each a hydrogen atom, and $R^7$ is a methyl group.

Methyl magnesium bromide (2.4 mL of a 3.0 M solution in ether, 7.2 mmole) was added dropwise at room temperature to a solution of 2-t-butylbenz-4H-pyranone (0.9 g, 4.5 mmole, see Bull. Chem. Soc. Japan, 46, 1839–1844 (1973)) in dry tetrahydrofuran (8 mL) and the solution was allowed to stand at room temperature for about 17 hours. The reaction mixture was then poured into stirred ice/water (50 mL) and the resultant mixture was acidified with tetrafluoroboric acid (5 mL of a 48% solution in water). After 15 minutes stirring, the mixture was extracted with dichloromethane (2×25 mL). The organic extracts were combined, dried over sodium sulfate and evaporated to give crude 2-[1,1-dimethylethyl]-4-methylbenzpyrylium tetrafluoroborate (1.05 g) as a brown solid, which was used directly in Example 25 below without further purification.

EXAMPLE 25

Preparation of 4-[[3-[2-[1,1-dimethylethyl][benz[b]-4H-pyran-4-ylidene]methyl]-2-hydroxy-4-oxo-2-cyclobuten-1-ylidene]methyl]-2-[1,1-dimethylethyl] benz[b]pyrylium hydroxide inner salt dye This Example illustrates the preparation, by the reaction shown in FIG. 1, of the dye of Formula IA in which each $R^1$ is a tertiary butyl group and each $R^2$, $R^3$, $R^4$, $R^5$ and $R^6$ is a hydrogen atom. This compound will hereinafter be referred to as "Dye G".

A mixture of crude 2-[1,1-dimethylethyl]-4-methylbenzpyrylium tetrafluoroborate (500 mg, prepared in Example 24 above), squaric acid (0.143 g, 1.25 mmole) and quinoline (0.318 g, 2.5 mmole) in n-butanol (5 mL) was heated at reflux for 2 hours. The reaction mixture was then cooled to room temperature, methanol (5 mL) was added, and the solution was stored in a freezer for 30 minutes. The solid produced was collected by vacuum filtration, washed with methanol, triturated with cold acetone (2×3 mL) and dried to give Dye G as green crystals (31 mg, 6% yield based on the chromone starting material used in Example 24 above). The dye had a strong infra-red absorption at 770 nm in dichloromethane solution, $\epsilon$=250,000. The structure of this dye was confirmed by mass spectroscopy and by $^1$H NMR spectroscopy.

EXAMPLE 26

Preparation of 11-[1,1-dimethylethyl]-9-oxo-[1] benzpyrano[6,7.8-ij]-2.3.6.7-tetrahydro-1H,5H-quinolizine This Example illustrates the preparation, by the reaction shown in FIG. 1, of the chromone of Formula III in which $R^1$ is a tertiary butyl group, $R^5$ is a hydrogen atom, and $R^2$, $R^3$ and $R^4$ together form an —N[—(CH$_2$)$_3$-]$_2$ group in which the ends of the trimethylene groups remote from the nitrogen atom are joined to the benzpyrylium nucleus, so that the —N[—(CH$_2$)$_3$-]$_2$ group and the benzene ring of the benzpyrylium nucleus together form a julolidine ring system.

8-Hydroxyjulolidine (1.0 g, 5.29 mmole) and methyl 4,4-dimethyl-3-oxopentanoate (1.0 g, 6.32 mmole) were heated together under nitrogen at 200° C. for 4 hours, after which time more methyl 4,4-dimethyl-3-oxopentanoate (0.5 g, 3.16 mmole) was added and heating was continued for 2 hours. After cooling to room temperature, the reaction mixture was dissolved in dichloromethane and applied to a short column of silica gel (approx. 200 g). Elution with dichloromethane removed non-polar by-products, while subsequent elution with ether afforded 11-[1,1-dimethylethyl]-9-oxo-[1]benzopyrano[6,7,8-ij]2,3,6,7-tetrahydro-1H,5H-quinolizine (1.12 g, 71% yield) as a brown oil which solidified on standing. The structure of this compound was confirmed by mass spectroscopy and by $^1$H and $^{13}$C NMR spectroscopy.

EXAMPLE 27

Preparation of 11-[1,1-dimethylethyl]-9-methyl-[1]benzpyrano[6,7,8-ij]-2,3,6,7-tetrahydro-1H,5H-quinolizinium tetrafluoroborate This Example illustrates the preparation, by the reaction shown in FIG. 1, of the tetrafluoroborate salt of Formula IV in which $R^1$ is a tertiary butyl group, $R^5$ is a hydrogen atom, $R^7$ is a methyl group, and $R^2$, $R^3$ and $R^4$ together form an —N[—(CH$_2$)$_3$-]$_2$ group in which the ends of the trimethylene groups remote from the nitrogen atom are joined to the benzpyrylium nucleus, so that the —N[—(CH$_2$)$_3$-]$_2$ group and the benzene ring of the benzpyrylium nucleus together form a julolidine ring system.

Methyl magnesium bromide (5.0 mL of a 3.0 M solution in ether, 15 mmole) was added dropwise at 0° C. to a solution of 11-[1,1-dimethylethyl]-9-oxo-[1]benzopyrano[6,7,8-ij]-2,3,6,7-tetrahydro-1H,5H-quinolizine (2.68 g, 9.03 mmole, prepared in Example 26 above) in dry tetrahydrofuran (10 mL) and the solution was allowed to stand at room temperature for about 17 hours. The reaction mixture was then cooled again to 0° C. and more methyl magnesium bromide (1 mL of a 3M solution in ether, 3 mmole) was added dropwise. The reaction mixture was allowed to attain room temperature and stirred for a further 8 hours, after which time the reaction mixture was poured into tetrafluoroboric acid (44 mL of a 4.4% solution in water) and the resultant mixture was extracted with dichloromethane. The organic phase was separated and dried over sodium sulfate. Removal of solvent, followed by trituration of the residue with ethyl acetate and filtration, gave 11-[1,1-dimethylethyl]-9-methyl-[1]benzpyrano[6,7,8-ij]-2,3,6,7-tetrahydro-1H,5H-quinolizinium tetrafluoroborate (1.49 g, 44% yield) as a red solid which melted at 168–170° C. The structure of this compound was confirmed by mass spectroscopy and by $^1$H and $^{13}$C NMR spectroscopy.

EXAMPLE 28

Preparation of 9-[[3-[11-[1,1-dimethylethyl-[1]benzopyrano[6,7,8-ij]-2,3,6,7-tetrahydro-1H,5H-quinolizin-9-ylidene]methy]-2-hydroxy-4-oxo-2-cyclobuten-1-ylidene]methyl-11-[1,1-dimethylethyl]-[1]benzopyrano[6,7,8-ij]-2,3,6,7-tetrahydro-1H,5H-quinolizinium hydroxide inner salt dye This Example illustrates the preparation, by the reaction shown in FIG. 1, of the dye of Formula IA in which, in each benzpyrylium nucleus, $R^1$ is a tertiary butyl group, $R^5$ and $R^6$ are each a hydrogen atom, and $R^2$, $R^3$ and $R^4$ together form an —N[—(CH$_2$)$_3$-]$_2$ group in which the ends of the trimethylene groups remote from the nitrogen atom are joined to the benzpyrylium nucleus, so that the —N[—(CH$_2$)$_3$-]$_2$ group and the benzene ring of the benzpyrylium nucleus together form a julolidine ring system. This compound will hereinafter be referred to as "Dye H".

A mixture of 11-[1,1-dimethylethyl]-9-methyl-[1]benzpyrano[6,7,8-ij]-2,3,6,7-tetrahydro-1H,5H-quinolizinium tetrafluoroborate (0.502 g, 1.31 mmole, prepared in Example 27 above), squaric acid (76 mg, 0.67 mmole) and quinoline (166 mg, 1.31 mmole) in n-butanol (2.5 mL) was heated at reflux for 1.5 hours. The reaction mixture was cooled and stored overnight in a freezer, then heated again to reflux for 2 hours. The residue was filtered and the collected product was rinsed with dichloromethane to give Dye H as a copper-colored solid (0.164 mg, 37% yield). The dye had a strong infra-red absorption at 826 nm in dichloromethane solution, $\epsilon$=447,000. The structure of this dye was confirmed by mass spectroscopy and by $^1$H NMR spectroscopy.

EXAMPLE 29

Preparation of 2-(6.6-dimethylbicyclo[3.1.1]hept-2-en-2-yl)-7-diethylaminobenz-4H-pyranone This Example illustrates the preparation, by the reaction shown in FIG. 2, of the chromone of Formula III in which $R^1$ is a 6,6-dimethylbicyclo-[3.1.1]hept-2-en-2-yl group, $R^3$ is a diethylamino group, and $R^2$, $R^4$ and $R^5$ are each a hydrogen atom. Thus, in this chromone, the 2-substituent has a sp$^2$ carbon atom bonded directly to the benzpyrylium nucleus.

Piperidine (0.5 g) was added to a solution of 4-diethylamino-2-hydroxy-2'-(methylsulfonyl)-acetophenone (2.69 g, 10 mmole, prepared as in Example 6, Part A above) and (1R)-(-)-myrtenal (1.58 g, 10.5 mmole) in toluene (50 mL). The resultant solution was heated at reflux for 4 hours. After cooling the reaction mixture to room temperature, the solvent was removed and the crude product was purified by sequential triturations with hexanes and ice-cold ether. 2-(6,6-dimethylbicyclo[3.1.1]hept-2-en-2-yl)-7-diethylaminobenz-4H-pyranone (1.96 g, 46% yield) was obtained as a yellow powder. The structure of this compound was confirmed by mass spectroscopy and by $^1$H and $^{13}$C NMR spectroscopy.

EXAMPLE 30

Preparation of 2-(6.6-dimethylbicyclo[3.1.1]hept-2-en-2-yl)-7-diethylamino-4-methylbenzpyrylium tetrafluoroborate This Example illustrates the preparation, by the reaction shown in FIG. 1, of the tetrafluoroborate salt of Formula IV in which $R^1$ is a 6,6-dimethylbicyclo[3.1.1]hept-2-en-2-yl group, $R^3$ is a diethylamino group, $R^2$, $R^4$ and $R^5$ are each a hydrogen atom, and $R^7$ is a methyl group.

Methyl magnesium bromide (3.00 mL of a 3.0 M solution in ether, 9.0 mmole) was added dropwise at 0° C. to a solution of 2-(6,6-dimethylbicyclo[3.1.1]hept-2-en-2-yl)-7-diethylaminobenz-4H-pyranone (0.8 g, 0.4 mmole, prepared in Example 29 above) in dry tetrahydrofuran (25 mL) and the solution was allowed to stand at room temperature for about 17 hours. The reaction mixture was then poured into tetrafluoroboric acid (55 mL of a 4.4% solution in water).

The resultant mixture was extracted with dichloromethane, and the organic extracts were washed with water, dried over sodium sulfate and evaporated to give 2-(6,6-dimethylbicyclo[3.1.1]hept-2-en-2-yl)-7-diethylamino-4-methylbenzpyrylium tetrafluoroborate(0.94 g, 93% yield) as a glassy solid. The structure of this compound was confirmed by mass spectroscopy and by $^1$H and $^{13}$C NMR spectroscopy.

EXAMPLE 31

Preparation of 4-[[3-[2-[6.6-dimethylbicyclo[3.1.1] hept-2-en-2-yl]-7-diethylamino-(benz[b]-4H-pyran-4-ylidene)methyl]-2-hydroxy-4-oxo-2-cyclobuten-1-ylidene]methyl]-2-[6.6-dimethylbicyclo[3.1.1]hept-2-en-2-yl]-7-diethylamino-benz[b]pyrylium hydroxide inner salt dye This Example illustrates the preparation, by the reaction shown in FIG. 1, of the dye of Formula IA in which each $R^1$ is a 6,6-dimethylbicyclo[3.1.1]hept-2-en-2-yl group, each $R^3$ is a diethylamino group, and each $R^2$, $R^4$, $R^5$ and $R^6$ is a hydrogen atom. This compound will hereinafter be referred to as "Dye J".

A mixture of 2-(6,6-dimethylbicyclo[3.1.1]hept-2-en-2-yl)-7-diethylamino-4-methylbenzpyrylium tetrafluoroborate (0.82 g, 1.94 mmole, prepared in Example 30 above), squaric acid (0.12 g, 1.05 mmole) and quinoline (0.26 g, 2.01 mmole) in n-butanol (50 mL) was heated at reflux for 4 hours. The reaction mixture was then cooled to room temperature, the solvent was removed, and the residue was triturated with methanol. The red solid produced was collected by vacuum filtration. The filtrate was evaporated, washed with water (50 mL) and stirred with hexanes. The hexanes were then decanted, ether was added, and the solid was removed by filtration. Combination with the solid collected earlier gave Dye J (0.60 g, 83% yield). The dye had a strong infra-red absorption at 865 nm in dichloromethane solution, $\epsilon$=230,000. The structure of this dye was confirmed by mass spectroscopy and by $^1$H and $^{13}$C NMR spectroscopy.

EXAMPLE 32

Preparation of 2-[bicyclo[2.2.1]hept-2-en-5-yl]-7-diethylaminobenz-4H-pyranone

This Example illustrates the preparation, by the reaction shown in FIG. 2, of the chromone of Formula III in which $R^1$ is a bicyclo[2.2.1]hept-2-en-5-yl group, $R^3$ is a diethylamino group, and $R^2$, $R^4$ and $R^5$ are each a hydrogen atom. Thus, in this chromone, the 2-substituent is ethylenically unsaturated but has a sp$^3$ carbon atom bonded directly to the benzpyrylium nucleus.

Piperidine (0.5 g) was added to a solution of 4-diethylamino-2-hydroxy-2'-(methylsulfonyl)-acetophenone (2.69 g, 10 mmole, prepared in Example 6, Part A above) and 5-norbornene-2-carboxaldehyde (1.28 g, 10.5 mmole) in toluene (50 mL). The resultant solution was heated at reflux for 4 hours. After cooling the solution to room temperature, the solvent was removed and the crude product was purified by sequential triturations with hexanes and ice-cold ether. 2-[bicyclo[2.2.1]hept-2-en-5-yl]-7-diethylaminobenz-4H-pyranone (1.98 g, 61% yield) was obtained as a brown oil. The structure of this compound was confirmed by mass spectroscopy and by $^1$H and $^{13}$C NMR spectroscopy.

EXAMPLE 33

Preparation of 2-[bicyclo[2.2.1]hept-2-en-5-yl]-7-diethylamino-4-methylbenzpyrylium tetrafluoroborate This Example illustrates the preparation, by the reaction shown in FIG. 1, of the tetrafluoroborate salt of Formula IV in which $R^1$ is a bicyclo[2.2.1]hept-2-en-5-yl group, $R^3$ is a diethylamino group, $R^2$, $R^4$, and $R^5$ are each a hydrogen atom, and $R^7$ is a methyl group.

Methyl magnesium bromide (3.5 mL of a 3.0 M solution in ether, 10.5 mmole) was added dropwise at 0° C. to a solution of 2-[bicyclo[2.2.1]hept-2-en-5-yl]-7-diethylaminobenz-4H-pyranone (0.87 g, 2.8 mmole, prepared in Example 32 above) in dry tetrahydrofuran (25 mL) and the solution was allowed to stand at room temperature for about 17 hours. The reaction mixture was then poured into tetrafluoroboric acid (55 mL of a 4.4% solution in water). The resultant mixture was extracted with dichloromethane, and the organic extracts were washed with water, dried over sodium sulfate and evaporated to give 2-[bicyclo[2.2.1]hept-2-en-5-yl]-7-diethylamino-4-methylbenzpyrylium tetrafluoroborate (0.75 g, 87% yield) as a brown oil. The structure of this compound was confirmed by mass spectroscopy and by $^1$H and $^{13}$C NMR spectroscopy.

EXAMPLE 34

Preparation of 4-[[3-[2-[bicyclo[2.2.1]hept-2-en-5-yl]-7-diethylamino(benz[b]-4H-pyran-4-ylidene) methyl]-2-hydroxy-4-oxo-2-cyclobuten-1-ylidene] methyl]-2-[bicyclo[2.2.1]-hept-2-en-5-yl]-7-diethylaminobenz[b]pyryliumhydroxide inner salt dye This Example illustrates the preparation, by the reaction shown in FIG. 1, of the dye of Formula IA in which each $R^1$ is a bicyclo[2.2.1]hept- 2-en-5-yl group, each $R^3$ is a diethylamino group, and each $R^2$, $R^4$, $R^5$ and $R^6$ is a hydrogen atom. This compound will hereinafter be referred to as "Dye K".

A mixture of 2-[bicyclo[2.2.1]hept-2-en-5-yl]-7-diethylamino-4-methylbenzpyrylium tetrafluoroborate (0.63 g, 1.59 mmole, prepared in Example 33 above), squaric acid (0.10 g, 0.88 mmole) and quinoline (0.21 g, 1.62 mmole) in n-butanol (50 mL) was heated at reflux for 4 hours. The reaction mixture was then cooled to room temperature, the solvent was removed, and the residue was triturated with methanol. The red solid produced was collected by vacuum filtration. The filtrate was evaporated, washed with water (50 mL) and stirred with hexanes. The hexanes were then decanted, ether was added, and the solid was removed by filtration. Combination with the solid collected earlier gave material containing Dye K (0.49 g). The dye had a strong infra-red absorption at 808 nm in dichloromethane solution. The structure of this dye was confirmed by mass spectroscopy and by $^1$H and $^{13}$C NMR spectroscopy.

EXAMPLE 35

Preparation of 7-diethylamino-2-[1,1-dimethylethyl]-4-ethylbenzpyrylium tetrafluoroborate This Example illustrates the preparation, by the reaction shown in FIG. 1, of the tetrafluoroborate salt of Formula IV in which $R^1$ is a tertiary butyl group, $R^3$ is a diethylamino group, $R^2$, $R^4$ and $R^5$ are each a hydrogen atom and $R^7$ is an ethyl group.

Ethyl magnesium bromide (17.0 mL of a 3M solution in ether, 51 mmole) was added dropwise at room temperature to a solution of 7-diethylamino-2-[1,1-dimethylethyl]benz-4H-pyranone (11.2 g, 39.3 mmole, prepared in Example 4 above) in dry tetrahydrofuran (50 mL) and the solution was stirred at room temperature for 24 hours. The reaction mixture was poured into ice/water (400 mL), which was then acidified with tetrafluoroboric acid (50 mL of a 48% solution in water). The mixture so formed was extracted with dichloromethane and the organic phase was dried over sodium sulfate and evaporated. The residue was triturated with ether and filtered, to give 7-diethylamino-2-[1,1-dimethylethyl]-4-ethylbenzpyrylium tetrafluoroborate (11.8 g, 80% yield) as an orange solid. The structure of this compound was confirmed by mass spectroscopy and by $^1$H NMR spectroscopy.

EXAMPLE 36

Preparation of 4-[1-[3-[1-[7-diethylamino-2-[1,1-dimethylethyl](benz[b]-4H-pyran-4-ylidene)]eth-1-yl]-2-hydroxy-4-oxo-cyclobuten-1-ylidene]eth-1-yl]-7-diethylamino-2-[1,1-dimethylethyl[benz[b]pyrylium hydroxide inner salt This Example illustrates the preparation of the dye of Formula IA in which each $R^1$ is a tertiary butyl group, each $R^3$ is a diethylamino group, each $R^2$, $R^4$ and $R^5$ is a hydrogen atom, and each $R^6$ is a methyl group. This dye will hereinafter be referred to as "Dye L".

A mixture of 7-diethylamino-2-[1,1-dimethylethyl]-4-ethylbenzpyrylium tetrafluoroborate (1.0 g, 2.68 mmole, prepared in Example 35 above), squaric acid (153 mg, 1.34 mmole) and quinoline (345 mg, 2.68 mmole) in sec-butanol (25 mL) was heated at reflux for 3 hours. The solvent was removed and the residue was purified by preparative thin layer chromatography on silica gel with 2% methanol/dichloromethane as eluent to give the dye (80 mg, 9% yield) as a copper colored solid. The dye had a strong infra-red absorption at 828 nm, $\epsilon$=160,000 in dichloromethane solution. The structure of this dye was confirmed by mass spectroscopy and by $^1$H NMR spectroscopy.

EXAMPLE 37

Preparation of 2-[1-adamantyl]-7-morpholinobenz-4H-pyran-4-one

This Example illustrates the preparation, by the reaction shown in FIG. 1, of the chromone of Formula III in which $R^1$ is an adamantyl group, $R^3$ is a morpholino group, and $R^2$, $R^4$ and $R^5$ are each a hydrogen atom.

3-Morpholinophenol (5.0 g, 27.9 mmole) and ethyl 3-adamantyl-3-oxobutanoate (7.7 g, 30.7 mmole) were heated together under nitrogen for 6 hours at 195–210° C. After cooling to room temperature, the reaction mixture was dissolved in dichloromethane and applied to a short column of silica gel (approx. 200 g). Elution with dichloromethane removed non-polar by-products, while subsequent elution with ether afforded a crude product which was re-chromatographed on silica gel to produce 2-[1-adamantyl]-7-morpholinobenz-4H-pyran-4-one as a brown solid (1.0 g, 10% yield). The structure of this compound was confirmed by mass spectroscopy and $^1$H NMR spectroscopy.

EXAMPLE 38

Preparation of 2-[1-adamantyl]-4-methyl-7-morpholinobenzpyrylium tetrafluoroborate This Example illustrates the preparation, by the reaction shown in FIG. 1, of the tetrafluoroborate salt of Formula IV in which $R^1$ is an adamantyl group, $R^3$ is a morpholino group, $R^2$, $R^4$ and $R^5$ are each a hydrogen atom, and $R^7$ is a methyl group.

Methyl magnesium bromide (0.67 mL of a 3M solution in ether, 2 mmole) was added dropwise at room temperature to a solution of 2-[1-adamantyl]-7-morpholinobenz-4H-pyran-4-one (0.6 g, 1.6 mmole, prepared in Example 37 above) in dry tetrahydrofuran (15 mL) and the solution was stirred at room temperature for 24 hours. The reaction mixture was poured into ice/water (100 mL), which was then acidified with tetrafluoroboric acid (5 mL of a 48% solution in water). The mixture so formed was extracted with dichloromethane and the organic phase was dried over sodium sulfate and evaporated. The residue was triturated with ether and filtered to give 2-[1-adamantyl]-4-methyl-7-morpholinobenzpyrylium tetrafluoroborate (0.45 g, 66% yield) as a red solid. The structure of this compound was confirmed by mass spectroscopy and $^1$H NMR spectroscopy.

EXAMPLE 39

Preparation of 4-[[3-[2-[1-adamantyl]-7-morpholino-(benz[b]-4H-pyran-4-ylidene)methyl]-2-hydroxy-4-oxo-2-cyclobuten-1-ylidene]methyl]-2-[1-adamantyl]-7-morpholinobenz[b]pyrylium hydroxide inner salt dye This Example illustrates the preparation of the dye of Formula IA in which each $R^1$ is a tertiary butyl group, each $R^3$ is a morpholino group, each $R^2$, $R^4$ and $R^5$ is a hydrogen atom, and each $R^6$ is a methyl group. This dye will hereinafter be referred to as "Dye M".

A mixture of 2-[1-adamantyl]-4-methyl-7-morpholinobenzpyrylium tetrafluoroborate (0.4 g, 0.9 mmole, prepared in Example 38 above), squaric acid (43 mg, 0.38 mmole) and quinoline (116 mg, 0.90 mmole) in n-butanol (5 mL) was heated at reflux for 3 hours. The reaction mixture was then cooled to 0° C. and filtered to produce crude dye. The crude dye was washed with more cold butanol, then recrystallized from dichloromethane/hexanes to give Dye M (120 mg, 39% yield) as a copper powder. The dye had a strong infra-red absorption at 798 nm, $\epsilon$=350,000. The structure of this dye was confirmed by mass spectroscopy and by $^1$H NMR spectroscopy.

EXAMPLE 40

Preparation of 2-cyclohexyl-7-methoxybenz-4H-pyranone

This Example illustrates the preparation, by the reaction shown in FIG. 2, of the chromone of Formula III in which $R^1$ is a cyclohexyl group, $R^3$ is a methoxy group, and $R^2$, $R^4$ and $R^5$ are each a hydrogen atom.

Piperidine (0.5 g) was added to a solution of 4-methoxy-2-hydroxy-2'-(methylsulfonyl)-acetophenone (2.15 g, 9.4 mmole, prepared by the method of Example 6, Part A above) and cyclohexanecarboxaldehyde (1.11 g, 9.8 mmole) in toluene (50 mL). The resultant solution was heated at reflux for 4 hours. After cooling to room temperature, the solvent was removed and the crude product was purified by trituration with ice-cold hexanes. 2-Cyclohexyl-7-methoxybenz-4H-pyranone (1.80 g, 74% yield) was obtained as a yellow powder which melted at 68–69° C. The structure of this compound was confirmed by mass spectroscopy and by $^1$H and $^{13}$C NMR spectroscopy.

EXAMPLE 41

Preparation of 2-cyclohexyl-7-methoxy-4-methylbenzpyrylium tetrafluoroborate

This Example illustrates the preparation, by the reaction shown in FIG. 1, of the tetrafluoroborate salt of Formula IV in which $R^1$ is a cyclohexyl group, $R^3$ is a methoxy group, $R^2$, $R^4$ and $R^5$ are each a hydrogen atom, and $R^7$ is a methyl group.

Methyl magnesium bromide (3.0 mL of a 3.0M solution in ether, 9.0 mmole) was added dropwise at 0° C. to a solution of 2-cyclohexyl-7-methoxybenz-4H-pyranone (0.62 g, 2.4 mmole, prepared in Example 40 above) in dry tetrahydrofuran (25 mL) and the solution was allowed to stand at room temperature for about 20 hours. The reaction mixture was then poured into ice/water (50 mL) containing tetrafluoroboric acid (5 mL of a 48% solution in water). After 15 minutes, the solution was washed and extracted with dichloromethane. The organic extracts were washed with water, dried over sodium sulfate and concentrated to give 2-cyclohexyl-7-methoxy-4-methylbenzpyrylium tetrafluoroborate (0.75 g, 67% yield) as a dark brown oil. The structure of this compound was confirmed by mass spectroscopy and by $^1H$ and $^{13}C$ NMR spectroscopy.

EXAMPLE 42

Preparation of 4-[[3-[2-cyclohexyl-7-methoxy-(benz[b]-4H-pyran-4-ylidene)methyl]-2-hydroxy-4-oxo-2-cyclobuten-1-ylidene]methyl]-2-cyclohexyl-7-methoxybenz[b]pyrylium hydroxide inner salt dye This Example illustrates the preparation, by the reaction shown in FIG. 1, of the dye of Formula IA in which each $R^1$ is a cyclohexyl group, each $R^3$ is a methoxy group, and each $R^2$, $R^4$, $R^5$ and $R^6$ is a hydrogen atom. This compound will hereinafter be referred to as "Dye N".

A mixture of 2-cyclohexyl-7-methoxy-4-methylbenzpyrylium tetrafluoroborate (0.65 g, 1.89 mmole, prepared in Example 41 above), squaric acid (0.11 g, 0.99 mmole) and quinoline (0.26 g, 2.0 mmole) in n-butanol (25 mL) was heated at reflux for 4 hours. The reaction mixture was then cooled to room temperature, the solvent was removed, and the residue was triturated with methanol. The green solid produced was collected by vacuum filtration and washed with more methanol to give Dye N (0.25 g, 43% yield) as a dark green powder. The dye (which was slightly impure) had a strong absorption at 768 nm in dichloromethane solution, $\epsilon=150,000$. The structure of this dye was confirmed by mass spectroscopy and by $^1H$ and $^{13}C$ NMR spectroscopy.

EXAMPLE 43

Preparation of 2-[3.3-dimethylbut-1-en-1-yl]benz-4H-pyran-4-one

This Example illustrates the preparation of the chromone of Formula III, in which $R^1$ is a 3,3-dimethylbut-1-en-1-yl group (i.e., a 2-tertiary butyl vinyl group), and $R^2$, $R^3$, $R^4$ and $R^5$ are each a hydrogen atom, from the corresponding 2-methyl compound. Thus, in this chromone, the 2-substituent has an $sp^2$ carbon atom bonded directly to the benzpyrylium nucleus.

2-Methylbenz-4H-pyran (0.4 g, 2.5 mmole, prepared as described in Hirao et al., Synthesis, 1984, 1076) and trimethylacetaldehyde (0.5 g, 5.8 mmole) were sequentially added to a solution of sodium ethoxide in ethanol (25 mL of a 0.2 M solution). The reaction mixture was heated at reflux for 3 hours, then poured into a saturated aqueous solution of ammonium chloride. The resultant mixture was extracted with ethyl acetate (3×25 mL), and the combined organic extracts were washed with a saturated sodium bicarbonate solution, dried over sodium sulfate and concentrated in vacuo. The residue, an amber oil, was purified by chromatography on silica gel with 9:1 hexanes/ethyl acetate as eluent to give 2-[3,3-dimethylbut-1-en-1-yl]benz-4H-pyran-4-one (0.12 g, 21% yield) as a yellow oil. The structure of this compound was confirmed by mass spectroscopy and by $^1H$ and $^{13}C$ NMR spectroscopy.

This chromone may be converted to the corresponding 4-methyl tetrafluoroborate salt of Formula IV and the corresponding dye of Formula IA by the methods described in Examples 24 and 25 above.

EXAMPLE 44

Preparation of 7-diethylamino-2-(1-methylethyl)-4-methylbenzpyrylium tetrafluoroborate This Example illustrates the preparation, by the reaction shown in FIG. 3, of the tetrafluoroborate salt of Formula IV in which $R^1$ is an isopropyl group, $R^3$ is a diethylamino group, $R^2$, $R^4$ and $R^5$ are each a hydrogen atom, and $R^7$ is a methyl group.

Isopropyl magnesium bromide (70 mL of a 3M solution in ether, 0.21 mole) was added dropwise to a solution of 7-diethylamino-4-methylcoumarin (55.5 g, 0.24 mole) in dry toluene (700 mL) at 0° C. under nitrogen. The reaction mixture was then allowed to attain room temperature and stirred for 1 hour, after which time tetrafluoroboric acid (300 mL of a 25% solution in water) was added. The aqueous layer was separated, diluted with water (500 mL) and extracted with dichloromethane, and the combined organic layers were dried over sodium sulfate and evaporated to yield the crude salt as a dark purple slush.

This salt may be converted to the corresponding dye of Formula IA by, for example, the method described in Example 11 above.

EXAMPLE 45

Preparation of 7-diethylamino-4-methyl-2-(1-methylpropyl)benzpyrylium tetrafluoroborate This Example illustrates the preparation, by the reaction shown in FIG. 3, of the tetrafluoroborate salt of Formula IV in which $R^1$ is a secondary butyl group, $R^3$ is a diethylamino group, $R^2$, $R^4$ and $R^5$ are each a hydrogen atom, and $R^7$ is a methyl group.

A solution of 7-diethylamino-4-methylcoumarin (1 g, 4.3 mmole) in dry tetrahydrofuran (10 mL) was added dropwise to a solution of sec-butyl lithium (4.0 mL of a 1.3M solution in cyclohexane, 5.2 mmole) in dry tetrahydrofuran (50 mL) at 50° C. under nitrogen. The reaction mixture was then allowed to attain room temperature and stirred for 17 hours, after which time tetrafluoroboric acid (50 mL of a 25% solution in water) was added. The aqueous layer was separated and extracted with dichloromethane, and the combined organic layers were dried over sodium sulfate and evaporated to yield the crude salt as a red oil.

This salt may be converted to the corresponding dye of Formula IA by, for example, the method described in Example 11 above.

EXAMPLES 46–51

The following Examples 46–51 illustrate the synthesis, by a route shown in FIG. 4, of an asymmetric squarylium dye of the present invention.

EXAMPLE 46

Preparation of 3-butoxy-4-f[7-diethylamino-2-(1,1-dimethylethyl)benz[b]-4H-pyran-4-ylidene]methyl]-cyclobut-3-ene-1.2-dione This Example illustrates the preparation, by the reaction XV+IV→XVII shown in FIG. 4, of the squaric acid derivative of Formula XVII in which R is an n-butyl group, $R^1$ is a t-butyl group, $R^3$ is a diethylamino group, and $R^2$, $R^4$, $R^5$ and $R^1$ are each a hydrogen atom. The diester (XV) used is the di-n-butyl ester of squaric acid.

A solution of 7-diethylamino-2-(1,1-dimethylethyl)-4-methylbenzpyrylium tetrafluoroborate (3.57 g, 10 mmole, prepared as described in Example 8 above) in dichloromethane (20 mL) was added dropwise over two hours to a solution of di-n-butyl squarate (2.5 g, 11 mmole, available from Aldrich Chemical Company, Milwaukee, Wis.) and triethylamine (2.02 g, 20 mmole) in dichloromethane (30 mL) at room temperature. After the addition had been completed, the reaction mixture was heated under reflux for three hours. The solvent was then removed and diethyl ether (50 mL) was added. The ether solution was filtered and the solid residue was washed with more ether (50 mL). The combined ether extracts were concentrated, and the crude product thus obtained was purified by flash chromatography on silica gel with 30% ether/hexanes as eluent to give 3-butoxy-4-[[7-diethylamino-2-(1,1-dimethylethyl)benz[b]-4H-pyran-4-ylidene]methyl]cyclobut-3-ene-1,2-dione as a red solid (1.35 g, 29% yield) which melted at 145–146° C. The structure of this compound was confirmed by mass spectroscopy and by $^1$H and $^{13}$C NMR spectroscopy.

(The filtrate from the ether extraction was collected, dissolved in dichloromethane, washed sequentially with 1 M hydrochloric acid, a saturated solution of sodium hydrogen carbonate and brine, and dried over magnesium sulfate. Removal of solvent yielded 3,4-bis[[7-diethylamino-2-(1,1-dimethylethyl)benz[b]-4H-pyran-4-ylidene]methyl] cyclobut-3-ene-1,2-dione as a green solid (1.14 g, 37% yield) which did not melt below 300° C. The structure of this compound was confirmed by mass spectroscopy and by $^1$H and $^{13}$C NMR spectroscopy.)

EXAMPLE 47

Preparation of 4-[[7-diethylamino-2-(1,1-dimethylethyl)benz[b]-4H-pyran-4-ylidene]methyl]-3-hydroxycyclobut-3-ene-1.2-dione This Example illustrates the preparation, by the reaction XVII→XII shown in FIG. 4, of the squaric acid derivative of Formula XII in which $R^1$ is a t-butyl group, $R^3$ is a diethylamino group, and $R^2$, $R^4$, $R^5$ and $R^6$ are each a hydrogen atom.

A solution of 3-butoxy-4-[[7-diethylamino-2-(1,1-dimethylethyl)benz[b]-4H-pyran-4-ylidene]methyl]-cyclobut-3-ene-1,2-dione (200 mg, 0.47 mmole, prepared in Example 46 above) in tetrahydrofuran (5 mL) containing 1M hydrochloric acid (0.5 mL) was heated at reflux for 6 hours, then cooled to room temperature and allowed to stand for 15 hours. The mixture was then concentrated under reduced pressure, excess water being removed by azeotropic distillation with toluene (2×10 mL). The crude product so obtained was triturated with ether, collected by vacuum filtration and washed with more ether to give the acid (148 mg, 86% yield) as an orange powder which decomposed at 172–173° C. The structure of this compound was confirmed by mass spectroscopy and by $^1$H and $^{13}$C NMR spectroscopy.

EXAMPLE 48

Preparation of 2-[1,1-dimethylethyl]-7-hydroxybenz-4H-pyran-4-one

This Example illustrates the preparation, by the reaction shown in FIG. 1, of the chromone of Formula III in which $R^1$ is a tertiary butyl group, $R^3$ is a hydroxyl group, and $R^2$, $R^4$ and $R^5$ are each a hydrogen atom.

Phosphorus pentoxide (100 g, 0.70 mole) and methanesulfonic acid (1000 g, 675 ml) were combined in a 2 liter flask and stirred at room temperature under nitrogen for 1.5 hours until most of the phosphorus pentoxide had dissolved. Methyl 4,4-dimethyl-3-oxopentanoate (84 g, 0.53 mole) was next added in one portion, followed immediately by resorcinol (55.0 g, 0.50 mole). The resultant mixture was stirred at room temperature under nitrogen overnight. The orange reaction solution was then quenched by slowly pouring it into 4 liters of well-stirred water. The quenched mixture became warm and the desired product separated as an oil, which quickly solidified. The resultant mixture was stirred for one hour, then the crude solid was collected, washed with water, and recrystallized from 500 ml of 90% methanol in water to yield 2-(1,1-dimethylethyl)-7-hydroxybenz-4H-pyran-4-one (39.0 g, 36% yield). The structure of this compound was confirmed by mass spectroscopy and by $^1$H and $^{13}$C NMR spectroscopy.

EXAMPLE 49

Preparation of 2-[1,1-dimethylethyl]-7-[2-ethylbut-1-oxy]benz-4H-pyran-4-one

This Example illustrates the preparation of the chromone of Formula III in which $R^1$ is a tertiary butyl group, $R^3$ is a 2-ethylbut-1-oxy group, and $R^2$, $R^4$ and $R^5$ are each a hydrogen atom.

2-(1,1-dimethylethyl)-7-hydroxybenz-4H-pyran-4-one (2.0 g, 0.0092 mole, prepared in Example 48 above), 3-(bromomethyl)pentane (1.82 g, 0.011 mole), potassium carbonate (1.52 g, 0.011 mole), methyl ethyl ketone (20 ml), 2-propanol (10 ml), and a small crystal of potassium iodide were combined and the mixture was heated at reflux under nitrogen for 12 hours. A further addition of 3-(bromomethyl) pentane (1.82 g, 0.011 mole) was then made to the reaction mixture, and heating was continued for an additional 24 hours. The reaction mixture was cooled to room temperature and poured into 250 ml of stirred water, and the resultant mixture was extracted with diethyl ether. The organic layer was separated, dried over sodium sulfate, and concentrated under reduced pressure to leave 2.7 g of a white solid. This solid was recrystallized from methanol (10 mL) to yield 2-(1,1-dimethylethyl)-7-(2-ethylbutoxy)benz-4H-pyran-4-one (2.1 g, 76% yield). The structure of this compound was confirmed by mass spectroscopy and by $^1$H and $^{13}$C NMR spectroscopy.

EXAMPLE 50

Preparation of 2-[1,1-dimethylethyl]-7-[2-ethylbut-1-oxy]-4-methyl-benz[b]pyrylium tetrafluoroborate This Example illustrates the preparation, by the reaction shown in FIG. 1, of the tetrafluoroborate salt of Formula IV in which $R^1$ is a tertiary butyl group, $R^3$ is a 2-ethylbut-1-oxy group, $R^7$ is a methyl group, and $R^2$, $R^4$ and $R^5$ are each a hydrogen atom.

Methyl magnesium bromide (4.6 mL of a 3 M solution in ether, 13.8 mmole) was added dropwise to a solution of 2-(1,1-dimethylethyl)-7-(2-ethylbutoxy)benz- 4H-pyran-4-one (2.0 g, 9.2 mmole, prepared in Example 49 above) in tetrahydrofuran (15 mL) at room temperature under nitrogen. A slightly exothermic reaction took place, and the solution developed a light yellow color. The resultant mixture was stirred at room temperature for 4 hours, during which time a white precipitate formed. The reaction mixture was then quenched by slowly pouring it into a well-stirred solution of tetrafluoroboric acid (10 mL of an 8 M solution) in 100 mL of water. The resultant mixture was stirred for 15 minutes, then extracted with methylene chloride. The organic layer was separated, washed with water, dried over sodium sulfate and concentrated under reduced pressure to yield the desired product (2.4 g, 67% yield) as a light brown solid. The structure of this compound was confirmed by mass spectroscopy and by $^1$H and $^{13}$C NMR spectroscopy.

EXAMPLE 51

Preparation of 4-[[3-[[7-diethylamino-2-[1,1-dimethylethyl]benz[b]-4H-pyran-4-ylidene]methyl]-2-hydroxy-4-oxo-2-cyclobuten-1-ylidene]methyl]-7-[2-ethyl-but-1-oxy]-2-[1,1-dimethylethyl]benz[b] pyrylium hydroxide inner salt dye This Example illustrates the preparation, by the reaction XII +IV IA shown in FIG. 4, of the dye of Formula IA in which each $R^1$ is a t-butyl group, one $R^3$ is a diethylamino group, the other $R^3$ is a 2-ethylbut-1-oxy group, and each $R^2$, $R^4$, $R^5$ and $R^6$ is a hydrogen atom.

A solution of 4-[[7-diethylamino-2-[1,1-dimethylethyl] benz(b)-4H-pyran-4-ylidene]methyl]-3-hydroxycyclobut-3-ene-1,2-dione (1.20 g, 3.27 mmole, prepared in Example 47 above), 2-[1,1-dimethylethyl]-7-[2-ethylbut-1-oxy]-4-methyl-benz[b]pyrylium tetrafluoroborate (1.25 g, 3.22 mmole, prepared in Example 50 above) and quinoline (600 mg, 4.72 mmole) in n-butanol (50 mL) was heated at reflux for 3 hours. The reaction mixture was then cooled, and solvent was removed under reduced pressure. Methanol (100 mL) was added to the residue and the resultant mixture was stored in a freezer at 5° C. for 3 days. The crystals which formed (1.58 g) were removed by filtration and washed with ether. Further purification was effected by flash chromatography on silica gel with 2% methanol/dichloromethane as eluent to afford the dye (1.125 g, 54% yield) as brown crystals. The dye had a principal infra-red absorption in dichloromethane at 782 nm, $\epsilon$=305,000. The structure of this compound was confirmed by mass spectroscopy and by $^1$H and $^{13}$C NMR spectroscopy.

EXAMPLE 52

Preparation of 4-[[3-[[7-diethylamino-2-[1,1-dimethylethyl]benz[b]-4H-pyran-4-ylidene]methyl]-2-hydroxy-4,5-dioxo-2-cyclopenten-1-ylidene] methyl]-7-diethylamino-2-[1,1-dimethylethyl]benz [b]pyrylium hydroxide inner salt dye.

This Example illustrates the preparation of the dye of Formula I in which n is 2, each X is an oxygen atom, each $R^1$ is a t-butyl group, each $R^3$ is a diethylamino group, and each $R^2$, $R^4$, $R^5$ and $R^6$ is a hydrogen atom.

A suspension of 7-diethylamino-2-[1,1-dimethylethyl]-4-methyl-benz[b]pyrylium tetrafluoroborate (90 mg, 0.25 mmole, prepared in Example 8 above), dipotassium croconate (28 mg, 0.125 mmole) and tetra-n-butylammonium chloride (70 mg, 0.25 mmole) in N,N-dimethylformamide (5 mL) was stirred and heated at 80–85° C. for 30 minutes, after which time the reaction mixture was cooled to room temperature and concentrated under reduced pressure. The residue was purified by chromatography on silica gel with 20% acetone/dichloromethane followed by 20% isopropanol/dichloromethane as eluents. The desired dye was obtained as a purplish solid (32 mg, 40% yield) which exhibited a principal absorption in the near infra-red at 952 nm, $\epsilon$=200,000 in dichloromethane solution. The structure of this compound was confirmed by mass spectroscopy and by $^1$H NMR spectroscopy.

EXAMPLE 53

Preparation of 5,7-dimethoxy-2-[1,1-dimethylethyl] benz-4H-pyran-4-one

This Example illustrates the preparation, by the reaction shown in FIG. 1, of the chromone of Formula III in which $R^1$ is a tertiary butyl group, $R^3$ and $R^5$ are each a methoxy group, and $R^2$ and $R^4$ are each a hydrogen atom.

Phosphorus pentoxide (2.9 g, 0.02 mole) and methanesulfonic acid (29 g, 20 ml) were combined in a 125 mL flask and stirred at room temperature under nitrogen for 30 minutes until most of the phosphorus pentoxide had dissolved. Methyl 4,4-dimethyl-3-oxopentanoate (3.2 g, 0.02 mole) was added in one portion, followed immediately by 3,5-dimethoxyphenol (3.1 g, 0.02 mole). The resultant mixture was stirred at room temperature under nitrogen overnight, then at 65° C. for 4 hours. The reaction mixture was cooled to room temperature, then poured in a slow stream into stirred water (500 mL). The resultant precipitate was stirred for 15 minutes, then collected, washed with water, and air-dried to yield 4.5 g of a crude white solid which was purified by flash chromatography on silica gel with 20% ethyl acetate in methylene chloride as eluent to yield the desired product (2.8 g, 53% yield) as a white solid. The structure of this compound was confirmed by mass spectroscopy and by $^1$H and $^{13}$C NMR spectroscopy.

EXAMPLE 54

Preparation of 5,7-dimethoxy-2-[1,1-dimethylethyl]-4-methylbenz[b]pyrylium tetrafluoroborate This Example illustrates the preparation, by the reaction shown in FIG. 1, of the tetrafluoroborate salt of Formula IV in which $R^1$ is a tertiary butyl group, $R^3$ and $R^5$ are each a methoxy group, $R^7$ is a methyl group, and $R^2$ and $R^4$ are each a hydrogen atom.

Methyl magnesium bromide (3.8 mL of a 3 M solution in ether, 11 mmole) was added dropwise to a solution of 2-(1,1-dimethylethyl)-5,7-dimethoxybenz-4H-pyran-4-one (2.0 g, 7.6 mmole, prepared in Example 53 above) in tetrahydrofuran (15 mL) at room temperature under nitrogen. A slightly exothermic reaction occurred and the solution developed a light yellow color. The reaction solution was stirred at room temperature for 4 hours, then more methyl magnesium bromide (3.0 mL of a 3 M solution in ether, 9 mmole) was added and the resultant solution was stirred at room temperature overnight, during which time a white precipitate formed. The reaction mixture was then quenched by slowly pouring it into a well-stirred solution of tetrafluoroboric acid (10 mL of an 8 M solution) in 200 mL water. The resultant mixture was stirred for 30 minutes, then extracted with methylene chloride. The organic layer was separated, washed with water, dried over sodium sulfate, and evaporated to yield a dark oil. Ethyl acetate (25 ml) was added and the mixture was shaken, causing crystallization. The product was collected, washed with ethyl acetate, and dried to yield the desired product (1.8 g, 69% yield) as a light lemon-yellow powder. The structure of this compound was confirmed by mass spectroscopy and by $^1$H and $^{13}$C NMR spectroscopy.

EXAMPLE 55

Preparation of 4-[[3-[[5,7-dimethoxy-2-[1,1-dimethylethyl]benz[b]-4H-pyran-4-ylidene]methyl-]-2-hydroxy-4,5-dioxo-2-cyclopenten-1-ylidene] methyl]-5,7-dimethoxy-2-[1,1-dimethylethyl]benz[b] pyrylium hydroxide inner salt dye This Example illustrates the preparation of the dye of Formula I in which n is 2, each X is an oxygen atom, each $R^1$ is a tertiary butyl group, each $R^3$ and $R^5$ is a methoxy group, and each $R^2$, $R^4$ and $R^6$ is a hydrogen atom.

A suspension of 5,7-dimethoxy-2-[1,1-dimethylethyl]-4-methyl-benz[b]pyrylium tetrafluoroborate (87 mg, 0.25 mmole, prepared in Example 54 above) and dipotassium croconate (28 mg, 0.125 mmole) in N,N-dimethylformamide (10 mL) was stirred and heated at 80–85° C. for 20 minutes. The resultant mixture was then cooled and concentrated under reduced pressure. The residue was purified by preparative thin-layer chromatography on silica gel with 10% acetone/dichloromethane as eluent to give the desired dye (28 mg, 36% yield) as a brown solid. The dye exhibited a principal absorption in the near infra-red at 918 nm, $\epsilon$=168,000 in dichloromethane solution. The structure of this compound was confirmed by mass spectroscopy and by $^1H$ and $^{13}C$ NMR spectroscopy.

EXAMPLE 56

Preparation of 2-[1,1-dimethylethyl]-7-hydroxy-4-methylbenz[b]pyrylium tetrafluoroborate This Example illustrates the preparation, by the reaction shown in FIG. 1, of the tetrafluoroborate salt of Formula IV in which $R^1$ is a tertiary butyl group, $R^3$ is a hydroxyl group, $R^7$ is a methyl group, and $R^2$, $R^4$ and $R^5$ are each a hydrogen atom.

Methyl magnesium bromide (8.3 mL of a 3 M solution in ether, 24.9 mmole) was added dropwise to a solution of 2-(1,1-dimethylethyl)-7-hydroxybenz-4H-pyran-4-one (2.18 g, 10.0 mmole, prepared in Example 48 above) in tetrahydrofuran (25 mL) at room temperature under nitrogen. A slightly exothermic reaction occurred and the solution developed a light yellow color. The solution was stirred at room temperature overnight, during which time a white precipitate formed. The reaction mixture was quenched by slowly pouring it into a well-stirred solution of tetrafluoroboric acid (20 mL of an 8 M solution) in ice water (200 mL). The resultant mixture was stirred for 15 minutes, then the product was isolated by suction filtration, washed well with cold water, and dried in vacuo to yield the desired product (2.6 g, 76% yield) as a light gray solid. The structure and purity of this compound were confirmed by mass spectroscopy and by thin layer chromatography.

EXAMPLE 57

Preparation of 4-[[3-[[2-[1,1-dimethylethyl]-7-hydroxybenz[b]-4H-pyran-4-ylidene]methyl]-2-hydroxy-4,5-dioxo-2-cyclopenten-1-ylidene] methyl]-2-[1,1-dimethylethyl]-7-hydroxybenz[b] pyrylium hydroxide inner salt dye This Example illustrates the preparation of the dye of Formula I in which n is 2, each X is an oxygen atom, each $R^1$ is a t-butyl group, each $R^3$ is a hydroxyl group, and each $R^2$, $R^4$, $R^5$ and $R^6$ is a hydrogen atom.

Dipotassium croconate (109 mg, 0.5 mmole) and 2-[1,1-dimethylethyl]-7-hydroxy-4-methylbenz[b]pyrylium tetrafluoroborate (304 mg, 1 mmole, prepared in Example 56 above) were mixed in THF (10 mL) and the mixture was heated at reflux for 5 minutes. The reaction mixture was then cooled, acetonitrile (10 mL) was added, and the mixture was again refluxed for a further 15 minutes, after which time the solvents were removed under reduced pressure. Dichloromethane and 1M hydrochloric acid were added to the residue, and the resultant mixture was shaken. The desired dye, which was insoluble in both the organic and the aqueous layers, was removed by filtration and washed with acetone to give a dark brown solid (86 mg, 32% yield). This dye had a principal absorption in the near infra-red at 914 nm, $\epsilon$=89,000 in dimethyl sulfoxide solution. The structure of this compound was confirmed by mass spectroscopy and by $^1H$ NMR spectroscopy.

EXAMPLE 58

Preparation of 2-[1,1-dimethylethyl]benz-4H-thiopyran-4-one

This Example illustrates the preparation of the thiobenzpyranone analogue of the chromone of Formula III in which $R^1$ is a tertiary butyl group and $R^2$, $R^3$, $R^4$ and $R^5$ are each a hydrogen atom.

Polyphosphoric acid (15 g) was placed in a three-necked flask fitted with an overhead stirrer and a thermometer, and was rapidly stirred under nitrogen while the internal temperature of the flask was raised to 90° C. Methyl 4,4-dimethyl-3-oxopentanoate (3.16 g, 0.02 mole) and thiophenol (1.1 g, 0.01 mole) were dissolved together and added dropwise to the polyphosphoric acid with stirring. The resultant mixture was stirred at 90° C. under nitrogen for 3 hours. The hot reddish reaction mixture was then quenched by slowly pouring it into 250 mL of well-stirred ice water and the resultant mixture was stirred for 20 minutes, and extracted into diethyl ether. The organic layer was separated, washed with 0.1 N sodium hydroxide and a salt solution, dried over sodium sulfate and evaporated to yield an oily orange solid, which was purified by chromatography on silica gel using methylene chloride as eluent to yield the desired product (0.54 g, 25% yield) as a light yellow solid. The structure of this compound was confirmed by mass spectroscopy and by $^1H$ and $^{13}C$ NMR spectroscopy.

EXAMPLE 59

Preparation of 2-[1,1-dimethylethyl]-4-methylbenz [b]thiopyrylium tetrafluoroborate This Example illustrates the preparation of the thiobenzpyrylium tetrafluoroborate salt analogous to the salt of Formula IV in which $R^1$ is a tertiary butyl group, $R^7$ is a methyl group, and $R^2$, $R^3$, $R^4$ and $R^5$ are each a hydrogen atom.

Methyl magnesium bromide (1.5 mL of a 3 M solution in ether, 4.5 mmole) was added dropwise to a solution of 2-(1,1-dimethylethyl)benz-4H-thiopyran-4-one (0.42 g, 1.9 mmole, prepared in Example 58 above) in tetrahydrofuran (3 mL) at room temperature under nitrogen. A slight exothermic reaction and foaming occurred. The reaction mixture was stirred at room temperature overnight, during which time a white precipitate formed. The reaction mixture was then quenched by slowly pouring it into a well-stirred solution of tetrafluoroboric acid (5 mL of an 8 M solution) in 50 mL water. A precipitate formed and the resultant mixture was stirred for 10 minutes, then the product was isolated by suction filtration, washed well with water, and dried in vacuo to yield the desired product (0.45 g, 78% yield of crude product) as an off-white powder, which was used directly in Example 60 below without further purification.

EXAMPLE 60

Preparation of 4-[[2-[1,1-dimethylethyl]benz[b]-4H-thiopyran-4-ylidene]methyl]-2-hydroxy-4-oxo-2-cyclobuten-1-ylidene]methyl]-2-[1,1-dimethylethyl] benz[b]thiopyrylium hydroxide inner salt dye This Example illustrates the preparation of the dye of Formula I in which n is 1, each X is a sulfur atom, each $R^1$ is a t-butyl group, and each $R^2$, $R^3$, $R^4$, $R^5$ and $R^6$ is a hydrogen atom.

A mixture of crude 2-[1,1-dimethylethyl]-4-methylbenz[b]thiopyrylium tetrafluoroborate (200 mg, 0.66 mmole, prepared in Example 59 above), squaric acid (39 mg, 0.34 mmole) and quinoline (87 mg, 0.69 mmole) in n-butanol (3 mL) was placed in a preheated (140° C.) oil bath and heated at reflux for 1.5 hours. The reaction mixture was cooled to room temperature, methanol (3 mL) was added, and the resultant mixture was refrigerated overnight. The solid produced was collected by vacuum filtration, washed with cold methanol (3 mL), and triturated with acetone (2×3 mL), then dried in vacuo to yield the desired dye (38 mg, 23% yield) as coppery microcrystals. The product had a principal infrared absorption at 861 nm in methylene chloride solution, $\epsilon$=290,000. The structure of the dye was confirmed by mass spectroscopy and by $^1$H NMR spectroscopy.

EXAMPLE 61

Preparation of 2-[1,1-dimethylethyl]-6-hydroxybenz-4H-pyran-4-one

This Example illustrates the preparation, by the reaction shown in FIG. 1, of a chromone of Formula III in which $R^1$ is a tertiary butyl group, $R^2$, $R^3$ and $R^5$ are each a hydrogen atom, and $R^4$ is a hydroxyl group.

Methyl 4,4-dimethyl-3-oxopentanoate (MPA, 528 g, 3.34 mole) was added in one portion to hydroquinone (HQ, 330 g, 3 mole) in a 3 liter, three-necked, round-bottomed flask equipped with a thermometer, mechanical stirrer, and a reflux condenser under a nitrogen atmosphere at 19° C., to give a colorless crystalline suspension. Trifluoromethanesulfonic acid (1657 g, 11.04 mole) was added dropwise by an addition funnel over a period of 1 hour, while maintaining the reaction temperature at 19–38° C. Heating was applied for 8 minutes to raise the temperature from 39° C. to 50° C. An exotherm from 50° C. to 60° C. was observed over a period of 20 minutes, as the hydroquinone slowly dissolved and the reaction solution darkened and became more viscous. The flask was allowed to cool over a period of 50 minutes, and then heating was restarted and the temperature was maintained at 50° C. until the reaction was complete. After three hours heating, thin layer chromatography (developed with 1:1 v/v ethyl acetate/heptane mixture) indicated the formation of the product ($R_f$=0.35) and the disappearance of the starting materials (HQ, $R_f$=0.46; MPA, $R_f$=0.68), so the reaction mixture was cooled to room temperature and poured slowly into ice/water (12 L) containing brine (1.2 L). A yellow-brown gum formed immediately, and slowly solidified upon rapid stirring. After stirring for 2 hours, the crude product was filtered, washed with water and dried in vacuo. This product was then dissolved in 5.3 L of warm acetone (32° C.), filtered through a fluted filter paper and slowly added to 26.5 L of water. After stirring for 1.5 hours, the solid product was filtered off, washed well with water and dried in vacuo to give 423 g. (64.7% yield) of the pure product as a colorless solid.

The structure of this compound was confirmed by mass spectroscopy and by $^1$H and $^{13}$C NMR spectroscopy.

EXAMPLE 62

Preparation of 6-[but-2-oxy]-2-[1-dimethylethyl]benz-4H-pyran-4-one

This Example illustrates the conversion of the 6-hydroxy chromone prepared in Example 61 above to the corresponding 6-sec-butoxy chromone.

2-[1,1-Dimethylethyl]-6-hydroxybenz-4H-pyran-4-one (218 g, 1.0 mole, prepared in Example 61 above) and 2-butanone (MEK, 0.5 L) were added to a 5 liter, three-necked, round-bottomed flask equipped with a thermometer, a reflux condenser and a mechanical stirrer under a nitrogen atmosphere at room temperature (22° C.) to give a milky mixture. Solid potassium carbonate (414 g, 3.0 mole) was added in one portion to the reaction mixture and the funnel used was rinsed with MEK (0.3 L). 2-Iodobutane (207 mL, 331 g, 1.80 mole) was then added to the mixture and the reaction mixture was heated. The milky mixture changed to a clear brown solution containing a solid suspension of potassium carbonate over a period of 40 minutes at 55° C. A thick mixture was formed after the temperature reached 75° C. and the mixture was held at 80° C. for 1.5 hours. Gas evolution was observed and the brown solution darkened. After refluxing for 4.5 hours, additional 2-iodobutane (23 mL, 37 g, 0.2 mole) was added. The resultant mixture was allowed to reflux at ~80° C. for 24 hours, then slowly cooled to room temperature. Gas Chromatography/Mass Spectroscopic analysis of the reaction solution indicated approximately 93.3% of the desired product was formed, with 6.7% unreacted starting material (uncorrected area percent) present. An aqueous solution of sodium hydroxide (50 g sodium hydroxide and 6.8 g of tetrabutylammonium hydrogen sulfate in 0.5 L of water) was added and the reaction solution was stirred vigorously at room temperature for 1 hour. TLC (eluted with 50% ethyl acetate in heptanes) indicated that the unreacted starting material had been removed. The organic layer was separated, washed with water and dried over anhydrous magnesium sulfate, then concentrated under reduced pressure (at 60° C.) to give a red-brown oil (247 g, 90.0% isolated yield).

The structure of this compound was confirmed by mass spectroscopy and by $^1$H and $^{13}$C NMR spectroscopy.

EXAMPLE 63

Preparation of 6-[but-2-oxy]-2-[1,1-dimethylethyl]-4-methylbenzpyrylium tetrafluoroborate This Example illustrates the preparation, by the reaction shown in FIG. 1, of the tetrafluoroborate salt of Formula IV in which $R^1$ is a tertiary butyl group, $R^2$, $R^3$ and $R^5$ are each a hydrogen atom, $R^4$ is a sec-butoxy group, and $R^7$ is a methyl group.

Methyl magnesium bromide (450 mL of a 3.0 M solution in diethyl ether, 1.35 mole) was added through a 500 mL addition funnel to a pre-dried, 3 liter, three-neck, round-bottomed flask equipped with a thermometer, a reflux condenser and a mechanical stirrer, and containing a solution of 6-[but-2-oxy]-2-[1,1-dimethylethyl]benz-4H-pyran-4-one (247 g, 0.9 mole, prepared in Example 62 above) in tetrahydrofuran (1.7 L) under a nitrogen atmosphere. The reaction mixture was maintained at 20° C. by means of an ice bath during the 30 minute addition period. After the addition had been completed, the ice bath was removed and the reaction was stirred at room temperature for an additional one hour. The resultant brown solution was poured slowly into a rapidly stirred aqueous solution of fluoboric acid (1 L of 48% fluoboric acid in 8 L of ice/water, 5.47 mole). A greenish yellow solid formed immediately and the mixture was allowed to stir for an additional 0.5 hour. The precipitate was filtered off, washed with water and dried in a vacuum oven at 40° C. to afford the crude product, which was slurried in 1.5 L of heptanes for 30 minutes to remove some impurities. Filtration and drying of the resultant solid in a vacuum oven at 50° C. afforded a greenish yellow solid (258 g, 71.7% isolated yield) as the final product.

The structure of this compound was confirmed by mass spectroscopy and by $^1$H and $^{13}$C NMR spectroscopy.

EXAMPLE 64

Preparation of 6-[but-2-oxy]-4-[[3-[[6-[but-2-oxy]-2-[1,1-dimethylethyl]benz[b]-4H-pyran-4-ylidene]methyl]-2-hydroxy-4-oxo-2-cyclobuten 1-ylidene]methyl]-2-[1,1-dimethylethyl]benz[b]pyrylium hydroxide inner salt dye This Example illustrates the preparation, by the reaction shown in FIG. 1, of the dye of Formula IA in which each group $R^1$ is a tertiary butyl group, each group $R^2$, $R^3$ and $R^5$ is a hydrogen atom, each group $R^4$ is a sec-butoxy group, and each group $R^6$ is a hydrogen atom.

Squaric acid (11.9 g, 0.105 mole) and n-butanol (600 mL) were added to a 2 liter, three-neck, round-bottomed flask equipped with a thermometer, a reflux condenser and a mechanical stirrer, to give a white suspension. A pre-heated heating mantle was applied and the temperature of the reaction mixture was quickly raised to 100° C. After the mixture has been stirred at 100° C. for 15 minutes, the squaric acid had dissolved and a clear solution was observed. 6-[But-2-oxy]-2-[1,1-dimethylethyl]-4-methyl-benzpyrylium tetrafluoroborate (72 g, 0.2 mole, prepared in Example 63 above) was added in one portion to give a green solution. Quinoline (27.1 g, 0.2 mole) was then added dropwise, through an addition funnel, over a period of 30 minutes. After the reaction mixture had been refluxed for 1 hour, the heating mantle was removed, and some coppery crystals formed when the reaction mixture was cooled to room temperature. The mixture was slowly poured into t-butyl methyl ether (3 L) and the resultant mixture stirred at room temperature for 0.5 hour. The crystals which formed were filtered off, rinsed with water and methanol, and dried in vacuo at 50° C. to give a coppery solid (38.3 g, 61.4% yield) as the first crop. The filtrate was evaporated and the remaining solid was triturated with methanol, by stirring at room temperature for 1 hour. The resultant solution was again filtered, washed with water and methanol, and dried in vacuo at 50° C. to give 8.08 g (13.0% yield) of the dye as a second crop. The combined yield was 74.4% (46.38 g). The dye exhibited an absorption at 788 nm, $\epsilon$=335,000 in dichloromethane solution.

The structure of this compound was confirmed by mass spectroscopy and by $^1$H and $^{13}$C NMR spectroscopy.

EXAMPLE 65

Preparation of 3-[4-[but-2-oxy]phenylthio]-4,4-dimethylpent-2-enoic acid

This Example illustrates the preparation of a starting material, which is used in Example 67 below to prepare a thiochromone.

Part A: Preparation of ethyl 4,4-dimethylpent-2-ynoate

The procedure used in this step is an improved version of that given in E. A. Halonen, Acta Chem. Scand., 2, 1492–1497 (1955).

t-Butyl acetylene (15.38 g, 0.188 mole) was dissolved in tetrahydrofuran (100 mL) in a 500 mL, three-neck, round-bottomed flask fitted with a nitrogen bubbler, a rubber septum and a dropping funnel. The solution was cooled to −78° C. using a dry ice/acetone bath, and n-butyl lithium (72 mL of a 2.5 M solution in hexanes, 0.18 mole) was added dropwise via a syringe. The cooling bath was then removed and the reaction mixture was stirred for 30 minutes; the temperature in the flask rose to 10–15° C.). The flask was again cooled to −70° C. and a solution of ethyl chloroformate (19.5 g, 0.18 mole) was added dropwise. The cooling bath was again removed, and the reaction mixture was stirred for 3 hours. Cold water (75 mL) was then added to quench the reaction, and the aqueous and organic phases were separated. The aqueous phase was extracted with THF (50 mL) and the combined organic phases were washed with 0.1 M hydrochloric acid (75 mL) and brine (100 mL), and dried over magnesium sulfate. Removal of the solvent under reduced pressure gave a pale yellow oil (28 g) which was distilled under reduced pressure to provide the propiolate ester (23.5 g, 85% yield) as a colorless liquid which boiled at 70–75° C. at 18–20 mm Hg.

The structure of this compound was confirmed by mass spectroscopy and by $^1$H and $^{13}$C NMR spectroscopy.

Step B: Preparation of 3-[4-[but-2-oxy]phenylthio]-4,4-dimethylpent-2-enoic acid This step is based partly on the methods described in M. R. Detty and B. J. Murray, J. Am. Chem. Soc., 105, 883–890 (1983).

A solution of p-hydroxythiophenol (64.4 g of 98% pure material, 0.5 mole) in methanol (50 mL) was added dropwise to sodium methoxide (252 mL of a 25% solution in methanol) in a 1 liter, three-neck, round-bottomed flask which had been cooled to 0° C. The resultant reaction mixture was warmed to room temperature, stirred for 1 hour, then again cooled using an ice bath. Ethyl 4,4-dimethylpent-2-ynoate (78 g of 99% pure material, 0.5 mole, prepared in Part A above) was then added dropwise to the reaction mixture over a period of 1.5 hours. The ice bath was then removed, and the reaction mixture was allowed to warm to room temperature and stirred for 2 hours. It was then again cooled, using an ice bath, and 2-iodobutane (110.5 g, 0.6 mole) was added. After the addition had been completed, the resultant mixture was heated to reflux for 3 hours, allowed to stand overnight, and again cooled with an ice bath. Further quantities of sodium methoxide (57 mL of a 25% solution) and 2-iodobutane (46 mL, 0.4 mole) were added, and the reaction mixture was heated at reflux for 3 hours. The process of cooling, addition of sodium methoxide and 2-iodobutane, and heating to reflux was then repeated. The reaction mixture was then cooled to room temperature, potassium hydroxide (100 mL of a 45% aqueous solution) and water (100 mL) were added, and the reaction mixture was heated to 50–60° C. for 2 hours. The volume of the solution was then reduced by about 50%, using a rotary evaporator, after which the concentrated solution was diluted with water (500 mL) and extracted with hexanes. The aqueous layer was cooled and acidified with cold concentrated hydrochloric acid. The material which precipitated (consisting of a mixture of 3-[4-[but-2-oxy]phenylthio]-4,4-dimethylpent-2-enoic acid and dealkylated material, 4,4-dimethyl-3-[4-hydroxyphenylthio]pent-2-enoic acid) was separated and washed with water. The dealkylated material was separated by dissolving the residue in dichloromethane and filtering (the yield of this undesired material was 29.5 g, 23%). The filtrate was concentrated under reduced pressure to give the desired acid (106 g, 68% yield).

The structure of this compound was confirmed by mass spectroscopy and by $^1$H and $^{13}$C NMR spectroscopy.

EXAMPLE 66

Preparation of 3-[4-[but-2-oxy]phenylthio]-4,4-dimethylpent-2-enoic acid

This Example illustrates an alternative preparation of the same material as in Example 65 above.

Part A: Preparation of 4-[but-2-oxy]-1-[methylmercapto]benzene

Powdered sodium hydroxide (120 g, 3 mole) was added to a solution of 4-[methylmercapto]phenol (421 g, 3 mole) in dimethyl sulfoxide (DMSO, 1.7 L) at room temperature, with mechanical stirring. The temperature of the reaction mixture rose to ~40° C., after which the mixture was cooled to 30° C., and 2-iodobutane (552 g, 3 mole) was added over a period of 1 hour, the temperature being maintained below ~55° C. with external cooling. After the addition had been completed, the reaction mixture was heated to 85° C. for 30 minutes, then cooled to 40° C. Additional powdered sodium hydroxide (120 g) and 2-iodobutane (552 g) were added, in the manner described above, and the reaction mixture was stirred overnight. A final quantity of powdered sodium hydroxide (60 g) and 2-iodobutane (226 g) was then added, as above, and the reaction mixture was then heated to 85° C. for 30 minutes. The resultant mixture was cooled, and split into two equal batches. Each batch was diluted with water (2 L) and extracted three times with hexanes (800, 500 and 500 mL aliquots). The combined organic extracts were evaporated to leave the product (488 g, 83% yield) as an amber oil pure enough to be used directly in Step B below.

The structure of this compound was confirmed by mass spectroscopy and by $^1$H and $^{13}$C NMR spectroscopy.

Part B: Preparation of 4-[but-2-oxy]-1-[methylsulfinyl]benzene

This reaction, and that in Part C below, are based upon the methods described in R. N. Young et al., Tetrahedron Letters, 25, 1753 (1984).

4-[But-2-oxy]-1-[methylmercapto]benzene (155 g, 0.8 mole, prepared in Part A above), acetic acid (200 mL, 3.2 mole) and dichloromethane (500 mL) were combined in a 2 liter, round-bottomed flask equipped with a mechanical stirrer, an internal thermometer and a 500 mL dropping funnel. The apparatus was cooled with an external ice/water bath as 30% aqueous hydrogen peroxide (115 mL, 1.0 mole) was added dropwise, with vigorous stirring, at such a rate as to maintain the temperature within the flask at 25–30° C. After the addition had been completed, the cooling bath was removed and stirring was continued for 1 hour. After this time, stirring was stopped, and a small portion of the organic phase was withdrawn and washed with saturated aqueous sodium hydrogen carbonate until gas evolution ceased. TLC (on silica gel eluting with 1:1 v/v hexanes/dichloromethane) showed a trace of remaining starting material, $R_f$ 0.7. An additional 10 mL of 30% aqueous hydrogen peroxide solution was added in one portion and stirring was continued for a further 30 minutes, after which time the reaction was judged by TLC to be complete. The organic layer was separated and washed successively with water (3×300 mL) and saturated aqueous sodium hydrogen carbonate (2×100 mL), and dried over anhydrous sodium sulfate. The solution was then concentrated under reduced pressure to afford the product (163 g, 97% yield).

The structure of this compound was confirmed by mass spectroscopy and by $^1$H and $^{13}$C NMR spectroscopy.

Part C: Preparation of 4-[but-2-oxy]-1-[acetoxymethylmercapto]benzene

4-[But-2-oxy]-1-[methylsulfinyl]benzene (163 g, 0.64 mole, prepared in Part B above) was dissolved in acetic anhydride (800 mL) and the solution was heated at 95–100° C. for 8 hours. The reaction mixture was then cooled to room temperature and poured into a vigorously stirred two-phase mixture of ice/water (2 L) and hexanes (300 mL). After 5 minutes stirring, the phases were separated, and the aqueous phase was extracted as described in Part B above with hexanes (2×300 mL). The combined organic phases were washed with water (2×300 mL) and saturated aqueous sodium hydrogen carbonate solution (2×300 mL), and dried over anhydrous sodium sulfate. Concentration under reduced pressure afforded the desired product of the Pummerer rearrangement (179 g, 92% yield).

The structure of this compound was confirmed by mass spectroscopy and by $^1$H and $^{13}$C NMR spectroscopy.

Part D: Preparation of 3-[4-[but-2-oxy]phenylthio]-4,4-dimethylpent-2-enoic acid Sodium methoxide (105 g, 1.8 mole) was added to methanol (1 L) at room temperature, with mechanical stirring. During the addition, the temperature within the flask holding the mixture rose to 70° C. The resultant suspension (the sodium methoxide need not be in solution for the reaction to proceed) was allowed to cool to ~50° C., and 4-[but-2-oxy]-1-[acetoxymethylmercapto]benzene (160 g, 0.64 mole, prepared in Part C above) was added, neat, over a period of 5 minutes. No temperature increase was noted during the addition. The reaction mixture was stirred for 2 hours, after which ethyl 4,4-dimethylpent-2-ynoate (100 g, 0.64 mole, prepared as described in Example 65 Part A above) was added all at once. The reaction was stirred overnight, then concentrated to ~500 mL using a rotary evaporator, and diluted with water (1 L). Solid potassium hydroxide (112 g, 2.0 mole) was added and the resultant mixture was heated under mild reflux for 2 hours; darkening of the reaction mixture is observed as the hydrolysis proceeds, but this has no effect on the quality of the product obtained. The reaction mixture was then cooled to room temperature, concentrated hydrochloric acid was added to adjust the pH to about 1, and the precipitated acid was collected by vacuum filtration. The acid was diluted with sufficient dichloromethane to obtain a clear solution, and the water which separated was removed. The solution was then dried further over anhydrous sodium sulfate, filtered, and added to roughly three times its volume of hexanes. The desired product separated as pale yellow crystals which were collected by vacuum filtration. The filtrate was concentrated until further precipitation occurred, the solid was collected, and the procedure was continued until 168 g (85% yield) of the product had been collected. (The procedure must be repeated in order to obtain a satisfactory yield. The yield of the first crop is only about 50%, but this procedure minimizes the amount of hexanes which must be handled.)

The structure of this compound was confirmed by mass spectroscopy and by $^1$H and $^{13}$C NMR spectroscopy.

EXAMPLE 67

Preparation of 6-[but-2-oxy]-2-[1,1-dimethylethyl]benz[b]-4H-thiopyran-4-one

This Example illustrates the preparation of the thiochromone analogue of the chromone prepared in Example 62 above. The reaction used is based partly on the methods described in M. R. Detty and B. J. Murray, J. Am. Chem. Soc., 105, 883–890 (1983).

Methanesulfonic acid (78 mL, 115.3 g, 1.2 mole) was added to a suspension of 3-[4-[but-2-oxy]phenylthio]-4,4-dimethylpent-2-enoic acid (335 g, 1.086 mole, prepared as described in Example 66, Part D above) in acetic anhydride (500 mL) under a nitrogen atmosphere. The reaction mixture was then stirred, heated to 110–115° C., using a pre-heated oil bath, and held at that temperature for 1.5 hours. During the heating, the color of the reaction mixture changed from brown to deep green. The mixture was then cooled and poured, with vigorous stirring, into a mixture of ice (1.5 L)

and a 45% aqueous solution of potassium hydroxide (950 mL). After the addition, the pH of the resultant solution was adjusted to between 7 and 8. Upon standing, an aqueous and an oily layer separated. The mixture was extracted with hexanes (1 L), and the organic layer was washed with water and dried over magnesium sulfate. Removal of solvent under reduced pressure gave the thiochromone (318 g). $^1$H NMR indicated that the material was almost pure, so the product was used without further purification in the reaction of Example 68 below.

EXAMPLE 68

Preparation of 6-[but-2-oxy]-2-[1,1-dimethylethyl]-4-methylbenz[b]thiopyrylium tetrafluoroborate This Example illustrates the preparation of the benzthiopyrylium analogue of the salt prepared in Example 63 above.

Methyl magnesium bromide (550 mL of a 3M solution in ether, 1.65 mole) was added over a period of 1 hour to a solution of the crude thiochromone (317 g, prepared in Example 67 above) in THF (400 mL) with cooling to 10° C. The reaction mixture was then allowed to rise to room temperature and stirred for 15 hours. The reaction mixture was then added, with vigorous stirring, to tetrafluoroboric acid (400 mL of a 50% aqueous solution) which had been diluted with ice (800 g) and water (sufficient to bring the total volume to 2.5 L). A dark green precipitate formed, which was collected by vacuum filtration, washed thoroughly with water and hexanes, and dried under reduced pressure to yield the salt (255.2 g, 62.5% yield over two steps from 3-[4-[but-2-oxy]phenylthio]-4,4-dimethylpent-2-enoic acid).

The structure of this compound was confirmed by mass spectroscopy and by $^1$H and $^{13}$C NMR spectroscopy.

EXAMPLE 69

Preparation of 6-[but-2-oxy]-4-[[3-[[6-[but-2-oxy]-2-[1,1-dimethylethyl]benz[b]-4H-thiopyran-4-ylidene]methyl]-2-hydroxy-4-oxo-2-cyclobuten-1-ylidene]methyl]-2-[1,1-dimethylethyl]benz[b] thiopyrylium hydroxide inner salt dye This Example illustrates the preparation of the bis (benzthiopyrylium) analogue of the dye prepared in Example 64 above.

6-[But-2-oxy]-2-[1,1-dimethylethyl]-4-methylbenz[b] thiopyrylium tetrafluoroborate (377 mg, 1 mmole, prepared as described in Example 68 above), squaric acid (114 mg, 1 mmole) and triphenylmethane (25 mg, 0.1 mmole, a radical inhibitor) were combined with n-butanol (15 mL) in a 100 mL, round-bottomed flask. The flask was evacuated and refilled with nitrogen twice, after which quinoline (142 mg, 1.1 mmole) was added and the reaction mixture was heated for 30 minutes using an oil-bath which had been pre-heated to 140° C. The mixture was then cooled to room temperature, diluted with t-butyl methyl ether (50 mL) and refrigerated overnight. The precipitate which had formed was then removed by filtration and washed successively with 25 mL portions of water, 0.1 M hydrochloric acid, water, saturated aqueous sodium hydrogen carbonate, water and t-butyl methyl ether. Drying gave the pure dye (200 mg, 61% yield). The dye exhibited an absorption maximum at 884 nm in dichloromethane solution, $\epsilon$=304,000.

The structure of this compound was confirmed by mass spectroscopy and by $^1$H and $^{13}$C NMR spectroscopy.

EXAMPLES 70–72

Preparation of 6-[but-2-oxy]-4-[[3-[[6-[but-2-oxy]-2-[1,1-dimethylethyl]benz[b]-4H-pyran-4-ylidene] methyl]-2-hydroxy-4-oxo-2-cyclobuten 1-ylidene] methyl]-2-[1,1-dimethylethyl]benz[b]thiopyrylium hydroxide inner salt dye The following Examples 70–72 illustrate the preparation of a mono(benzthiopyrylium) analogue of the dye prepared in Example 64 above by a route analogous to that shown in FIG. 4.

EXAMPLE 70

Preparation of 4-[[6-[but-2-oxy]-2-[1,1-dimethylethyl]benz[b]-4H-pyran-4-ylidene]methyl]-3-chlorocyclobut-3-ene-1,2-dione This Example illustrates the preparation of the compound of Formula XVI shown in FIG. 4, in which $R^1$ is a tertiary butyl group, $R^2$, $R^3$, $R^5$ and $R^6$ are each a hydrogen atom, and $R^4$ is a sec-butoxy group. 3,4-Dichlorocyclobut-3-ene-1,2-dione (23.0 g, 0.15 mole, prepared as described in Schmidt, A. H., Synthesis, 1980, 963) was dissolved in a mixture of 1-methyl-2-pyrrolidinone (100 mL) and acetonitrile (70 mL) in a 1 liter, three-neck, round-bottomed flask fitted with an addition funnel, a nitrogen inlet and an overhead stirrer. The solution was stirred very rapidly under a nitrogen atmosphere while being cooled with an ice bath. A few crystals of previously prepared 4-[[6-[but-2-oxy]-2-[1,1-dimethylethyl]benz[b]-4H-pyran-4-ylidene]methyl]-3-chlorocyclobut-3-ene-1,2-dione were added, followed by a solution of 6-[but-2-oxy]-2-[1,1-dimethylethyl]-4-methylbenzpyrylium tetrafluoroborate (50.0 g, 0.14 mole, prepared as described in Example 63 above) in acetonitrile (355 mL), in a slow stream. Total addition time was about 25 minutes; during the addition, product started precipitating. After the addition had been completed, the ice bath was removed and the thick mixture was stirred at room temperature for one hour, after which it was stored in a refrigerator overnight. The product was collected by filtration through a Buchner funnel. The filter cake was washed with cold acetonitrile (3×100 ml), leaving an orange solid which was dried at 25° C. in vacuo to yield the product (45.4 g, 85% yield) as an orange powder.

The structure of this compound was confirmed by mass spectroscopy and by $^1$H and $^{13}$C NMR spectroscopy.

EXAMPLE 71

Preparation of 4-[[6-[but-2-oxy]-2-[1,1-dimethylethyl]benz[b]-4H-pyran-4-ylidene]methyl]-3-hydroxycyclobut-3-ene-1,2-dione This Example illustrates the preparation of the compound of Formula XII shown in FIG. 4, in which $R^1$ is a tertiary butyl group, $R^2$, $R^3$, $R^5$ and $R^6$ are each a hydrogen atom, and $R^4$ is a sec-butoxy group.

4-[[6-[But-2-oxy]-2-[1,1-dimethylethyl]benz[b]-4H-pyran-4-ylidene]methyl]-3-chlorocyclobut-3-ene-1,2-dione (5.0 g, 0.013 mole, prepared in Example 70 above), anhydrous sodium acetate (2.15 g, 0.026 mole), and 1-methyl-2-pyrrolidinone (30 mL) were combined in a 100 mL, round-bottomed flask equipped with a magnetic stirring bar. The mixture was stirred under nitrogen while it was heated at 80° C. for one hour, during which time all solid material dissolved. The reaction solution was cooled to room temperature, then slowly poured into stirred ice/water (250 mL). The reaction flask was rinsed with an additional 50 ml of water and the rinsings were added to the quenched mixture. A precipitate quickly formed. The mixture was stirred for 30 minutes, then the product was collected on a glass frit funnel, washed with water (2×25 ml), and sucked damp-dry. The material so prepared was dissolved in acetone (50 mL), filtered, and added to 0.1 M hydrochloric acid (200 mL). A precipitate formed, which was collected, washed with water (2×30 ml), and dried at 40° C. in vacuo to give the product (4.0 g, 84% yield) as a dark orange powder.

The structure of this compound was confirmed by mass spectroscopy and by $^1$H and $^{13}$C NMR spectroscopy.

EXAMPLE 72

Preparation of 6-[but-2-oxy]-4-[[3-[[6-[but-2-oxy]-2-[1,1-dimethylethyl]benz[b]-4H-pyran-4-ylidene]methyl]-2-hydroxy-4-oxo-2-cyclobuten-1-ylidene]methyl]-2-[1,1-dimethylethyl]benz[b]thiopyrylium hydroxide inner salt dye This Example illustrates the preparation of the mono (benzthiopyrylium) analogue of the dye prepared in Example 64 above. 6-[But-2-oxy]-2-[1,1-dimethylethyl]-4-methylbenz[b]thiopyrylium tetrafluoroborate (4.05 g, 0.011 mole, prepared in Example 68 above), 4-[[6-[but-2-oxy]-2-[1,1-dimethylethyl]benz[b]-4H-pyran-4-ylidene]methyl]-3-hydroxycyclobut-3-ene-1,2-dione (3.97 g, 0.011 mole, prepared in Example 71 above), quinoline (1.5 ml, 0.013 mole), and n-butanol (75 ml) were combined in a 200 mL, round-bottomed flask equipped with a magnetic stirring bar. A reflux condenser was attached and the flask was placed in a pre-heated oil bath (at approximately 150° C.). The reaction mixture was stirred rapidly under a nitrogen atmosphere and held at full reflux for five minutes, during which time crystals of the dye started precipitating. The mixture was then cooled to room temperature, methanol (30 mL) was added, and the stoppered flask was stored at 4° C. overnight. The precipitated product was collected using a Buchner funnel, washed with cold methanol (100 mL), and air-dried to leave 5.5 g of a coppery-colored solid. This solid was slurried in acetone (~100 ml), stirred for 30 minutes, collected using a Buchner funnel, washed with acetone (50 mL), and air-dried to yield the pure dye (5.48 g, 80% yield) as copper-colored microcrystals. The dye exhibited an infrared absorption at 836 nm in dichloromethane solution, ε=310,000.

The structure of this compound was confirmed by mass spectroscopy and by $^1$H and $^{13}$C NMR spectroscopy.

EXAMPLE 73

Preparation of 6-[but-2-oxy]-2-[1,1-dimethylethyl]-4-methylidene-benz[b]-4H-pyran This Example illustrates the preparation of the exo-methylene compound of Formula XVIII shown in FIG. 5 by means of a Peterson olefination.

Trimethylsilylmethylmagnesium chloride (5 mL of a 1 M in ether, 5 mmole) was added to a solution of 6-[but-2-oxy]-2-[1,1-dimethylethyl]benz-4H-pyran-4-one (1.37 g, 5 mmole, prepared in Example 62 above) in anhydrous THF (10 mL) under a nitrogen atmosphere, and the solution was heated to reflux for 3 hours. Thin layer chromatography of an aliquot indicated that the reaction was not complete, so an additional amount of trimethylsilylmethylmagnesium chloride (5 mL of a 1 M solution in ether, 5 mmole) was added and the reaction solution was heated at reflux for a further 17 hours. An aqueous solution of sodium hydroxide was then added, and the mixture was heated at reflux for a further 1 hour, cooled, and filtered through a short plug of Celite (manufactured by Johns-Manville Corporation, Denver, Colo. 80217). The upper, organic layer was separated, dried over anhydrous magnesium sulfate and concentrated to afford the crude product as a light yellow oil (1.05 g, 77% yield).

The structure of this compound was confirmed by mass spectroscopy and by $^1$H and $^{13}$C NMR spectroscopy.

EXAMPLE 74

Preparation of 6-[but-2-oxy]-2-[1,1-dimethylethyl]-4-methylidene-benz[b]-4H-pyran This Example illustrates the preparation of the same exo-methylene compound as in Example 73 above by use of a strong base on the corresponding 4-methyl salt.

A solution of potassium t-butoxide (5 mL of a 1.0 M solution in 2-methyl-2-propanol, 5 mmole) was added dropwise to a suspension of 6-[but-2-oxy]-2-[1,1-dimethylethyl]-4-methylbenzpyrylium tetrafluoroborate (1.8 g, 5 mmole, prepared in Example 63 above) in heptanes (20 mL) under a nitrogen atmosphere. The green solid suspension changed to a brown solution after stirring at room temperature for 0.5 hour. The reaction mixture was stirred for an additional 0.5 hour, then poured into ice/water. The organic layer was separated, dried over anhydrous magnesium sulfate and concentrated to afford 1.35 g (100% yield) of the crude exo-methylene compound as a brown oil, which was used without further purification in the process of Example 75 below.

EXAMPLE 75

Preparation of 6-[but-2-oxy]-4-[[3-[[6-[but-2-oxy]-2-hydroxy-4-oxo-2-cyclobuten-1-ylidene]methyl]-2-[1,1-dimethylethyl]benz[b]pyrylium hydroxide inner salt dye This Example illustrates the preparation of the same dye as in Example 64 above, but starting from the exo-methylene compound prepared in Example 74 above.

The brown oil prepared in Example 74 above was dissolved in n-butanol (10 mL) and the resultant solution was added dropwise to a pre-heated (100° C.) solution of squaric acid (0.285 g, 2.5 mmole) in n-butanol (20 mL) under a nitrogen atmosphere. The green solution formed was allowed to stir at 100° C. for 1 hour before being allowed to cool to room temperature. A coppery solid separated after stirring overnight at room temperature. This solid was collected by filtration, rinsed with methanol and dried in vacuo to give the first crop of the dye (1.04 g, 66.7% yield). Evaporation of the solvent from the filtrate afforded a dark solid, which was slurried in methanol, filtered and dried in vacuo to give a second crop of the dye (0.06 g, 3.84% yield). The combined yield of dye was 70.5%. The dye was identical, by near infra-red absorption, mass spectroscopy and $^1$H and $^{13}$C NMR spectroscopy, to the material prepared in Example 64 above.

EXAMPLES 76–79

Preparation of 4-f 3-[[2-[1,1-dimethylethyl]-6-methoxybenz[b]-4H-thiopyran-4-ylidene]methyl]-2-hydroxy-4.5-dioxo-2-cyclopent-1-ylidene]methyl]-2-[1,1-dimethylethyl]-6-methoxybenz[b]thiopyrylium hydroxide inner salt dye The following Examples 76–79 illustrates the preparation of the croconate dye of Formula I in which n is 2, each X is a sulfur atom, each $R^1$ is a tertiary butyl group, each $R^4$ is a methoxy group, and each $R^2$, $R^3$, $R^5$ and $R^6$ is a hydrogen atom.

EXAMPLE 76

Preparation of 4-dimethyl-3-(4-methoxyphenylthio) pent-2-enoic acid

This Example illustrates the preparation of a starting material, which is used in Example 77 below to prepare a thiochromone. The procedure used is based partly on the methods described in M. R. Detty and B. J. Murray, J. Am. Chem. Soc, 105, 883–890, (1983).

A solution of 4-methoxybenzene thiol (14.0 g, 0.1 mole) in methanol (25 mL) was added in one portion to sodium methoxide (21.6 g of a 25% solution in methanol, 0.1 mole) with ice/water bath cooling. The flask was warmed to room temperature, stirred for 15 minutes, and then cooled again using the ice/water bath. A solution of ethyl 4,4-dimethylpent-2-ynoate (15.4 g, 0.1 mole, prepared in Example 65, Part A above) in methanol (25 mL) was next added in one portion. The reaction mixture was warmed to room temperature, stirred for one hour, and then diluted with ethanol (95%, 75 mL). Potassium hydroxide (30 mL of a 40% aqueous solution) was added, and the resultant solution was heated to 50–60° C. using a water bath, and stirred at this temperature for 2 hours. The mixture was next cooled to room temperature and diluted with cold water (about 400 mL). The resultant cloudy suspension was extracted with carbon tetrachloride (3×100 mL). The aqueous layer was acidified with ice-cold 6M hydrochloric acid (to about pH 3), whereupon a precipitate of the desired carboxylic acid separated. The product was extracted with dichloromethane (3×100 mL), and the resultant solution was dried over magnesium sulfate. Removal of solvent under reduced pressure gave the acid (21.4 g, 80% yield) as a white solid.

The structure of this compound was confirmed by mass spectroscopy and by $^1H$ and $^{13}C$ NMR spectroscopy.

EXAMPLE 77

Preparation of 2-[1,1-dimethylethyl]-6-methoxybenz [b]-4H-thiopyran-4-one

This Example illustrates the preparation of the 6-methoxy analogue of the thiochromone prepared in Example 67 above. The reaction used is based partly on the methods described in M. R. Detty and B. J. Murray, J. Am. Chem. Soc, 105, 883–890, (1983).

Methanesulfonic acid (2.6 g, 27 mmole) was added to a suspension of 4-dimethyl-3-(4-methoxyphenylthio)pent-2-enoic acid (6.72 g, 25 mmole, prepared in Example 1 above) in acetic anhydride (20 mL). The reaction flask was then stirred and heated with a pre-heated oil bath at 80–85° C. for about 30 minutes, during which time the color of the reaction mixture changed from brown to deep green. The mixture was then cooled and the reaction was quenched by addition of crushed ice/water (50 g). The resultant mixture was stirred for 20 minutes, then extracted with hexanes (5×50 mL). The combined hexane extracts were washed with a saturated aqueous solution of sodium hydrogen carbonate and brine, and dried over magnesium sulfate. Removal of solvent under reduced pressure gave the thiochromone (5.74 g). $^1H$ NMR indicated that the material was almost pure, so it was used without further purification in the reaction of Example 78 below.

EXAMPLE 78

Preparation of 2-[1,1-dimethylethyl]-6-methoxy-4-methylbenz[b]thiopyrylium tetrafluoroborate This Example illustrates the preparation of the 6-methoxy analogue of the benzthiopyrylium salt prepared in Example 68 above.

Methyl magnesium bromide (50 mL of a 3M solution in ether, 0.15 mmole) was added to a solution of the crude thiochromone (20 g, prepared in Example 77 above) in THF (100 mL) with cooling to 10° C. The reaction mixture was then allowed to rise to room temperature and stirred for 6 hours. The resultant mixture was added, with vigorous stirring, to tetrafluoroboric acid (125 mL of a 50% aqueous solution) which had been diluted with ice/water (600 mL). A yellow precipitate formed, which was collected by vacuum filtration, washed thoroughly with hexanes and dried under reduced pressure to yield the salt (18.5 g, 55% yield over three steps from 4-methoxybenzene thiol).

The structure of this compound was confirmed by mass spectroscopy and by $^1H$ and $^{13}C$ NMR spectroscopy.

EXAMPLE 79

Preparation of 4-[[3-[[2-[1,1-dimethylethyl]-6-methoxybenz[b]-4H-thio-pyran-4-ylidene]methyl]-2-hydroxy-4,5-dioxo-2-cyclopent-1-ylidene]methyl]-2-[1,1-dimethylethyl]-6-methoxybenz[b]thiopyrylium hydroxide inner salt dye This Example illustrates the preparation of the dye of Formula I in which n is 2, each X is a sulfur atom, each $R^1$ is a tertiary butyl group, each $R^4$ is a methoxy group, and each $R^2$, $R^3$, $R^5$ and $R^6$ is a hydrogen atom.

A suspension of 2-[1,1-dimethylethyl]-6-methoxy-4-methylbenz[b]thiopyrylium tetrafluoroborate (1.008 g, 3.017 mmole), disodium croconate (0.29 g, 1.56 mmole) and tetrabutylammonium chloride (0.4 g, 1.44 mmole) in N,N-dimethylformamide (10 mL) was stirred and heated at 65–80° C. for 2 hours, then concentrated by evaporation under a stream of nitrogen. The residue was purified by flash chromatography on silica gel with 5% methanol/dichloromethane as eluent, followed by preparative thin layer chromatography on silica gel eluting with 3% methanol/dichloromethane. The desired dye was obtained as a black powder (35.3 mg, 3.8% yield). The dye exhibited a principal absorption in the near infra-red at 1048 nm in dichloromethane solution, $\epsilon=123,000$.

The structure of this compound was confirmed by infrared and mass spectroscopy.

EXAMPLE 80

Absorption and stability of dye in polymers

This Example illustrates the high absorptions which can be achieved by a dye of the present invention when dispersed in a polymer, and the thermal stability of such dispersed polymer.

The polymers tested in this Example were polystyrene/acrylonitrile, polyvinylbutyral and polyvinylformal polymers. 10.0 mg of Dye B prepared as described in Example 10 above was dissolved in 2.0 mL of a 2.5% w/v solution of each polymer in dichloromethane, and the resultant solution was coated onto a transparent 4 mil polyvinyl chloride base using a No. 10 coating rod. The resultant film was oven dried at 80° C. for 10 minutes. After the film had cooled, the wavelength of maximum infra-red absorption ($\lambda_{max}$), the absorbance at $\lambda_{max}$ ($\lambda_{max}$), and the full width of the infra-red absorption peak at half maximum were measured. The film samples were then stored in the dark for 15 days at 80° C., and the same absorption parameters were remeasured to give the data shown in Table 1, in which initial values are shown, with values after heating in parentheses.

TABLE 1

| Polymer | $\lambda_{max}$ | $A_{max}$ | Width (nm) |
| --- | --- | --- | --- |
| SAN | 826 (826) | 2.59 (2.68) | 74 (74) |
| Polyvinylformal | 820 (820) | 2.62 (2.64) | 80 (80) |
| Polyvinylbutyral | 815 (812) | 2.99 (2.16) | 70 (79) |

EXAMPLE 81

Photochemical stability of dye in polymers

This Example illustrates the photochemical stability of a dye of the present invention in a polymer matrix.

20 mg of Dye B prepared as described in Example 10 above and 100 mg of a test polymer (polyvinylbutyral or polyacrylate) were dissolved in dichloromethane, and the resultant solution was coated onto PET transparent base using a #4 coating rod. The maximum absorbance of the resultant film was measured before and after exposure of the coated side of the base to irradiation with a fluorescent lamp (560 ft. candles) for 24 or 67 hours. The results are shown in Table 2 below (with the absorbance after irradiation in parentheses).

TABLE 2

| Polymer | Time of irradiation | $A_{max}$ |
| --- | --- | --- |
| Polyacrylate | 24 hours | 0.84 (0.78) |
| Polyvinylbutyral | 67 hours | 1.225 (1.018) |

EXAMPLE 82

Solubility in halogenated organic solvents

This Example illustrates the high solubility in halogenated organic solvents which can be achieved by dyes of the present invention, as compared with similar dyes which bear 2-phenyl or -substituted phenyl groups.

Dyes B and F of the present invention, and control dyes of Formula IA in which each $R^1$ was a phenyl or 2,4-dimethylphenyl group, each $R^3$ was a diethylamino group and each $R^2$, $R^4$ $R^5$ and $R^6$ was a hydrogen atom (hereinafter referred to as "Control Dyes y and z" respectively) exhibited solubilities in dichloromethane (expressed as a weight percentage of dye to solvent in a saturated solution) as follows:

| Dye | Solubility (wt. %) |
| --- | --- |
| B | 11.5 |
| F | 0.4 |
| y (control) | 0.02 |
| z (control) | 0.1 |

From the foregoing data, it will be seen that substitution of a cyclohexyl group for a phenyl group in this series of dyes increased the solubility of the dye by more than an order of magnitude, an increase which was considerably greater than that achieved by substituting two methyl groups on the phenyl. Furthermore, substitution of a tertiary butyl group for the phenyl group increased solubility by more than two orders of magnitude.

EXAMPLE 83

Imaging

This Example illustrates the use of a dye of the present invention in a thermal imaging medium and process, as described above with reference to FIG. 8.

A solution of sodium dodecylbenzenesulfonate (2.37 g) in water (475 g) was added to a solution of Dye B (3.39 g, prepared in Example 11 above) and a thermoplastic polymer (Goodyear PE-200, 23.75 g) in dichloromethane (215.91 g) using a high-shear Silverson mixer. The resultant emulsion was processed in a microfluidizer and dichloromethane was then removed under reduced pressure. A surfactant (FC-120, available from Minnesota Mining and Manufacturing Corporation, Minneapolis, Minnesota, 0.08 g of a 25% solution) was added to 68.5 g of the emulsion prepared as described above, and the mixture so formed was added with agitation to a combination of a wax (Michaelman 42540, 3.4 g of a dispersion containing 40% solids) and a binder (Monsanto Scripset 540, 20.6 g of a dispersion containing 10% solids) in deionized water (107.4 g).

The fluid so prepared was coated onto a first sheet of poly(ethylene terephthalate) of thickness 1.5 mil (38 μm) which had previously been given an approximately 0.5 micron sub-coat of a styrene/acrylonitrile copolymer, thereby forming an overcoat layer (layer 116 in FIG. 8). The coverage of the overcoat layer containing Dye B was 500 mg/m². Next, a colorant/binder layer (layer 118 in FIG. 8) was formed by coating a mixture of carbon black and polyvinyl alcohol to an optical density of approximately 3.0. To form a release layer (layer 120 in FIG. 8), there was then coated a composition composed of a wax, silica, and a binder (Monsanto Scripset 540) in a ratio of 1:1:0.1. The resultant structure was laminated to a second sheet of poly(ethylene terephthalate) of thickness 7 mil (177 μm) which had been coated with a thermal adhesive (Goodyear PE-200) to a thickness of 10 μm.

The resultant imaging medium was exposed to infra-red irradiation from an GaAIAs semiconductor diode laser emitting at 824 nm, which delivered 125 mW to the imaging medium. The laser output was focussed to a spot of about 320 square microns in area, which was scanned across the medium at speeds of up to 5 m/s. After exposure, the two poly(ethylene terephthalate) sheets were peeled apart to reveal a pair of complementary images. Where the imaging medium has been exposed to the laser radiation, the colorant/binder and overcoat layers had adhered preferentially to the first sheet, and cohesive failure had occurred in the release layer. Where no exposure had occurred, the colorant/binder and overcoat layers had adhered preferentially to the second sheet, and failure of the structure had occurred between the sub-coat and the overcoat layer. The image on the second sheet was protected by the overcoat layer. Post-heating served to increase the durability of this image.

EXAMPLE 84

Imaging

This Example illustrates the use of a dye of the present invention in a thermal imaging medium and process; the thermal imaging medium used was a simplified model of that described above with reference to FIG. 6.

A coating fluid was prepared by combining the infra-red dye of Formula IR4 above (prepared in Example 51 above, 2.6 mg) with a leuco dye of Formula LD3 above (110 mg) and a polymeric binder (polyurethane Estane 5715, supplied by B.F. Goodrich, 0.73 mL of a 15% solution in acetone). The fluid was diluted with acetone (0.157 mL), then coated onto a 4 mil (101 μm) transparent poly(ethylene terephthalate) base using a #12 coating rod. The film so formed was laminated at 180° F. (88° C.) and 60 psi (0.4

MPa) to a second sheet of 4 mil (101 μm) poly(ethylene terephthalate) which had been coated with Joncryl 138 to a thickness of approximately 2 μm. The resultant imaging medium exhibited a peak absorption in the near infra-red at 792 nm, absorbance 1.95. Storage of a sample of this structure at 60° C. for 4 days resulted in a loss of only 2.4% of near infra-red absorption.

A portion of the medium which had not been heated was exposed to infra-red radiation from a GaAlAs semiconductor diode laser emitting at 792 nm, which delivered 151 mW to the medium. The laser output was focussed to a spot approximately 33×3 microns in size. The medium was wrapped around a drum whose axis was perpendicular to the incident laser beam. Rotation of the drum about its axis and simultaneous translation in the direction of the axis caused the laser spot to write a helical pattern on the medium. The pitch of the helix was 33 microns, chosen so that none of the medium was left unexposed between adjacent turns of the helix. In this arrangement, the exposure received by the medium was inversely proportional to the speed of rotation of the drum (here measured as a linear writing speed at the medium surface). The table shows the relationship between writing speed and red optical density (measured using an X-Rite 310 photographic densitometer, supplied by X-Rite, Inc., Grandville, Mich., with the appropriate filter) achieved. The unexposed film had a red density of 0.07.

| Writing speed (m/s) | Red density |
|---|---|
| 0.125 | 1.81 |
| 0.18 | 2.35 |
| 0.25 | 3.52 |
| 0.32 | 2.92 |
| 0.425 | 1.22 |

From these results, it will be seen that this thermal imaging medium was capable of producing images with optical densities as high as those needed in commercial transparencies.

We claim:

1. A dye comprising an inner salt of a compound of the formula:

$$Q^1 = Z - Q^2$$

wherein:
Q$^1$ is a 4-(benz[b]-4H-pyrylium)methylidene, 4-(benz[b]-4H-thiopyrylium)methylidene or 4-(benz[b]-4H-selenopyrylium)methylidene grouping;

Z is a 1,3-(2-hydroxy-4-oxo-2-cyclobutylidene) hydroxide or 1,3-(2-hydroxy-4,5-dioxo-2-cyclopentylidene) hydroxide ring; and Q$^2$ is a 4-(benz[b]-4H-pyran-4-ylidene)methyl, 4-(benz[b]-4H-thiopyran-4-ylidene)methyl or 4-(benz[b]-4H-selenopyran-4-ylidene)methyl grouping;

wherein at least one of the groupings Q$^1$ and Q$^2$ carries at its 2-position a substituent in which a non-aromatic carbon atom is bonded directly to the benzpyrylium, benzthiopyrylium or benzselenopyrylium nucleus, subject to the proviso that if said 2-substituent contains an aromatic nucleus, this aromatic nucleus is not conjugated with the benzpyrylium, benzthiopyrylium or benzselenopyrylium nucleus to which it is attached, said one of the groupings Q$^1$ and Q$^2$ also carrying at its 6-position an alkoxy, alkenyloxy, acyloxy, silyloxy or alicyclyloxy group.

2. A dye according to claim 1 wherein the 2-substituent is an alkyl or cycloalkyl group.

3. A dye according to claim 1 wherein the 6-substituent is an alkoxy group containing not more than about 8 carbon atoms and having a branched chain.

4. A dye according to claim 3 wherein the 6-substituent is an isopropoxy, sec-butoxy or 1-ethylpropoxy group.

5. A dye according to claim 1 which is of the formula:

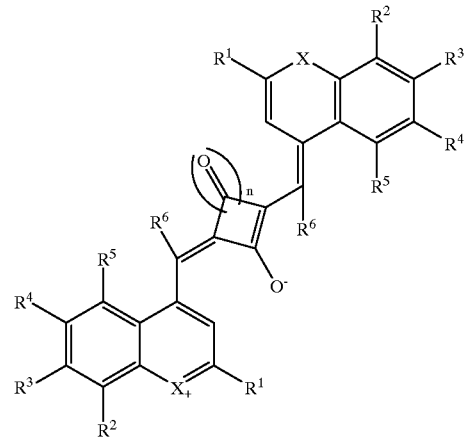

in which:
n is 1 or 2;
each X independently is an oxygen, sulfur or selenium atom;
each R$^1$ independently is an alkyl or cycloalkyl group;
each R$^2$ independently is a hydrogen atom, an alkyl group containing not more than about 8 carbon atoms or a halogen atom;
each R$^4$ independently is a hydrogen atom, an alkyl group containing not more than about 8 carbon atoms, an alkoxy, acyloxy, silyloxy or alicyclyloxy group or a halogen atom, subject to the proviso that at least one group R$^4$ is an alkoxy, alkenyloxy, acyloxy, silyloxy or alicyclyloxy group;
each R$^5$ independently is a hydrogen atom, an alkyl group containing not more than about 8 carbon atoms, a halogen atom, or an alkoxy group containing not more than about 12 carbon atoms;
each R$^6$ independently is a hydrogen atom or an alkyl group containing not more than about 6 carbon atoms; and
each R$^3$ independently is a hydrogen atom, an alkyl group containing not more than about 8 carbon atoms, or a group in which an element of Group 5A, 6A or 7A is bonded directly to the benzpyrylium nucleus, subject to the proviso that when said element is of Group 5A or 6A, R$^3$, together with one or both of R$^2$ and R$^4$ may comprise at least one saturated heterocyclic ring containing said element of Group 5A or 6A, this saturated heterocyclic ring optionally being fused to the phenyl ring of the associated nucleus.

6. A dye according to claim 5 wherein:
n is 1;
each X independently is oxygen or sulfur;
each group R$^1$ is an alkyl or cycloalkyl group;
each group R$^2$, R$^3$ and R$^5$ is a hydrogen atom; and
each group R$^4$ is an alkoxy or cycloalkoxy group.

7. A dye according to claim 6 wherein each group R$^1$ is a branched chain alkyl group containing from 3 to about 8 carbon atoms, and each group R$^4$ is a branched chain alkoxy group containing from 3 to about 8 carbon atoms.

8. A dye according to claim 7 wherein each group $R^4$ is an isopropoxy, sec-butoxy or 1-ethylpropoxy group.

9. 6-[But-2-oxy]-4-[[3-[[6-[but-2-oxy]-2-[1,1-dimethylethyl]benz[b]-4H-pyran-4-ylidene]methyl]-2-hydroxy-4-oxo-2-cyclobuten-1-ylidene]methyl]-2-[1,1-dimethylethyl]benz[b]pyrylium hydroxide inner salt;

6-[but-2-oxy]-4-[[3-[[6-[but-2-oxy]-2-[1,1-dimethylethyl]benz[b]-4H-thiopyran-4-ylidene]methyl]-2-hydroxy-4-oxo-2-cyclobuten-1-ylidene]methyl]-2-[1,1-dimethylethyl]benz[b]thiopyrylium hydroxide inner salt;

6-[but-2-oxy]-4-[[3-[[6-[but-2-oxy]-2-[1,1-dimethylethyl]benz[b]-4H-pyran-4-ylidene]methyl]-2-hydroxy-4-oxo-2-cyclobuten-1-ylidene]methyl]-2-[1,1-dimethylethyl]benz[b]thiopyrylium hydroxide inner salt; and 4-[[3-[[2-[1,1-dimethylethyl]-6-methoxybenz[b]-4H-thiopyran-4-ylidene]methyl]-2-hydroxy-4,5-dioxo-2-cyclopent-1-ylidene]methyl]-2-[1,1-dimethylethyl]-6-methoxybenz[b]thiopyrylium hydroxide inner salt dye.

* * * * *